US010495992B2

United States Patent
Yoshizawa

(10) Patent No.: US 10,495,992 B2
(45) Date of Patent: Dec. 3, 2019

(54) ELECTROPHOTOGRAPHIC PHOTORECEPTOR, ELECTROPHOTOGRAPHIC PHOTORECEPTOR CARTRIDGE, IMAGE FORMING APPARATUS, AND DISPERSANT FOR FLUORORESIN

(71) Applicant: Mitsubishi Chemical Corporation, Tokyo (JP)

(72) Inventor: Atsushi Yoshizawa, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/143,526

(22) Filed: Sep. 27, 2018

(65) Prior Publication Data
US 2019/0033734 A1     Jan. 31, 2019

Related U.S. Application Data

(63) Continuation of application No. PCT/JP2017/012765, filed on Mar. 28, 2017.

(30) Foreign Application Priority Data

Mar. 29, 2016   (JP) ................. 2016-066770

(51) Int. Cl.
  *G03G 5/05*      (2006.01)
  *C08F 290/06*    (2006.01)
  *G03G 15/00*     (2006.01)

(52) U.S. Cl.
  CPC ....... *G03G 5/0592* (2013.01); *C08F 290/061* (2013.01); *G03G 5/056* (2013.01);
  (Continued)

(58) Field of Classification Search
  CPC .... G03G 5/0592; G03G 5/0564; G03G 5/056; G03G 5/0546; G03G 15/75;
  (Continued)

(56) References Cited

U.S. PATENT DOCUMENTS

| 5,063,130 A | 11/1991 | Kato et al. |
| 2008/0199795 A1 | 8/2008 | Ogaki et al. |

(Continued)

FOREIGN PATENT DOCUMENTS

| JP | S63-065451 A | 3/1988 |
| JP | H02-160877 A | 6/1990 |

(Continued)

OTHER PUBLICATIONS

International Search Report (with partial translation) and Written Opinion dated Jun. 13, 2017, issued in corresponding International Patent Application No. PCT/JP2017/012765.

*Primary Examiner* — Thorl Chea
(74) *Attorney, Agent, or Firm* — Morgan, Lewis & Bockius LLP

(57) ABSTRACT

The invention relates to an electrophotographic photoreceptor which is excellent in abrasion resistance and electrical properties by using a fluororesin and a polymer containing a structure represented by a specific formula, and has a long life span, an electrophotographic photoreceptor cartridge and an image forming apparatus including the electrophotographic photoreceptor, and a dispersant which is excellent in dispersibility of a fluororesin particle, and the electrical properties, and the compatibility with a binder resin.

12 Claims, 3 Drawing Sheets

(52) U.S. Cl.
CPC ......... *G03G 5/0539* (2013.01); *G03G 5/0546* (2013.01); *G03G 5/0564* (2013.01); *G03G 15/75* (2013.01)

(58) Field of Classification Search
CPC ...... G03G 5/0539; G03G 5/05; C08F 290/00; C08F 290/061; C08F 290/06
See application file for complete search history.

(56) References Cited

U.S. PATENT DOCUMENTS

| | | |
|---|---|---|
| 2009/0130576 A1 | 5/2009 | Ogaki et al. |
| 2009/0226208 A1 | 10/2009 | Nukada et al. |
| 2011/0052820 A1 | 3/2011 | Kim et al. |
| 2011/0183265 A1 | 7/2011 | Kim et al. |
| 2013/0109804 A1 | 5/2013 | Kusaka et al. |
| 2013/0149540 A1 | 6/2013 | Sato et al. |
| 2013/0260295 A1 | 10/2013 | Iwadate et al. |
| 2014/0072906 A1 | 3/2014 | Iwadate et al. |
| 2014/0321882 A1 | 10/2014 | Iwadate et al. |
| 2014/0377564 A1 | 12/2014 | Sakamoto et al. |
| 2015/0323888 A1 | 11/2015 | Sakamoto et al. |

FOREIGN PATENT DOCUMENTS

| | | |
|---|---|---|
| JP | H02-238458 A | 9/1990 |
| JP | H05-142861 A | 6/1993 |
| JP | H05-209103 A | 8/1993 |
| JP | H08-062883 A | 3/1996 |
| JP | H09-278839 A | 10/1997 |
| JP | H10-239886 A | 9/1998 |
| JP | 2002-023870 A | 1/2002 |
| JP | 2002-194069 A | 7/2002 |
| JP | 2003-213062 A | 7/2003 |
| JP | 2004-010871 A | 1/2004 |
| JP | 2004-502844 A | 1/2004 |
| JP | 2006-016566 A | 1/2006 |
| JP | 2008-544047 A | 12/2008 |
| JP | 2009-104145 A | 5/2009 |
| JP | 2009-237568 A | 10/2009 |
| JP | 2010-090338 A | 4/2010 |
| JP | 2010-097816 A | 4/2010 |
| JP | 2011-074129 A | 4/2011 |
| JP | 2011-207975 A | 10/2011 |
| JP | 2012-072350 A | 4/2012 |
| JP | 2012-184400 A | 9/2012 |
| JP | 2013-205540 A | 10/2013 |
| JP | 2013-231964 A | 11/2013 |
| JP | 2014-056119 A | 3/2014 |
| JP | 2014-081603 A | 5/2014 |
| JP | 2014-141550 A | 8/2014 |
| JP | 2015-028614 A | 2/2015 |
| JP | 2015-105972 A | 6/2015 |
| JP | 2015-110697 A | 6/2015 |
| WO | 02/04538 A2 | 1/2002 |
| WO | 2006/138652 A1 | 12/2006 |

ELECTROPHOTOGRAPHIC PHOTORECEPTOR, ELECTROPHOTOGRAPHIC PHOTORECEPTOR CARTRIDGE, IMAGE FORMING APPARATUS, AND DISPERSANT FOR FLUORORESIN

TECHNICAL FIELD

The present invention relates to an electrophotographic photoreceptor, an electrophotographic photoreceptor cartridge, an image forming apparatus, and a dispersant for fluororesin.

BACKGROUND ART

From the viewpoint that a fluororesin powder such as polytetrafluoroethylene (PTFE) has low surface energy of a fluororesin and is water repellent and oil repellent, and has a large specific gravity, it is very difficult to disperse the fluorine resin powder in a nonaqueous liquid medium such as an organic solvent. In this regards, in the related art, a compound having a long chain perfluoroalkyl group having 8 or more carbon atoms has been used as a dispersant for fluororesin so as to enable dispersion in the aqueous liquid medium.

However, in recent years, a long chain perfluoroalkyl group having 8 or more carbon atoms has a concern with persistence to the environment, accumulation, and toxicity to the living body. As a dispersant which can be used instead of such a compound having a perfluoroalkyl group having 8 or more carbon atoms, for example, a dispersant for fluororesin having a specific structure disclosed in PTLs 1 to 3 has been used.

In a case of using such a dispersant, even with the dispersibility of the fluororesin, there were problems in that dispersion stability is insufficient, a compound having a structure such as amide or sulfonamide contained in the dispersant causes deterioration of electrical properties when being used for an electronic member, and it is not compatible with other binder resins when being used for a coating film, and thereby a smooth coating film cannot be obtained.

Meanwhile, the electrophotographic photoreceptor is repeatedly used in an electrophotographic process, that is, in cycles of charging, exposure, development, transfer, cleaning, static elimination and the like, and undergoes various stresses during that period. Examples such stresses include mechanical stress such as rubbing with a cleaning blade, magnetic brush or the like, abrasion on a surface of a photosensitive layer due to contact with a developer, paper or the like, scratches, and peeling of the film. The damage due to such mechanical stress tends to appear on an image and directly impairs image quality, which is a major factor limiting a life span of the photoreceptor.

Various studies have been made as means for the mechanical stress of the photoreceptor. For example, a protective layer is provided on an outermost surface layer of the photoreceptor, the mechanical strength of the binder resin is made enhanced in the outermost surface layer, and a filler is added to the outermost surface layer. Among them, study of using fluororesin particles as a filler has been made (for example, PTL 4). The fluororesin particles have high lubricity and have a role of improving the abrasion resistance of the photoreceptor by reducing a frictional force generated when the photoreceptor and a member are in contact with each other during the electrophotographic process.

Since there is a problem in that the dispersibility becomes poor even in a case where the fluororesin particles are used for the electrophotographic photoreceptor, a dispersant has been used (for example, Patent Literatures 5 and 6).

BACKGROUND ART LITERATURE

Patent Literature

[Patent Literature 1] JP-A-2003-213062
[Patent Literature 2] JP-A-2010-090338
[Patent Literature 3] JP-A-2011-074129
[Patent Literature 4] JP-A-2002-023870
[Patent Literature 5] JP-A-8-62883
[Patent Literature 6] JP-A-2009-104145

SUMMARY OF INVENTION

Problem to be Solved by Invention

However, a perfluoroalkyl group having 8 or more carbon atoms is limited to be used, and thus cannot be used as a dispersant, and fluororesin particle dispersibility cannot be sufficiently obtained with a dispersant having a perfluoroalkyl group having 6 or less carbon atoms. In addition, the adding of the dispersant deteriorates the electrical properties of the photoreceptor, and the dispersant is not compatible with the binder resin of the photosensitive layer, and thereby the film becomes nonuniform.

In order to use the fluororesin particles by uniformly dispersing on the surface of the photoreceptor, a dispersant for fluororesin particles satisfying all the requirements that satisfy the electrical properties required for the electrophotographic photoreceptor and have good compatibility with the binder resin of the photoreceptor while having sufficient dispersibility of the fluororesin particle.

The invention has been made in consideration of the above-described problems. That is, an object of the invention is to provide an electrophotographic photoreceptor which is excellent in abrasion resistance and electrical properties by using a fluororesin, and has a long life span, an electrophotographic photoreceptor cartridge including the electrophotographic photoreceptor, an image forming apparatus, and a dispersant which is excellent in dispersibility of a fluororesin particle, and the electrical properties, and the compatibility with a binder resin.

Means for Solving Problem

The inventors of the invention has conducted intensive studies for an electrophotographic photoreceptor which can solve the above problems, and as a result, it was found that an electrophotographic photoreceptor which includes, on a conductive support, a photosensitive layer containing a fluororesin and a polymer containing a structure represented by a specific formula electrophotographic photoreceptor, is excellent in the abrasion resistance and the electrical properties and has a long life span. With this, the invention has been completed. That is, summary of the invention are in the following descriptions of <1> to <14>.

<1> An electrophotographic photoreceptor comprising:
a photosensitive layer on a conductive support,
wherein the photosensitive layer contains a fluororesin and a polymer having a structure represented by Formula (I):

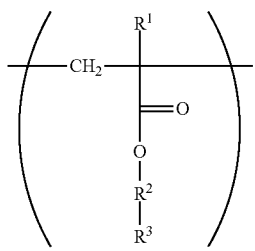

Formula (1)

wherein in the Formula (1), $R^1$ represents a hydrogen atom or a methyl group; $R^2$ represents a single bond, a divalent hydrocarbon group which may have an ether moiety or a divalent polyether group which may have a substituent; and $R^3$ represents a polycarbonate residue or a polyester residue.

<2> The electrophotographic photoreceptor according to <1>, wherein the polymer has a structure represented by Formula (2):

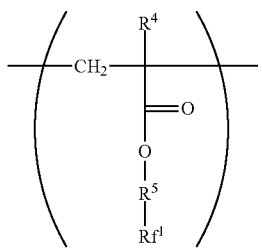

Formula (2)

wherein in the Formula (2), $R^4$ represents a hydrogen atom or a methyl group; $R^5$ represents a single bond or a divalent hydrocarbon group which may have an ether moiety; and $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3):

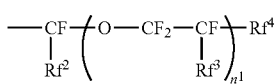

Formula (3)

wherein in the Formula (3), $Rf^2$ and $Rf^3$ each independently represent a fluorine atom or a trifluoromethyl group; $Rf^4$ represents a linear perfluoroalkyl group having 1 to 6 carbon atoms or a branched chain perfluoroalkyl group having 1 to 6 carbon atoms; and $n^1$ represents an integer of 1 to 3.

<3> The electrophotographic photoreceptor according to <2>, wherein the structure represented by Formula (2) is a structure represented by Formula (4):

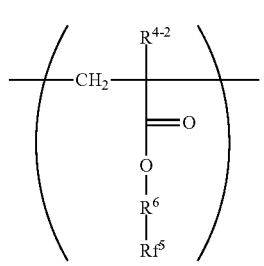

Formula (4)

wherein in the Formula (4), $R^{4-2}$ represents a hydrogen atom or a methyl group; $R^6$ represents a divalent group represented by $-(CH^2)n^4-$; $n^4$ represents an integer of 1 to 4; and $Rf^5$ represents a linear perfluoroalkyl group having 2 to 6 carbon atoms.

<4>
The electrophotographic photoreceptor according to any one of <1> to <3>, wherein $R^3$ in the structure represented by Formula (1) has a structure represented by Formula (5):

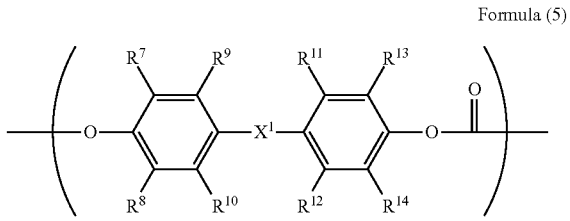

Formula (5)

wherein in the Formula (5), $R^7$ to $R^{14}$ are each independently represents a hydrogen atom, an alkyl group having 1 to 20 carbon atoms which may have a substituent, an alkoxy group, and an aromatic group or a halogen group which may be substituted; $X^1$ represents a single bond, $-CR^{15}R^{16}-$, an oxygen atom, CO or a sulfur atom; and $R^{15}$ and $R^{16}$ each independently represents a hydrogen atom, an alkyl group having 1 to 10 carbon atoms, an aromatic group having 6 to 12 carbon atoms, or $R^{15}$ and $R^{16}$ represent a cycloalkylidene group having 5 to 10 carbon atoms which may have a substituent, and is formed by combining $R^{15}$ and $R^{16}$.

<5> The electrophotographic photoreceptor according to any one of <1> to <3>, wherein $R^3$ in the structure represented by Formula (1) has a structure represented by Formula (6):

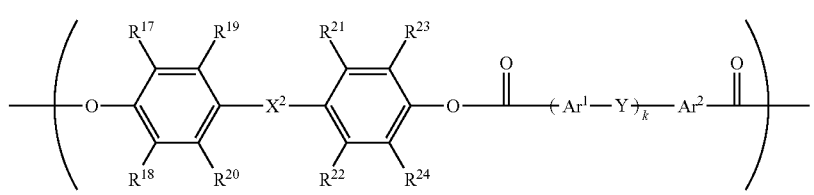

Formula (6)

wherein in the Formula (6), $R^{17}$ to $R^{24}$ each independently represents a hydrogen atom, an alkyl group having 1 to 20 carbon atoms which may have a substituent, an alkoxy group, and an aromatic group or a halogen group which may be substituted; $X^2$ represents a single bond, $-CR^{25}R^{26}-$, an oxygen atom, CO or a sulfur atom; $R^{25}$ and $R^{26}$ each independently represents a hydrogen atom, an alkyl group having 1 to 10 carbon atoms, an aromatic group having 6 to 12 carbon atoms, or $R^{25}$ and $R^{26}$ represent a cycloalkylidene group having 5 to 10 carbon atoms which may have a substituent, and is formed by combining $R^{25}$ and $R^{26}$; $Ar^1$ and $Ar^2$ each independently represents an amylene group or a cyclohexylene group which may have a substituent; Y represents a single bond, an oxygen atom, or a sulfur atom; and k represents an integer of to 1.

<6> The electrophotographic photoreceptor according to any one of <2> to <5>,
wherein in a polymer having the structure represented by the Formula (1) and the structure represented by the Formula (2), a content of the structure represented by the Formula (1) is 20% by mass to 70% by mass.

<7> The electrophotographic photoreceptor according to any one of <2> to <6>,
wherein a weight average molecular weight of the polymer having the structure represented by Formula (1) and the structure represented by Formula (2) is 5,000 to 100,000.

<8> The electrophotographic photoreceptor according to any one of <1> to <7>,
wherein a content of the polymer having the structure represented by Formula (1) is 0.5 parts by mass to 20 parts by mass with respect to 100 parts by mass of fluororesin.

<9> The electrophotographic photoreceptor according to any one of <2> to <8>,
wherein the photosensitive layer further contains a binder resin in addition to the polymer having the structure represented by the Formula (1) and the structure represented by the Formula (2) and the fluororesin, and a content of the fluororesin is 1 parts by mass to 30 parts by mass with respect to 100 parts by mass of the binder resin.

<10> The electrophotographic photoreceptor according to any one of <1> to <9>,
wherein an average primary particle diameter of the fluororesin is 0.1 µm to 1.0 µm.

<11> An electrophotographic photoreceptor cartridge comprising the electrophotographic photoreceptor according to any one of <1> to <10>.

<12> An image forming apparatus comprising the electrophotographic photoreceptor according to any one of <1> to <10>.

<13> A dispersant for fluororesin comprising a polymer having a repeating structural unit represented by Formula (1):

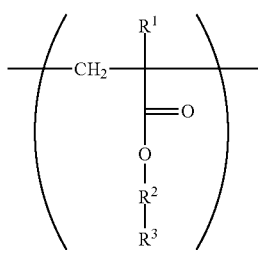

Formula (1)

wherein in the Formula (1), $R^1$ represents a hydrogen atom or a methyl group; $R^2$ represents a single bond, a divalent hydrocarbon group which may have an ether moiety or a divalent polyether group which may have a substituent; and $R^3$ represents a polycarbonate residue or a polyester residue.

<14> The dispersant for fluororesin according to <13>,
wherein the polymer has a structural unit represented by Formula (2):

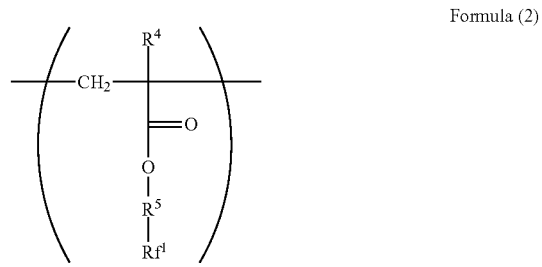

Formula (2)

wherein in the Formula (2), $R^4$ represents a hydrogen atom or a methyl group; $R^5$ represents a single bond or a divalent hydrocarbon group which may have an ether moiety; and $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3):

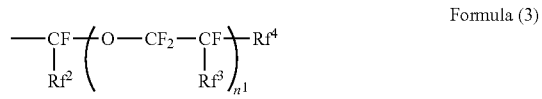

Formula (3)

wherein in the Formula (3), $Rf^2$ and $Rf^3$ each independently represents a fluorine atom or a trifluoromethyl group; $Rf^4$ represents a linear perfluoroalkyl group having 1 to 6 carbon atoms or a branched chain perfluoroalkyl group having 1 to 6 carbon atoms; and $n^1$ represents an integer of 1 to 3.

The dispersant for fluororesin is excellent in the solubility for an organic solvent and excellent in the dispersibility of the fluororesin particle. In addition, it has good electrical properties and is also excellent in compatibility with the binder resin used for a photoreceptor. Although the reason for improving the dispersibility is not clear, it is considered that when a polycarbonate resin or a polyester resin skeleton which is relatively excellent in the solubility of an organic solvent is contained in the dispersant, the dispersant exhibits high dispersibility in the organic solvent.

In addition, the polycarbonate resin and the polyester resin to be used as a skeleton of a dispersant are widely used as a binder resin of a photoreceptor due to good electrical properties, and by using this polycarbonate or polyester skeleton as a dispersant, excellent electrical properties and compatibility with the binder resin can be obtained.

Effects of Invention

According to the invention, it is possible to provide an electrophotographic photoreceptor which is excellent in abrasion resistance and electrical properties by using a fluororesin, and has a long life span, an electrophotographic photoreceptor cartridge including the electrophotographic photoreceptor, an image forming apparatus, and a dispersant which is excellent in dispersibility of a fluororesin particle, the electrical properties, and the compatibility with a binder resin.

DESCRIPTION OF EMBODIMENTS

Figure 1:
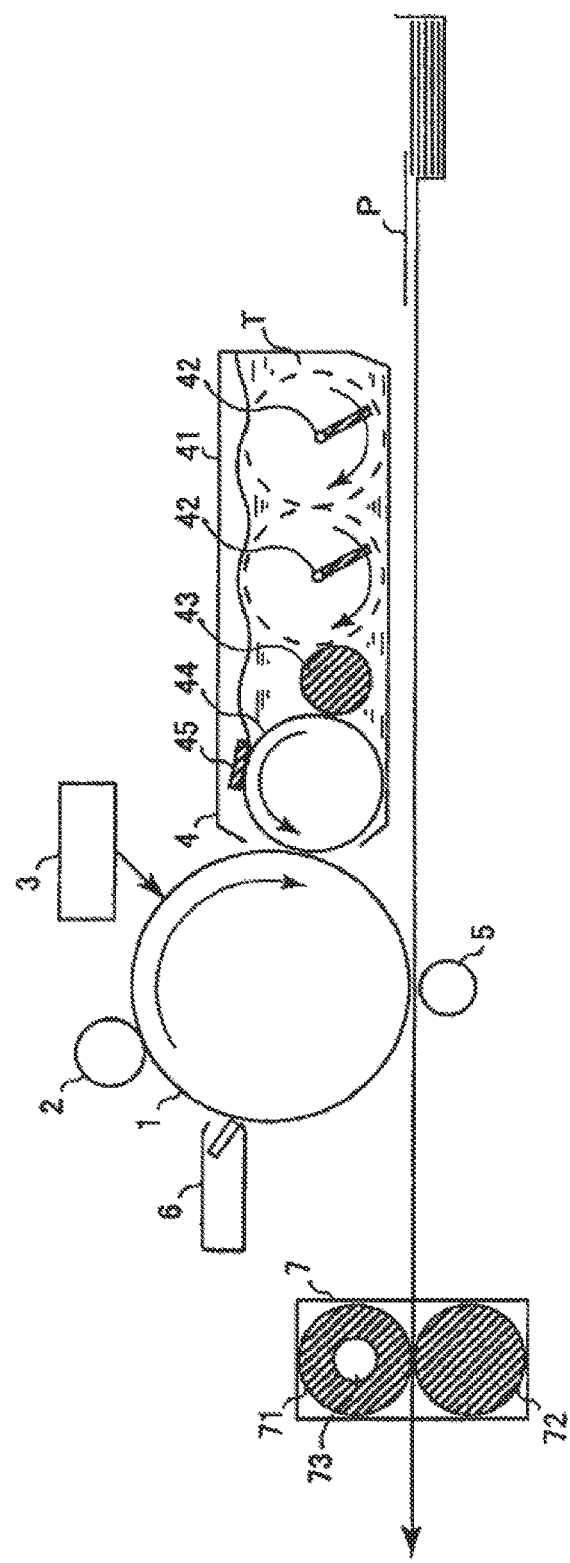
FIG. 1 is a conceptual view illustrating an example of an image forming apparatus using an electrophotographic photoreceptor of the invention.

Embodiments for carrying out the invention will be described in detail below. Note that the invention is not limited to the following embodiments, and various modifications can be made within the scope of the gist thereof.
<<Dispersant for Fluororesin>>

The dispersant for fluororesin to which this embodiment is applied contains a polymer having a repeating structural unit represented by Formula (1). The dispersant for fluororesin may contain a structure derived from a polymeric monomer formed of other resins and a structure derived from a low molecular monomer, or may be formed of only a polymer having a repeating structural unit represented by Formula (1).

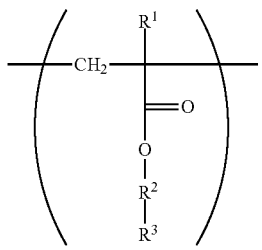

Formula (1)

In the Formula (1), $R^1$ represents a hydrogen atom or a methyl group. $R^2$ represents a single bond, a divalent hydrocarbon group which may have an ether moiety or a divalent polyether group which may have a substituent. $R^3$ represents a polycarbonate residue or a polyester residue.

$R^1$ is preferably a hydrogen atom from the viewpoint of reactivity during polymerization.

Examples of the divalent hydrocarbon group which may have an ether moiety of the $R^2$ include a linear, branched, or alicyclic hydrocarbon group. Examples of the linear group include an alkylene group having 1 to 6 carbon atoms such as methylene and ethylene, examples of the branched group include an alkylene group having 3 to 10 carbon atoms such as methyl ethylene, methyl propylene, and dimethyl propylene, and examples of the alicyclic group include an alkylene group having 5 to 15 carbon atoms such as cyclohexylene and 1,4-dimethyl cyclohexylene. From the viewpoint of the stability and reactivity of (meth)acrylate as a base of the structure, a linear alkylene group is preferable, and from the viewpoint of production convenience, an alkylene group having 1 to 3 carbon atoms is particularly preferable.

Examples of the divalent hydrocarbon group which may have an ether moiety of the $R^2$ include a structure represented by Formula (11).

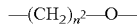

$$—(CH_2)_{n^2}—O—$$ Formula (11)

In the Formula (11), $n^2$ represents an integer of 1 to 6. $n^2$ is preferably an integer of 2 to 4 from the viewpoint of the reactivity.

Examples of the divalent polyether group which may have a substituent of the $R^2$ include a structure represented by Formula (9).

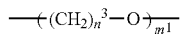

$$—(\!(CH_2)_{n^3}\!—\!O\!)_{\overline{m^1}}\!—$$ Formula (9)

In the Formula (9), $n^3$ represents an integer of 1 to 4, and $m^1$ represents an integer of 1 to 20. Specific examples of Formula (9) include a diethylene glycol residue, a triethylene glycol residue, a tetraethylene glycol residue, a polyethylene glycol residue, a dipropylene glycol residue, a tripropylene glycol residue, a tetrapropylene glycol residue, a polypropylene glycol residue, a ditetramethylene glycol residue, a tritetramethylene glycol residue, a tetratetramethylene glycol residue, and a polytetramethylene glycol residue.

Among these, examples of the divalent polyether group which may have a substituent of the $R^2$ include a polypropylene glycol residue and a polytetramethylene glycol residue from the viewpoint of the electrical properties.

The polycarbonate residue in the $R^3$ preferably has a repeating structure represented by Formula (5).

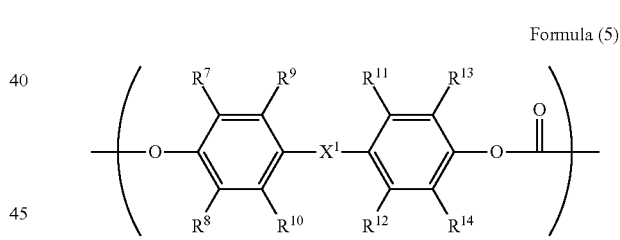

Formula (5)

In the Formula (5), $R^7$ to $R^{14}$ are each independently represent a hydrogen atom, an alkyl group having 1 to 20 carbon atoms which may have a substituent, an alkoxy group, and an aromatic group or a halogen group which may be substituted, $X^1$ represents a single bond, $—CR^{15}R^{16}—$, an oxygen atom, CO or a sulfur atom. In addition, $R^{15}$ and $R^{16}$ each independently represent a hydrogen atom, an alkyl group having 1 to 10 carbon atoms, an aromatic group having 6 to 12 carbon atoms, or $R^{15}$ and $R^{16}$ each represent a cycloalkylidene group having 5 to 10 carbon atoms which may have a substituent, and is formed by combining $R^{15}$ and $R^{16}$.

Specific examples of the alkyl group having 1 to 20 carbon atoms which may have a substituent of $R^7$ to $R^{14}$ include a methyl group, an ethyl group, a propyl group, an isopropyl group, a butyl group, a tert-butyl group, and a cyclohexyl group.

Specific examples of the alkoxy group include a methoxy group, an ethoxy group, a propoxy group, and a cyclohexoxy group.

Examples of the aromatic group which may be substituted include a phenyl group, a methyl phenyl group, a dimethyl phenyl group, and a halogenated phenyl group.

Examples of the halogen group include a fluorine group, a chloro group, anal a bromo group.

From the viewpoint of convenience in producing and the abrasion resistance, an alkyl group having 1 to 6 carbon atoms and an alkoxyl group having 1 to 6 carbon atoms are preferable, and a methyl group is particularly preferable.

$X^1$ is preferably a single bond or —$CR^{15}R^{16}$— from the viewpoint of the reactivity during radical polymerization, and —$CR^{15}R^{16}$— is preferable from the viewpoint of the solubility.

Specific examples of the of an alkyl group having 1 to 10 carbon atoms of $R^{15}$ and $R^{16}$ include a methyl group, an ethyl group, a propyl group, an isopropyl group, a butyl group, and an isobutyl group. From the viewpoint of the solubility, the abrasion resistance, and the convenience in producing, a methyl group and an ethyl group are preferable.

Specific examples of the aromatic group having 6 to 12 carbon atoms include a phenyl group, a methyl phenyl group, and a naphthyl group. From the viewpoint of the solubility, a phenyl group is preferable.

In addition, examples of the cycloalkylidene group having 5 to 10 carbon atoms formed by combining $R^{15}$ and $R^{16}$, a cyclopentylidene group, a cyclohexylidene group, and a cycloheptylidene group are preferable.

Specific examples of the divalent phenol as the base of the divalent phenol residue of the structural unit represented by Formula (5) include bis-(4-hydroxyphenyl) methane, bis-(4-hydroxy-3-methyl phenyl) methane, bis-(3,5-dimethyl-4-hydroxyphenyl) methane, 1,1-bis-(4-hydroxyphenyl) ethane, 1,1-bis-(4-hydroxy-3-methyl phenyl) ethane, 1-bis-(3,5-dimethyl-4-hydroxyphenyl) ethane, 1,1-bis-(4-hydroxyphenyl) propane, 1,1-bis-(4-hydroxy-3-methyl phenyl) propane, 1,1-bis-(3,5-dimethyl-4-hydroxyphenyl) propane, 2,2-bis-(4-hydroxyphenyl) propane, 2,2-bis-(4-hydroxy-3-methyl phenyl) propane, 2,2-bis-(3,5-dimethyl-4-hydroxyphenyl) propane, 1,1-bis-(4-hydroxyphenyl) cyclohexane, 1,1-bis-(4-hydroxy-3-methyl phenyl) cyclohexane, 1,1-bis-(3,5-dimethyl-4-hydroxyphenyl) cyclohexane, bis-(4-hydroxyphenyl) phenylmethane, 1,1-bis-(4-hydroxyphenyl)-1-phenylethane, 4,4'-biphenol, 3,3'-dimethyl-4,4'-biphenol, 3,3',5,5'-tetramethyl-4,4'-biphenol, 4,4'-dihydroxydiphenyl ether, 3,3'-dimethyl-4,4'-dihydroxydiphenyl ether, bis(4-hydroxyphenyl) sulfide, and 4,4'-dihydroxybenzophenone.

Among these, in consideration of easiness of production and the solubility of the divalent phenol component, bis-(4-hydroxyphenyl) methane, bis-(4-hydroxy-3-methyl phenyl) methane, bis-(3,5-dimethyl-4-hydroxyphenyl) methane, 1,1-bis-(4-hydroxyphenyl) ethane, 1,1-bis-(4-hydroxy-3-methyl phenyl) ethane, 2,2-bis-(4-hydroxyphenyl) propane, 2,2-bis-(4-hydroxy-3-methyl phenyl) propane, 2,2-bis-(3,5-dimethyl-4-hydroxyphenyl) propane, 1,1-bis-(4-hydroxyphe- nyl) cyclohexane, 1,1-bis-(4-hydroxyphenyl)-1-phenylethane, 4,4'-biphenol, 3,3'-dimethyl-4,4'-biphenol, 3,3',5,5'-tetramethyl-4,4'-biphenol, and 4,4'-dihydroxydiphenyl ether are preferable. Further, from the viewpoint of the affinity with the organic solvent, bis-(4-hydroxyphenyl) methane, bis-(4-hydroxy-3-methyl phenyl) methane, 1,1-bis-(4-hydroxyphenyl) ethane, 1,1-bis-(4-hydroxy-3-methyl phenyl) ethane, 2,2-bis-(4-hydroxy-3-methyl phenyl) propane, 4,4'-biphenol, 1,1-bis-(4-hydroxyphenyl) cyclohexane, and 1,1-bis-(4-hydroxyphenyl)-1-phenylethane.

The content of the repeating structural unit represented by Formula (5) is preferably 80% by mol or more with respect to the entire polycarbonate residue, and from the viewpoint of compatibility with other resins in forming a soluble coating film, it is more preferably 90% by mol or more.

The amount of the chloroformate group present at the terminal of the polycarbonate residue is generally 0.1 μeq/g or less, and is preferably 0.05 μeq/g or less. When the amount of the terminal chloroformate group exceeds the above range, the storage stability when formed into a coating solution tends to decrease.

The amount of the OH group present at the terminal of the polycarbonate residue is generally 50 μeq/g or less, and is preferably 20 μeq/g or less. When the amount of the terminal OH group exceeds the above range, there is a possibility that the reactivity of radical polymerization is deteriorated or the electrical properties are deteriorated.

The polyester residue in the $R^3$ preferably has a repeating structure represented by Formula (6).

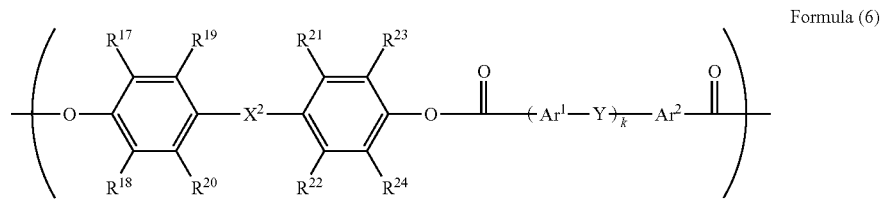

Formula (6)

In Formula (6), $R^{17}$ to $R^{24}$ are each independently represent a hydrogen atom, an alkyl group having 1 to 20 carbon atoms which may have a substituent, ala alkoxy group, and an aromatic group or a halogen group which may be substituted. $X^2$ represents a single bond, —$CR^{25}R^{26}$—, an oxygen atom, CO or a sulfur atom. In addition, $R^{25}$ and $R^{26}$ each independently represent a hydrogen atom, an alkyl group having 1 to 10 carbon atoms, an aromatic group having 6 to 12 carbon atoms, or $R^{25}$ and $R^{26}$ each represent a cycloalkylidene group having 5 to 10 carbon atoms which may have a substituent, and is formed by combining $R^2$ and $R^{26}$. $Ar^1$ and $Ar^2$ each independently represent an arylene group or a cyclohexylene group which may have a substituent. Y represents a single bond, an oxygen atom, or a sulfur atom. k represents an integer of 0 to 1.

Specific examples of $R^{17}$ to $R^{24}$ include those equivalent to the above $R^7$ to $R^{t4}$. A preferable range of $X^2$ is the same as the above-described $X^1$. $R^{25}$ and $R^{26}$ are the same as those of $R^{15}$ and $R^{16}$. Specific examples of the divalent phenol of a base of the divalent phenol residue having a structural unit represented by Formula (6) include the same one as the divalent phenol represented by Formula (5).

In Formula (6), $Ar^1$ and $Ar^2$ are preferably an arylene group having 6 to 20 carbon atoms or a cyclohexylene group, and examples thereof include a phenylene group, a naphthylene group, an anthrylene group, a phenanthrylene group, a pyrenylene group, and a cyclohexylene group. Among them, a phenylene group, a naphthylene group, a biphenylene group and a cyclohexylene group are more preferable from the viewpoint of production cost. From the viewpoint of easiness of production, $Ar^1$ and $Ar^2$ are preferably the same arylene groups having the same substituents.

Examples of the substituent each of which the arylene group may have independently include a hydrogen atom, an alkyl group, an alkoxy group, an aryl group, a condensed polycyclic group, and a halogen group. In consideration of the solubility with respect to an organic solvent, as the aryl group, a phenyl group or a naphthyl group is preferable, as the halogen group, a fluorine atom, a chlorine atom, a bromine atom or an iodine atom is preferable, as the alkoxy group, a methoxy group, an ethoxy group, or a butoxy group is preferable, as the alkyl group, an alkyl group having 1 to 10 carbon atoms is preferable, an alkyl group having 1 to 8 carbon atoms is more preferable, an alkyl group having 1 to 2 carbon atoms is particularly preferable, and a methyl group is specifically preferable. The number of substituents in $Ar^1$ and $Ar^2$ is not particularly limited, but is preferably 3 or less, is more preferably 2 or less, and is particularly preferably 1 or less.

In Formula (6), Y is a single bond, an oxygen atom, or a sulfur atom, from the viewpoint of the solubility with respect to the organic solvent, an oxygen atom is preferable.

In Formula (6), k is an integer of 0 to 1.

In a case where k is 0, specific examples of the divalent carboxylic acid compound which induces a divalent carboxylic acid residue include terephthalic acid and isophthalic acid. In a case where k is 1, specific examples of the divalent carboxylic acid compound which induces a divalent carboxylic acid residue include diphenyl ether-2,2'-dicarboxylic acid, diphenyl ether-2,4'-dicarboxylic acid, and diphenyl ether-4,4'-dicarboxylic acid. Among these, in consideration of convenience in producing, diphenyl ether-4,4'-dicarboxylic acid is particularly preferable.

A compound exemplified as the divalent carboxylic acid compound which induces a divalent carboxylic acid residue can be used by combining a plurality of compounds as necessary. Specific examples of the divalent carboxylic acid which may be combined include adipic acid, suberic acid, sebacic acid, phthalic acid, isophthalic acid, terephthalic acid, toluene-2,5-dicarboxylic acid, p-xylene-2,5-dicarboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, naphthalene-1,4-dicarboxylic acid, naphthalene-2,3-dicarboxylic acid, naphthalene-2,6-dicarboxylic acid, biphenyl-2,2'-dicarboxylic acid, biphenyl-4,4'-dicarboxylic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid, and diphenyl ether-4,4'-dicarboxylic acid. In consideration of easiness of production of the dicarboxylic acid component, isophthalic acid, terephthalic acid, and diphenyl ether-4,4'-dicarboxylic acid are particularly preferable.

The amount of the carboxylic acid chloride group present at the terminal of the polyester residue is generally 0.1 µeq/g or less, and is preferably 0.05 µeq/g or less. The carboxyl acid value of the polyester residue is preferably 300 µeq/g or less, and is more preferably 150 µeq/g or less. The amount of the group present at the terminal of the polyester residue is generally 100 µeq/g or less, and is preferably 50 µeq/g or less.

The total nitrogen content (T-N amount) contained in polycarbonate residue or polyester residue is preferably 500 ppm or less, is more preferably 300 ppm or less, and is particularly preferably 100 ppm or less.

The weight average molecular weight (Mw) of the polycarbonate residue or the polyester residue is generally 5,000 or more, is preferably 8,000 or more, and is more preferably 10,000 or more from the viewpoint of the solubility of the dispersant for fluororesin. In addition, from the viewpoint of the dispersibility of the fluororesin, it is generally 100,000 or less, and is preferably 50,000 or less.

In the dispersant for fluororesin, the content of at least one of polycarbonate residue and the polyester residue is preferably 10% by mass or more, and from the viewpoint of the solubility to the solvent, it is more preferably 30% by mass or more, and is still more preferably 50% by mass or more. On the other hand, it is preferably 80% by mass or less, and from the viewpoint of the dispersibility of the fluororesin, it is more preferably 70% by mass or less.

In addition, a polymer having a repeating structural unit represented by Formula (1) preferably has a structural unit represented by Formula (2).

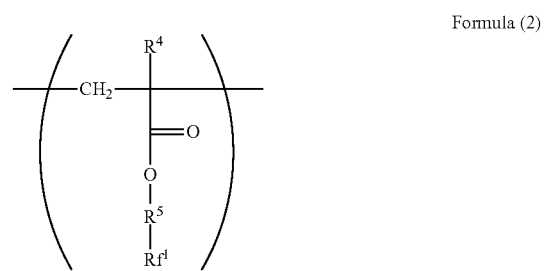

Formula (2)

In Formula (2), $R^4$ represents a hydrogen atom or a methyl group. $R^5$ represents a single bond or a divalent hydrocarbon group which may have an ether moiety. $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3).

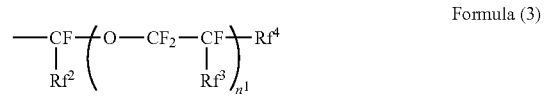

Formula (3)

In Formula (3), $Rf^2$ and $Rf^3$ each independently represent a fluorine atom or a trifluoromethyl group. $Rf^4$ represents a linear perfluoroalkyl group having 1 to 6 carbon atoms or a branched chain perfluoroalkyl group having 1 to 6 carbon atoms. $n^1$ represents an integer of 1 to 3.

$R^4$ is preferable a hydrogen atom from the viewpoint of reactivity during polymerization.

The divalent hydrocarbon group which may have an ether moiety of the $R^5$ is the same as a divalent hydrocarbon group which may have an ether moiety of the $R^2$. In $R^5$, a divalent hydrocarbon group which may have an ether moiety is preferable, and a divalent hydrocarbon group is more preferable.

Specific examples of the perfluoroalkyl group having 2 to 6 carbon atoms of the $Rf^1$ include a perfluoroethyl group, a perfluoropropyl group, a perfluorobutyl group, a perfluoropentyl group, a perfluorohexyl group, a perfluoroiso-propyl group, a perfluoroiso-butyl group, a perfluoro-tert-butyl group, a perfluoro-sec-butyl group, a perfluoroiso-pentyl group, a perfluoroiso-hexyl group, a perfluorocyclopentyl group, and a perfluorocyclohexyl group. Among these, from the dispersibility of the fluororesin particle, a perfluorobutyl group, a perfluoropentyl group, and a perfluorohexyl group are preferable.

From the viewpoint of simplicity of synthesis, $Rf^2$ and $Rf^3$ are preferably a trifluoromethyl group.

Specific examples of the perfluoroalkyl group having 1 to 6 carbon atoms of the $Rf^4$ include a perfluoromethyl group, a perfluoroethyl group, a perfluoropropyl group, a perfluorobutyl group, a perfluoropentyl group, a perfluorohexyl group, a perfluoroiso-propyl group, a perfluoroiso-butyl group, a perfluoro-tert-butyl group, a perfluoro-sec-butyl group, a perfluoroiso-pentyl group, and a perfluoroiso-hexyl group. Among these, from the viewpoint of the dispersibility of the fluororesin particle, a perfluoromethyl group, a perfluoroethyl group, a perfluoropropyl group, and a perfluorobutyl group are preferable.

From the viewpoint of the solubility with respect to the solvent during polymer synthesis, $n^1$ is preferably 1 or 2.

A (meth)acrylate monomer which is a base of the repeating structural unit represented by Formula (2) is represented by Formula (8).

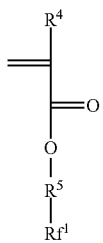

Formula (8)

In Formula (8), $R^4$, $R^5$, and $Rf^1$ are defined as described above.

Specific examples of the (meth)acrylate monomer represented by Formula (8) include perfluoroethyl (meth)acrylate, perfluoropropyl (meth)acrylate, perfluorobutyl (meth)acrylate, perfluoropentyl (meth)acrylate, perfluorohexyl (meth)acrylate, perfluoroiso-propyl (meth)acrylate, perfluoroiso-butyl (meth)acrylate, perfluorotert-butyl (meth)acrylate, perfluorosec-butyl (meth)acrylate, perfluoroiso-pentyl (meth)acrylate, perfluoroiso-hexyl (meth)acrylate, perfluorocyclopentyl (meth)acrylate, perfluorocyclohexyl (meth)acrylate, (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, (perfluoroiso-propyl) methyl (meth)acrylate, (perfluoroiso-butyl) methyl (meth)acrylate, (perfluorotert-butyl) methyl (meth)acrylate, (perfluorosec-butyl) methyl (meth)acrylate, (perfluoroiso-pentyl) methyl (meth)acrylate, (perfluoroiso-hexyl) methyl (meth)acrylate, (perfluorocyclopentyl) methyl (meth)acrylate, (perfluorocyclohexyl) methyl (meth)acrylate, 2-(perfluoroethyl) ethyl (meth)acrylate, 2-(perfluoropropyl) ethyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 2-(perfluoroiso-propyl) ethyl (meth) acrylate, 2-(perfluoroiso-butyl) ethyl (meth)acrylate, 2-(perfluorotert-butyl) ethyl (meth)acrylate, 2-(perfluorosec-butyl) ethyl (meth)acrylate, 2-(perfluoroiso-pentyl) ethyl (meth) acrylate, 2-(perfluoroiso-hexyl) ethyl (meth)acrylate, 2-(perfluorocyclopentyl) ethyl (meth)acrylate, 2-(perfluorocyclohexyl) ethyl (meth)acrylate, 3-(perfluoroethyl) propyl (meth)acrylate, 3-(perfluoropropyl) propyl (meth)acrylate, 3-(perfluorobutyl) propyl (meth)acrylate, 3-(perfluoropentyl) propyl (meth)acrylate, 3-(perfluorohexyl) propyl (meth) acrylate, 3-(perfluoroiso-propyl) propyl (meth)acrylate, 3-(perfluoroiso-butyl) propyl (meth)acrylate, 3-(perfluorotert-butyl) propyl (meth)acrylate, 3-(perfluorosec-butyl) propyl (meth)acrylate, 3-(perfluoroiso-pentyl) propyl (meth) acrylate, 3-(perfluoroiso-hexyl) propyl (meth)acrylate, 3-(perfluorocyclopentyl) propyl (meth)acrylate, 3-(perfluorocyclohexyl) propyl (meth)acrylate, 4-(perfluoroethyl) butyl (meth)acrylate, 4-(perfluoropropyl) butyl (meth)acrylate, 4-(perfluorobutyl) butyl (meth)acrylate, 4-(perfluoropentyl) butyl (meth)acrylate, 4-(perfluorohexyl) butyl (meth)acrylate, 4-(perfluoroiso-propyl) butyl (meth)acrylate, 4-(perfluoroisobutyl) butyl (meth)acrylate, 4-(perfluorotert-butyl) butyl (meth)acrylate, 4-(perfluorosec-butyl) butyl(meth)acrylate, 4-(perfluoroiso-pentyl) butyl (meth) acrylate, 4-(perfluoroiso-hexyl) butyl (meth)acrylate, 4-(perfluorocyclopentyl) butyl (meth)acrylate, 4-(perfluorocyclohexyl) butyl (meth)acrylate, and (meth)acrylate as follows. In addition, the structural formula is as represented as below.

Note that, in the present specification (meth)acrylate is a generic name of acrylate and methacrylate. The same is true for (meth)acrylic acid and (meth)acrylamide.

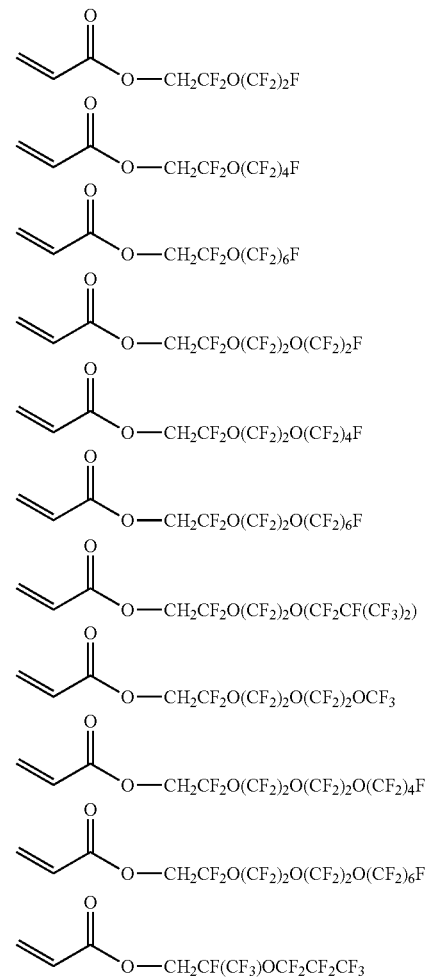

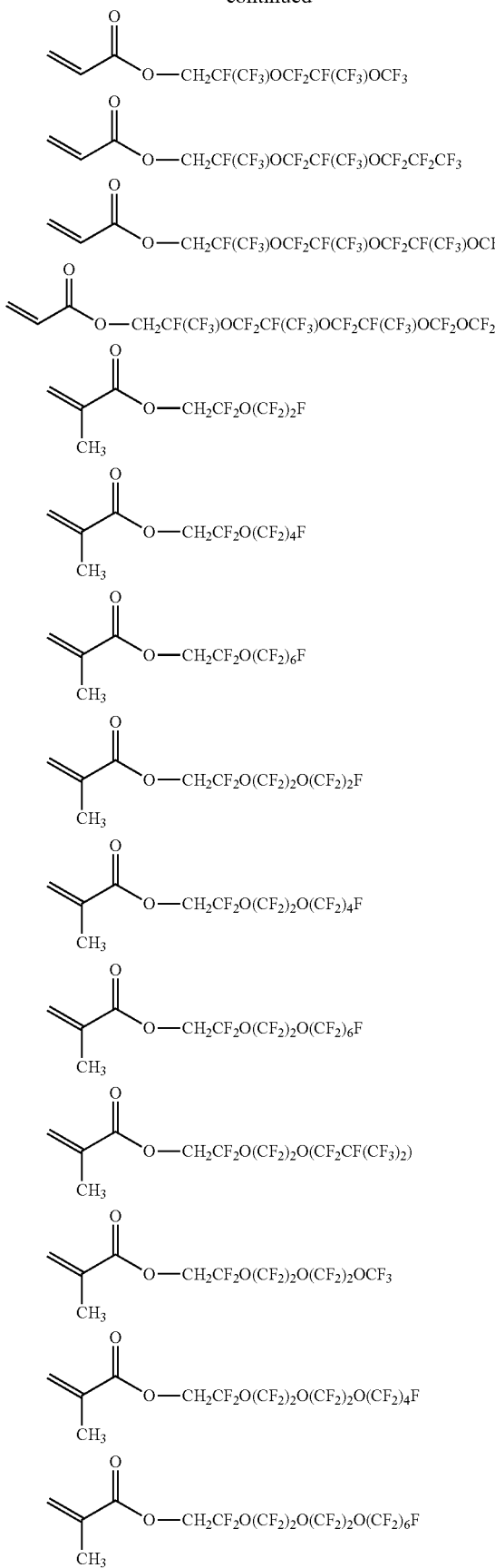
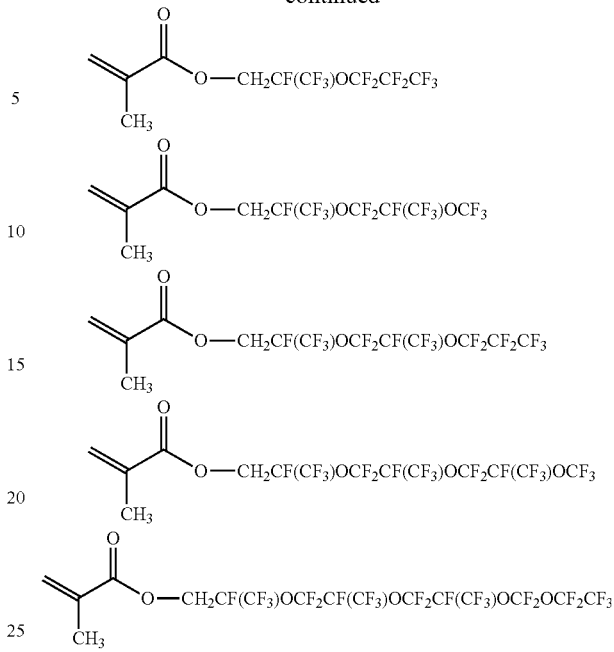

Among these, from the viewpoint of the stability and the easiness of production of (meth)acrylate, (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, 2-(perfluoroethyl) ethyl (meth)acrylate, 2-(perfluoropropyl) ethyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 3-(perfluoroethyl) propyl (meth)acrylate, 3-(perfluoropropyl) propyl (meth)acrylate, 3-(perfluorobutyl) propyl (meth)acrylate, 3-(perfluoropentyl) propyl (meth)acrylate, and 3-(perfluorohexyl) propyl (meth)acrylate. Further, from the viewpoint of the dispersibility of the fluororesin, (perfluorobutyl) methyl (meth)acrylate, (perfluoropentyl) methyl (meth)acrylate, (perfluorohexyl) methyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 3-(perfluorobutyl) propyl (meth)acrylate, 3-(perfluoropentyl) propyl (meth)acrylate, and 3-(perfluorohexyl) propyl (meth)acrylate are particularly preferable.

A compound exemplified as a (meth)acrylate monomer which is a base of the repeating structural unit represented by Formula (2) can be used in combination of a plurality of compounds as necessary.

From the viewpoint of the dispersibility of the fluororesin, the content of the repeating structural unit represented by Formula (1) in the dispersant for fluororesin is preferably 20% by mass or more, and from the storage stability of the dispersant, it is more preferably 30% by mass or more. On the other hand, from the viewpoint of the solubility with respect to the organic solvent, it is preferably 70% by mass or less, and from the viewpoint of the dispersibility, it is more preferably 60% by mass or less.

From the viewpoint of the dispersibility of the fluororesin, the weight average molecular weight of the dispersant for fluororesin is preferably 5,000 or less, and is more preferably 10,000 or more. On the other hand, from the viewpoint of the compatibility with other resins at the time of making a coating film, it is preferably 100,000 or less, and from the viewpoint of the dispersibility of the fluororesin, it is more preferably 80,000 or less, and is still more preferably 50,000 or less. Note that, the weight average molecular weight in the present specification means a weight average molecular weight by gel permeation chromatography (GPC) using polystyrene as a reference substance.

The dispersant for fluororesin of the invention may be polymerized with other monomers. Examples of other monomers include a (meth)acrylic acid monomer, a (meth) acrylate monomer, a macromonomer having a (meth)acrylate group or a 2-(alkoxycarbonyl) allyl group at the terminal of a polymer such as polymethyl methacrylate resin (PMMA) or polystyrene, a (meth)acrylamide monomer, an aromatic vinyl monomer, a linear or cyclic alkyl vinyl ether monomer having 1 to 12 carbon atoms, and a vinyl ester monomer. As other monomers, from the viewpoint of the solubility to the organic solvent, a (meth)acrylate monomer and an aromatic vinyl monomer are preferable. The content of other monomers is preferably 30% by mass or less in the dispersant for fluororesin, and is more preferably 20% by mass or less from the viewpoint of the dispersibility of the fluororesin.

Specific examples of the (meth)acrylate monomer include methyl (meth)acrylate, ethyl (meth)acrylate, n-butyl (meth) acrylate, tert-butyl (meth)acrylate, benzyl (meth)acrylate, phenyl (meth)acrylate, tetrahydrofurfuryl (meth)acrylate, 2-phenoxyethyl (meth)acrylate, and isobornyl (meth)acrylate. From the viewpoint of the dispersibility of the fluororesin, n-butyl (meth)acrylate, tert-butyl (meth)acrylate, benzyl (meth)acrylate, tetrahydrofurfuryl (meth)acrylate, and isobornyl (meth)acrylate are preferable.

<<Method of Preparing Dispersant for Fluororesin>>

The method of preparing the dispersant for fluororesin of the invention is not particularly limited. For example, the dispersant for fluororesin can be obtained by using a method of radically polymerizing a (meth)acrylate monomer and at least one of a polycarbonate resin and a polyester resin which have a radically polymerizable functional group, and a method of polymerizing with at least one of a polycarbonate resin and a polyester resin using a (meth)acrylate oligomer having a hydroxyl group or an amino group, or the like.

From the viewpoint of using highly reactive radical polymerization at the final stage of the production of the polymer in the above preparing method, the method of radically polymerizing a (meth)acrylate monomer and at least one of a polycarbonate resin and a polyester resin having a radically polymerizable functional group is efficient, and is a preferable method from the viewpoint of the solubility of the intermediate.

<A. Preparing Method of Radical Polymerization of (Meth) Acrylate Monomer and at Least One of Polycarbonate Resin Having Radically Polymerizable Functional Group and Polyester Resin>

In the preparing method by radical polymerization, reactive substances such as the (meth)acrylate monomer represented by the above formula (I), at least one of the polycarbonate resin and a polyester resin having a radically polymerizable functional group are dissolved in an organic solvent, and a thermal polymerization initiator is added and heated in a temperature range of 50° C. to 200° C. for polymerization, and thereby a desired polymer can be obtained.

Examples of the preparing method for the polymerization reaction include a method of preparing all of the raw materials collectively, a method of continuously supplying at least one raw material such as an initiator into a reactor, and a method of continuously supplying all the raw materials and continuously extracting them from the reactor at the same time. The (meth)acrylate monomer preferably has a structure represented by Formula (8).

As to at least one of the polycarbonate resin and the polyester resin, resins described in the following <Reactive group-containing polycarbonate resin or polyester resin> can be used. That is, the polycarbonate resin having a radical reactive group preferably has the structure represented by Formula (5), and the polyester resin having a radical reactive group preferably has the structure represented by Formula (6).

The solvent used for the radical polymerization is not particularly limited, and specific examples thereof include alcohols such as methanol, ethanol, propanol, and 2-methoxyethanol, ethers such as tetrahydrofuran, 1,4-dioxane, dimethoxyethane, and anisole, esters such as methyl formate, ethyl acetate, and butyl acetate, ketones such as acetone, methyl ethyl ketone, methyl isobutyl ketone, and cyclohexanone, aromatic hydrocarbons such as benzene, toluene and xylene, aprotic polar solvents such as N-methyl pyrrolidone, N,N-dimethyl formamide and dimethyl sulfoxide.

Among these solvents, from the viewpoint of the solubility of the dispersant for fluororesin of the invention, toluene, xylene, anisole, dimethoxyethane, tetrahydrofuran, 1,4-dioxane, butyl acetate, methyl isobutyl ketone, cyclohexanone, and N,N-dimethyl formamide are preferable, and from the viewpoint of the solubility of the polycarbonate resin or the polyester resin which is a raw material, toluene, anisole, dimethoxyethane, cyclohexanone, and N,N-dimethyl formamide are particularly preferable.

These may be used alone or two or more kinds thereof may be used in combination. The organic solvent can be used in a range of 50 to 2000 parts by mass, for example, 50 to 1000 parts by mass with respect to total 100 parts by mass of the monomer. As the polymerization initiator used in the radical polymerization, an azo-based compound, organic peroxide, inorganic peroxide, and a redox type polymerization initiator can be used.

Examples of the azo-based compound include 2,2'-azobis (isobutyronitrile), 1,1-azobis(cyclohexane-1-carbonitrile), azocumene, 2,2'-azobis(2-methyl butyronitrile), 2,2'-azobisdimethyl valeronitrile, 4,4'-azobis(4-cyanovaleric acid), 2-(tert-butylazo)-2-cyanopropane, 2,2'-azobis(2,4,4-trimethyl pentane), 2,2'-azobis(2-methylpropane), and dimethyl 2,2'-azobis(2-methyl propionate).

Examples of the organic peroxide include cyclohexanone peroxide, 3,3,5-trimethyl cyclohexanone peroxide, methyl cyclohexanone peroxide, 1,1-bis(tert-butyl peroxy)-3,3,5-trimethyl cyclohexane, 1,1-bis(tert-butyl peroxy) cyclohexane, n-butyl-4,4-bis(tert-butyl peroxy) valerate, cumene hydroperoxide, 2,5-dimethyl hexane-2,5-dihydroperoxide, 1,3-bis(tert-butyl peroxy)-m-isopropyl benzene, 2,5-dimethyl-2,5-di(tert-butylperoxy) hexane, diisopropyl benzene peroxide, tort-butyl cumyl peroxide, decanoyl peroxide, lauroyl peroxide, benzoyl peroxide, 2,4-dichlorobenzoyl peroxide, bis(tert-butyl peroxydicarbonate, tert-butyl peroxybenzoate, and 2,5-dimethyl-2,5-di(benzoyl peroxy) hexane.

Examples of the inorganic peroxide include potassium persulfate, sodium persulfate, and ammonium persulfate.

In addition, examples of the redox type polymerization initiator include those in which sodium sulfite, sodium thiosulfate, sodium formaldehyde sulfoxylate, ascorbic acid, and ferrous sulfate are set as reducing agents, and potassium peroxodisulfate, hydrogen peroxide, and tert-butyl hydroperoxide are set as oxidizing agents.

Among these polymerization initiators, from the viewpoint of the influence of electrical properties and the like due to residual substances, 2,2'-azobis(isobutyronitrile), 1,1-azobis(cyclohexane-1-carbonitrile), dimethyl 2,2'-azobis(2-methyl propionate), and benzoyl peroxide. The polymerization initiator can be used in a range of 0.01 to 20 parts by mass, and is preferably 0.01 to 10 parts by mass with respect to the total 100 parts by mass of the monomer.

A chain transfer agent may be used for the purpose of adjusting the molecular weight or introducing other functional groups in the radical reaction. The chain transfer agent to be used is not particularly limited, and examples thereof include thiols such as 1-butanethiol, 1-hexylthiol, 1-decanethiol, thioglycol 2-ethylhexyl, polyhalogenated hydrocarbons such as carbon tetrabromide and carbon tetrachloride, α-methyl styrene dimers such as 2,4-diphenyl-4-methyl-1-pentene, and naphthoquinones.

The reaction temperature can be appropriately adjusted depending on the solvent to be used and the polymerization initiator. The reaction temperature is preferably 50° C. to 200° C. and is particularly preferably 80° C. to 150° C. A polymer-containing solution after polymerization is used as a solution dissolved in an organic solvent, or may be extracted by precipitating the polymer in an insoluble alcohol or other organic solvents, by distilling off the solvent in a dispersion medium in which the polymer is insoluble, and by distilling off the solvent by heating, vacuum, or the like.

Drying in a case of extracting the polymer is generally performed at a temperature equal to or lower than the decomposition temperature of the polymer, but drying is preferably performed at a temperature of 30° C. or higher and equal to or lower than the melting temperature of the polymer. At this time, drying under reduced pressure is preferable. The drying time is preferably not shorter than the time until the purity of impurities such as residual solvent becomes lower than a certain level, and specifically, drying is performed for more than time when the residual solvent is generally 1000 ppm or lower, is preferably 300 ppm or lower, and is more preferably 100 ppm or lower.

<Reactive Group-Containing Polycarbonate Resin or Polyester Resin>

A radically polymerizable reactive croup of the polycarbonate resin and the polyester resin containing a radically polymerizable reactive group is not limited as long as it is a radically polymerizable functional group, and examples thereof include a (meth)acrylate group, a vinyl group, a (meth)acrylamide group, a styrene group, and an allyl group. Among these functional groups, a (meth)acrylate group is preferable from the viewpoints of ease of introduction into the polycarbonate resin and the polyester resin, reactivity of radical reaction, availability of the monomer, and electrical properties.

That is, it is preferable to have a (meth)acrylate group represented by Formula (7) at the terminal, the side chain, or both of the polycarbonate resin and the polyester resin.

Formula (7)

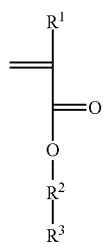

In Formula (7), $R^1$ to $R^3$ are equivalent to the above definition.

As a method of introducing a polymerizable functional group into a polycarbonate resin or a polyester resin, a method of using a divalent phenol having a functional group as a raw material, a method of introducing a polymerizable functional group at the terminal using a terminating agent having a functional group, a method of introducing a polymerizable functional group into a side chain using a diol having a functional group, and the like are exemplified.

In the method of introducing a acrylate group at the terminal, the (meth)acrylate group can be introduced, for example, by using a monomer represented by Formula (10) at the time of preparing a polycarbonate resin or a polyester resin.

Formula (10)

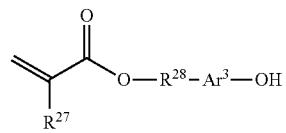

In Formula (10), $R^{27}$ represents a hydrogen atom or a methyl group. $R^{28}$ is the same as $R^2$. $Ar^3$ represents a single bond.

Specific examples of the monomers represented by Formula (10) include 2-hydroxyethyl (meth)acrylate, 3-hydroxypropyl (meth)acrylate, 4-hydroxybutyl (meth)acrylate, 1,4-cyclohexanedimethanol mono(meth)acrylate, 2-hydroxypropyl (meth)acrylate, 2-hydroxy-1-methylethyl (meth)acrylate, dietylene glycol mono(meth)acrylate, triethylene glycol mono(meth)acrylate, tetraethylene glycol mono (meth)acrylate, polyethylene glycol mono(meth)acrylate, dipropylene glycol mono(meth)acrylate, tripropylene glycol mono(meth)acrylate, tetrapropylene glycol mono(meth)acrylate, polypropylene glycol mono(meth)acrylate, di(tetramethylene glycol) mono(meth)acrylate, tri(tetramethylene glycol) mono(meth)acrylate, poly (tetramethylene glycol) mono(meth)acrylate, polyethylene glycol-propylene glycol-mono(meth)acrylate, and polyethylene glycol-tetramethylene glycol-mono(meth)acrylate.

From the viewpoint of electrical properties, 2-hydroxyethyl (meth)acrylate, 3-hydroxypropyl (meth)acrylate, 4-hydroxybutyl (meth)acrylate, and 1,4-cyclohexanedimethanol mono(meth)acrylate are preferable.

The position of the radically polymerizable functional group in the polycarbonate resin or the polyester resin is preferably at the terminal and the side chain, and from the viewpoint of availability of the monomer and reactivity at the introduction, it is particularly preferable at the terminal. In addition, it is possible to have a polymerizable functional group at both of a terminal and a side chain.

The amount of the radically polymerizable functional group contained in the polycarbonate resin or the polyester resin is preferable 10 µeq/g or more, and is more preferably 50 µeq/g or more. On the other hand, it is preferable 1000 µeq/g or less, and is more preferable 800 µeq/g or less from the viewpoint of gelation. The content of the radically polymerizable functional group can be obtained by NMR.

<Method of Producing Polycarbonate Resin or Polyester Resin Having Polymerizable Functional Group>

Next, a method of producing a polycarbonate resin or a polyester resin having a polymerizable functional group will be described below Examples of the method of producing the polycarbonate resin and the polyester resin include solution polymerization, interfacial polymerization, production method combining solution polymerization and interfacial polymerization, and the like. Among these, from the viewpoint of reactivity of the polymerizable functional group monomer, a solution polymerization method or a combination method of solution polymerization and interfacial polymerization is preferable.

In a case of preparation by solution polymerization, for example, a monomer represented by Formula (10) and at least one of a polycarbonate oligomer and a divalent carboxylic acid chloride are dissolved, a base such as triethylamine is added, the functional group-containing monomer is consumed in advance, and then deficient divalent phenol and base are added so as to obtain at least one of the polycarbonate resin and the polyester resin containing a functional group.

The polymerization temperature is preferably in a range of −10° C. to 40° C. and the polymerization time is in a range of 0.5 hours to 10 hours from the viewpoint of productivity. After completion of the polymerization, the resin dissolved in the organic phase is washed and recovered, whereby a target resin is obtained.

Examples of the base used in the solution polymerization method include tertiary amines such as triethylamine, tripropylamine, tributylamine, N,N-diisopropyl ethylamine, N,N-dipropyl ethylamine, N,N-diethyl methylamine, N,N-dimethyl ethylamine, N,N-dimethyl butylamine, N,N-dimethyl isopropylamine, N,N-diethyl isopropylamine, N,N,N',N'-tetramethyl diethylamine, and 1,4-diazabicyclo[2,2,2]octane, pyridines such as pyridine, 4-methyl pyridine, and an organic base such as 1,8-diazabicyclo[5.4.0]-7-undecene.

Also, there is no particular limitation as long as it is a base which is used for carbonation reaction, esterification reaction, or the like such as a phosphazene base and an inorganic base. Among these bases, triethylamine, N,N-dipropyl ethylamine, N,N-diethyl methylamine, and pyridine are preferable from the viewpoint of reactivity and convenience of availability, and triethylamine is particularly preferable from the viewpoint of suppression of decomposition of chloroformate and acid chloride and ease of removal in washing.

When reacting a monomer having a functional group in advance, the amount of the base to be used is generally 1.00 times equivalent or more, and is preferably 1.05 times equivalent or more with respect to the group such as a hydroxyl group of the monomer. On the other hand, it is generally 2.00 times equivalent or less, and is preferably 1.80 times equivalent or less.

The amount of the base in the elongation reaction of the polycarbonate resin or the polyester resin is preferably 1.00 equivalents or more, is more preferably 1.05 equivalents or more with respect to the total chloroformate group or the total acid chloride group to be used. On the other hand, in order to prevent unnecessary decomposition of chloroformate and acid chloride, 2.0 equivalents or less is preferable.

Examples of the solvent used in the solution polymerization method include a halogenated hydrocarbon compound such as dichloromethane, chloroform, 1,2-dichloroethane, trichloroethane, tetrachloroethane, chlorobenzene, and dichlorobenzene, an aromatic hydrocarbon compound such as toluene, anisole, and xylene, a hydrocarbon compound such as cyclohexane and methyl cyclohexane, an ether compound such as tetrahydrofuran, tetrahydropyran, 1,4-dioxane, and 1,3-dioxolane, an ester compound such as ethyl acetate, methyl benzoate, and benzyl acetate, and an amide compound such as N,N-dimethyl formamide and N,N-dimethyl acetamide.

Also, pyridine may be used as a base and as a solvent. Among these, from the viewpoint of the reactivity, dichloromethane, chloroform, 1,2-dichloroethane, tetrahydrofuran, N,N-dimethyl formamide, and pyridine are preferable. From the viewpoint of washing efficiency, dichloromethane is particularly preferable.

At the time of producing the polycarbonate resin or the polyester resin, a molecular weight regulator can be used. Examples of the molecular weight regulator include alkyl phenols such as phenol, o,m,p-cresol, o,m,p-ethyl phenol, o,m,p-propyl phenol, o,m,p-(tert-butyl) phenol, pentyl phenol, hexyl phenol, octyl phenol, nonyl phenol, a 2,6-dimethyl phenol derivative, and 2-methyl phenol derivative; monofunctional phenols such as o,m,p-phenyl phenol; acetic chloride, butyric acid chloride, octyl acid chloride, benzoyl chloride, benzenesulfonyl chloride, benzenesulfinyl chloride, sulfinyl chloride, benzene phosphonyl chloride, and monofunctional acid halides such as substitution products thereof.

In addition, examples thereof include monofunctional aliphatic alcohol such as methanol, ethanol, and propanol, monofunctional alcohol having acrylics such as 2-hydroxyethyl acrylate, 4-hydroxybutyl acrylate, and 2-hydroxyethylmethacrylate, monofunctional alcohol having perfluoroalkyl such as 1H,1H,2H,2H-tridecafluoro-1-n-octanol, 1H,1H,2H,2H-heptadecafluoro-1-decanol, and monofunctional alcohol having siloxane.

Among these molecular weight regulators, o,m,p-(tert-butyl) phenol, 2,6-dimethyl phenol derivative, and a 2-methyl phenol derivative are preferable from the viewpoint of high molecular weight controllability and solution stability. Particularly, p-(tert-butyl) phenol, 2,3,6-trimethylphenol, and 2,3,5-trimethylphenol are preferable. The amount of the molecular weight regulator to be used can be adjusted to obtain an optional molecular weight, but it is generally preferably equal to or less than the radical reactive group.

As a washing method after polymerization, for example, a method of washing a solution such as a polyester resin with an aqueous alkaline solution such as sodium hydroxide or potassium hydroxide; an aqueous acid solution such as hydrochloric acid, nitric acid, or phosphoric acid; and water or the like and then separating by static separation, centrifugation, and the like. The washed resin solution can be precipitated in water in which the resin is insoluble, alcohol or other organic solvent, or may be extracted by distilling off a solvent in hot water or in a dispersion medium in which the resin is insoluble, or by distilling off the solvent by heating, vacuum, or the like. In a case of extracting the resin solution in a slurry state, a solid can also extracted by a centrifugal separator, a filter or the like.

Drying of the extracted resin is generally performed at a temperature equal to or lower than the decomposition temperature of the polycarbonate resin and the polyester resin, but drying is preferably performed at a temperature of 20° C. or higher and equal to or lower than the melting temperature of the resin. At this time, drying under reduced pressure is preferable. The drying time is preferably not shorter than the time until the purity of impurities such as residual solvent becomes lower than a certain level, and specifically, drying is performed for more than time when the residual solvent is generally 1000 ppm or lower, is preferably 300 ppm or lower, and is more preferably 100 ppm or lower.

In a case of a preparing method in a combination of solution polymerization and interfacial polymerization, when the radically reactive functional group-containing monomer is an aliphatic hydroxyl group, the reactivity becomes lower than that of the phenolic hydroxyl group, and thus instruction is difficult to be performed only by the interfacial polymerization. Therefore, after reacting an aliphatic hydroxyl group by solution polymerization in a first step, a resin chain is elongated by interfacial polymerization in a second step so as to obtain a polycarbonate resin and a polyester resin containing a radically reactive functional group.

(Solution Polymerization at First Stage)

In the solution polymerization at the first stage, a radical reactive group-containing monomer as represented in Formula (10), phosgene, a polycarbonate oligomer, and chloroformate (acid chloride) such as divalent carboxylic acid chloride, are dissolved and a base such as triethylamine are added and reacted. After removal of the base by washing, the solution is used as it is or the solution once extracted so as to be used for the interfacial polymerization at the second stage.

A solvent, a base, a reaction temperature, a terminator, and a washing method of the solution polymerization at the first stage are preferably equivalent to the solution polymerization. The reaction time is preferably from 30 minutes to ten hours, and is more preferably from 1 to four hours from the viewpoint of sufficient reaction progress and production efficiency.

(Interfacial Polymerization at Second Stage)

In the production by the interfacial polymerization method, for example, in the case of a polycarbonate resin, an alkali aqueous solution, and the solution-polymerized solution are mixed. In this case, it is also possible to have a quaternary ammonium salt or a quaternary phosphonium salt as a catalyst. It is also possible to add additional divalent phenol as necessary. The polymerization temperature is preferably in a range of 0° C. to 40° C. and the polymerization time is in a range of two hours to 20 hours from the viewpoint of productivity. After completion of the polymerization, the aqueous phase and the organic phase are separated, and the polymer dissolved in the organic phase is washed and recovered by a known method, and thereby a desired resin can be obtained. The polyester resin can also be produced by the same production method.

Examples of the alkali component used in the interfacial polymerization method include alkali metal hydroxides such as sodium hydroxide and potassium hydroxide.

As the reaction solvent, halogenated hydrocarbon and aromatic hydrocarbon are preferable. Examples of the halogenated hydrocarbon include dichloromethane, chloroform, 1,2-dichloroethane, trichloroethane, tetrachloroethane, and dichlorobenzene. Examples of the aromatic hydrocarbon include toluene, xylene, benzene and the like.

Examples of the quaternary ammonium salt or quaternary phosphonium salt used as a catalyst include salts of hydrochloric acid of tertiary alkyl amines such as tributylamine, and trioctylamine, bromic acid, and iodic acid benzyl triethyl ammonium chloride, benzyl trimethyl ammonium Chloride, benzyl tributyl ammonium Chloride, tetraethyl ammonium chloride, tetrabutyl ammonium chloride, tetrabutyl ammonium bromide, trioctyl methyl ammonium chloride, tetrabutyl phosphonium bromide, triethyloctadecyl phosphonium bromide, N-lauryl pyridinium chloride, and lauryl picolinium chloride. In addition, in the interfacial polymerization method, the molecular weight regulator can be used. As the molecular weight regulator, those described in the solution polymerization are exemplified.

Further, in order not to oxidize the divalent phenol in an alkaline solution, an antioxidant can be added. Examples of the antioxidant include sodium sulfite, hydrosulfite (sodium hyposulfite sulfur dioxide, potassium sulfite, and sodium hydrogen sulfite. Among these, hydrosulfite is particularly preferable also from the viewpoint of the effect of oxidation prevention and the reduction of environmental burden. The amount of the antioxidant to be used is preferably 0.01% by mass to 10.0% by mass with respect to divalent phenol. It is more preferably 0.1% by mass to 0.5% by mass. When the content is excessively small, there is a possibility that an antioxidant effect is insufficient, and when the content is excessively large, the antioxidant will remain in the resin and adversely affect the electrical properties in some cases. As the purification method and drying method of the obtained resin after polymerization, the conditions described in the solution polymerization can be applied.

<B. Method of Polymerizing with at Least One of Polycarbonate Resin and Polyester Resin Using (Meth)Acrylate Oligomer Having Hydroxyl Group or Amino Group>

The dispersant for fluororesin of the invention can also be obtained by causing a (meth)acrylate oligomer having a functional group such as a hydroxyl group, and phosgene/divalent phenol, polycarbonate oligomer, or divalent acid chloride/divalent phenol to react with each other.

A fluorine-containing (meth) acrylate oligomer having a functional group such as a hydroxyl group can be prepared by mixing (meth)acrylate serving as a source of Formula (2) described above with a chain transfer agent having a functional group such as a hydroxyl group by radical reaction, by polymerization with (meth) acrylate having a hydroxyl group as represented by Formula (10), or the like. Examples of the chain transfer agent having a functional group such as a hydroxyl group include 2-mercaptoethanol, 3-mercaptopropanol, 4-mercapto butanol, 5-mercaptoheptanol, and 6-mercaptohexanol.

Alternatively, a chain transfer agent having a carboxylic acid group such as thioglycolic acid may be used so as to introduce carboxylic acid once at the terminal of the oligomer, then converted to another functional group, or reacted with an epoxy compound having carboxylic acid and a hydroxyl group so as to introduce a hydroxyl group into the oligomer. Further, other (meth)acrylate monomers can be mixed when preparing the oligomer. The radical reaction for obtaining the oligomer can be applied under the same conditions as those of the radical reaction described above.

The obtained oligomer can be introduced into the polycarbonate resin or the polyester resin by a preparing method of the solution polymerization, or the combination of the solution polymerization and the interfacial polymerization as described above.

<<Fluororesin and Dispersion Thereof>>

As the fluororesin particles used in this embodiment, it is preferable to select one or more from a tetrafluoroethylene resin, a trifluorochloroethylene resin, a hexafluoropropylene resin, a vinyl fluoride resin, a vinylidene fluoride resin, a dichloroethylene dichloride resin, and polymers thereof as appropriate. Particularly, a tetrafluoroethylene resin and a vinylidene fluoride resin are preferable.

An average primary particle diameter of the fluororesin particle is generally 0.1 µm to 1.0 µm, and is more preferably 0.2 µM to 0.5 µm. When the average primary particle diameter is 0.1 µm or larger, the aggregation during dispersion is further suppressed. On the other hand, when the average primary particle diameter is 1.0 µm or smaller, the image quality defect is further suppressed. The average primary particle diameter of the fluororesin is measured by, for example, dynamic light scattering method using FPAR1000 (manufactured by Otsuka Electronics Co., Ltd.)

or a laser diffraction scattering method by Microtrack (manufactured by Nikkiso Co., Ltd).

The amount of the dispersant for fluororesin of the invention used for dispersing the fluororesin is preferably 0.5 parts by mass or more from the viewpoint of dispersibility with respect to 100 parts by mass of the fluororesin and is more preferably 1.0 part by mass or more. On the other hand, it is preferably 20 parts by mass or less, and is more preferably 10 parts by mass or less from the viewpoint of inhibiting the aggregation of the dispersant and inhibiting film forming property from being deteriorated by phase separation with another binder resin when forming a coating film.

A nonaqueous solvent is preferable as a solvent used for dispersing the fluororesin, and examples thereof include a hydrocarbon solvent such as xylene, toluene, or cyclohexane; a ketone solvent such as acetone, methyl ethyl ketone, cyclohexanone, or methyl isobutyl ketone; an ether solvent such as tetrahydrofuran, anisole, dimethoxyethane, 1,4-dioxane, dioxolane, methyl cellosolve, cellosolve, butyl cellosolve, methyl carbitol, carbitol, butyl carbitol, diethyl carbitol, or propylene glycol monomethyl ether; an ester solvent such as ethyl acetate, n-butyl acetate, isobutyl acetate, n-amyl acetate, cellosolve acetate, propylene glycol monomethyl ether acetate, or 3-methoxybutyl acetate; an alcohol solvent such as n-butyl alcohol, sec-butyl alcohol, isobutyl alcohol, cyclohexanol, 2-ethylhexanol, and 3-methyl-3-methoxybutanol.

Among these, toluene, xylene, anisole, tetrahydrofuran, and dimethoxyethane are preferable from the viewpoint of the solubility of the dispersant for fluororesin and the influence of electrical properties. These solvents may be used alone or a plurality of kinds thereof may be used in combination.

The preparation of the dispersion of the fluororesin can be performed by mixing the fluororesin, the nonaqueous liquid medium, and the dispersant for the fluororesin of the invention, and thereafter, the fluororesin can be dispersed by using ultrasonic waves, a paint shaker, a beads mill, a ball mill, various mixers, and dispersing apparatuses of various high pressure wet type dispersing machines.

<<Electrophotographic Photoreceptor>>

The electrophotographic photoreceptor of the invention is an electrophotographic photoreceptor having a photosensitive layer on a conductive support, and the photosensitive layer contains a fluororesin and a polymer having a structure represented by Formula (1).

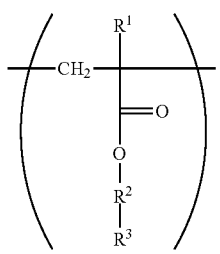

Formula (1)

In Formula (1), $R^1$ represents a hydrogen atom or a methyl group. $R^2$ represents a single bond, a divalent hydrocarbon group which may have an ether moiety or a divalent polyether group which may have a substituent. $R^3$ represents a polycarbonate residue or a polyester residue.

Note that, specific examples and preferable range of $R^1$, $R^2$, and $R^3$ are as described above.

In addition, a polymer having a structure represented by Formula (1) preferably has a structure represented by Formula (2).

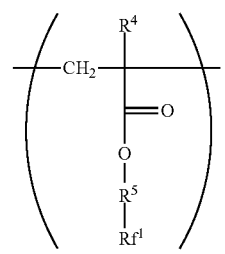

Formula (2)

In Formula (2), $R^4$ represents a hydrogen atom or a methyl group. $R^5$ represents a single bond or a divalent hydrocarbon group which may have an ether moiety. $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3).

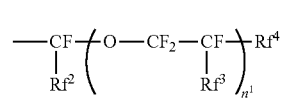

Formula (3)

In Formula (3), $Rf^2$ and $Rf^3$ each independently represent a fluorine atom or a trifluoromethyl group. $Rf^4$ represents a linear perfluoroalkyl group having 1 to 6 carbon atoms or a branched chain perfluoroalkyl group having 1 to 6 carbon atoms, $n^1$ represents an integer of 1 to 3.

Note that, specific examples and preferable range of $R^4$, $R^5$, $Rf^2$, $Rf^3$, $Rf^4$, and $n^1$ are as described above.

In addition, the structure represented by Formula (2) is preferably a structure represented by Formula (4),

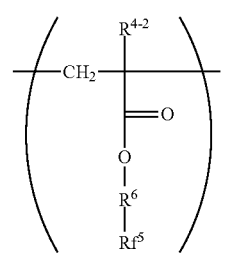

Formula (4)

In Formula (4), $R^{4-2}$ represents a hydrogen atom or a methyl group. $R^6$ represents a divalent group represented by $—(CH^2)n^4—$. $n^4$ represents an integer of 1 to 4. Re represents a linear perfluoroalkyl group having 2 to 6 carbon atoms.

$R^{4-2}$ is preferably a hydrogen atom from the viewpoint of reactivity during polymerization.

Specific examples of $R^6$ include a methylene group, an ethylene group, a trimethylene group, and a tetramethylene group. Among these, a methylene group and an ethylene group are preferable from the viewpoint of reactivity of polymerization reaction and convenience of synthesis.

Specific examples of $Rf^5$ include a perfluoroethyl group, a perfluoropropyl group, a perfluorobutyl group, a perfluoropentyl group, and a perfluorohexyl group. Among these, from the stability of the fluororesin dispersion, a perfluorobutyl group, a perfluoropentyl group, and a perfluorohexyl group are preferable.

Further, $R^3$ in the structure represented by Formula (1) preferably has a structure represented by Formula (5) or a structure represented by Formula (6).

Formula (5)

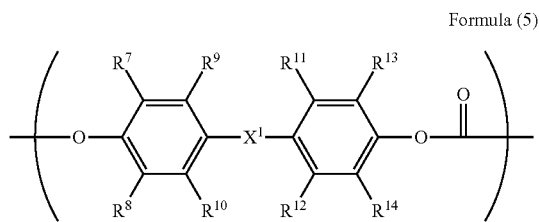

In Formula (5), $R^7$ to $R^{14}$ are each independently represent a hydrogen atom, an alkyl group having 1 to 20 carbon atoms which may have a substituent, an alkoxy group, and an aromatic group or a halogen group which may be substituted. $X^1$ represents a single bond, an oxygen atom. CO or a sulfur atom. In addition, $R^{15}$ and $R^{16}$ each independently represent a hydrogen atom, an alkyl group having 1 to 10 carbon atoms, an aromatic group having 6 to 12 carbon atoms, or $R^{15}$ and $R^{16}$ each represent a cycloalkylidene group having 5 to 10 carbon atoms which may have a substituent and is formed by combining $R^{15}$ and $R^{l6}$.

Formula (6)

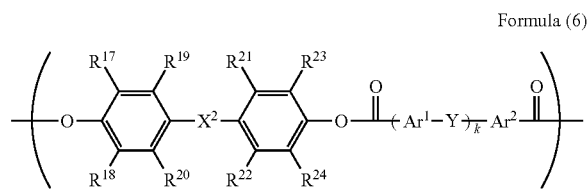

In Formula (6), $R^{17}$ to $R^{24}$ are each independently represent a hydrogen atom, an alkyl group having 1 to 20 carbon atoms which may have a substituent, an alkoxy group, and an aromatic group or a halogen group which may be substituted. $X^2$ represents a single bond, $—CR^{25}R^{26}—$, an oxygen atom, CO or a sulfur atom. In addition, $R^{25}$ and $R^{26}$ each independently represent a hydrogen atom, an alkyl group having 1 to 10 carbon atoms, an aromatic group having 6 to 12 carbon atoms, or $R^{25}$ and $R^{26}$ each represent a cycloalkylidene group having 5 to 10 carbon atoms which may have a substituent, and is formed by combining $R^{25}$ and $R^{26}$. $Ar^1$ and $Ar^2$ each independently represent an arylene group or a cyclohexylene group which may have a substituent. Y represents a single bond, an oxygen atom, or a sulfur atom. k represents an integer of 0 to 1.

Note that, specific examples and preferable range of $R^7$ to $R^{26}$, $X^1$, $X^2$, $Ar^1$, and $Ar^2$ are as described above.

In the polymer having the structure represented by Formula (1) and the structure represented by Formula (2), the content of the structure represented by Formula (1) is preferably 20% by mass to 70% by mass, is more preferably 30% by mass to 60% by mass, and is still more preferably 35% by mass to 55% by mass, from the viewpoint of the solubility.

A weight average molecular weight of the polymer having the structure represented by Formula (1) and the structure represented by Formula (2) is preferably 5,000 to 100,000, is more preferably 10,000 to 80,000, and is still more preferably 15,000 to 50,000, from the viewpoint of the stability of the fluororesin dispersion.

From the viewpoint of the electrical properties, the content of the polymer having the structure represented by Formula (1) is preferably 0.5 parts by mass to 20 parts by mass, is more preferably 1.0 parts by mass to 15 parts by mass, and is still more preferably 3.0 parts by mass to 10 parts by mass, with respect to 100 parts by mass of the fluororesin.

<Conductive Support>

The conductive support is not particularly limited, and metallic materials such as aluminum, an aluminum alloy, stainless steel, copper, and nickel, resin materials to which conductivity is imparted by adding a conductive powder such as metal, carbon and tin oxide, reins obtained by vapor-depositing or coating the conductive materials such as aluminum, nickel, and ITO (indium oxide tin oxide), glass, paper, and the like are mainly used. These may be used alone or two or more kinds thereof may be used in any combination at any ratio. As a form of the conductive support, a drum-like conductive support, a sheet-like conductive support, a belt-like conductive support, or the like can be used. Further, on the conductive support made of a metal material, a conductive material having an appropriate resistance value may be applied for control of conductivity, surface property and the like and coating of defects.

When a metal material such as an aluminum alloy is used as the conductive support, it may be used after an anodized coating film is formed. When the anodized coating film is formed, it is preferable to perform a sealing treatment by a known method.

The surface of the support may be smooth, or it may be roughened by applying a special cutting method or a polishing treatment. It may also be roughened by mixing particles having an appropriate particle diameter with a material constituting the support. In addition, in order to reduce the cost, it is also possible to use a drawn pipe as it is without performing the cutting treatment.

<Undercoat Layer>

An undercoat layer may be provided between the conductive support and a photosensitive layer which will be described below in order to improve adhesion blocking properties and the like. As the undercoat layer, a resin, and those in which particles of a metal oxide or the like are dispersed in a resin are used. Further, the undercoat layer may be formed of a single layer or a plurality of layers. In the undercoat layer, a known antioxidant, pigment particles, resin particles, and the like may be mixed. From the viewpoints of improving the electrical properties, suitability for intense exposure, image properties, and suitability for repetitions of the electrophotographic photoreceptor, and improving coating-fluid applicability during preparation, the thickness thereof is generally 0.01 μm or more, is preferably 0.1 μm or more, and is generally 30 μhi or less, and is preferably 20 μm or less.

Examples of the metal oxide particles used for the undercoat layer include particles of a metal oxide containing one metallic element, such as titanium oxide, aluminum oxide, silicon oxide, zirconium oxide, zinc oxide, or iron oxide, and particles of a metal oxide containing a plurality of metallic elements, such as calcium titanate, strontium titanate, or barium titanate. Particles of one kind selected from these may be used alone, or particles of two or more kinds may be mixed together and used. Among these metal oxide particles, titanium oxide and aluminum oxide are preferable, and titanium oxide is particularly preferable. The surface of the titanium oxide particle may be treated with inorganic materials such as tin oxide, aluminum oxide, antimony oxide, zirconium oxide, silicon oxide, or organic materials such as stearic acid, polyol, and silicon. As the crystal form of the titanium oxide particles, any of rutile, anatase, brookite, and amorphous can be used. Further, a plurality of crystalline states may be included.

In addition, various kinds of particle diameters of the metal oxide particles can be used; however, from the viewpoint of the properties and liquid stability, the average primary particle diameter is preferably 10 nm to 100 nm, and is particularly preferably 10 nm to 50 nm. The average primary particle diameter can be obtained by a transmission electron microscope (TEM) picture or the like.

The undercoat layer is preferably formed of a binder resin and metal oxide particles dispersed therein. Examples of the binder resin used for the undercoat layer include an epoxy resin, a polyethylene resin, a polypropylene resin, an acrylic resin, a methacrylic resin, a polyamide resin, a vinyl chloride resin, a vinyl acetate resin, a phenol resin, a polycarbonate resin, a polyurethane resin, a polyimide resin, a vinylidene chloride resin, a polyvinyl acetal resin, a vinyl chloride-vinyl acetate copolymer, a polyvinyl alcohol resin, a polyurethane resin, a polyacrylic resin, a polyacrylamide resin, a polyvinyl pyrrolidone resin, a polyvinyl pyridine resin, a water-soluble polyester resin, a cellulose ester resins such as nitrocellulose, a cellulose ether resin, casein, gelatin, polyglutamic acid, starch, starch acetate, amino starch, an organic zirconium compound such as a zirconium chelate compound and a zirconium alkoxide compound, an organic titanyl compound such as a titanyl chelate compound and a titanium alkoxide compound, and a known binder resin such as a silane coupling agent.

These may be used alone or two or more kinds thereof may be used in any combination at any ratio. It may also be used in a form cured together with a curing agent. Among these, alcohol-soluble copolymerized polyamides, modified polyamides and the like are preferable from the viewpoint of exhibiting excellent dispersibility and coating properties. The ratio of the inorganic particles with respect to the binder resins used for the undercoat layer can be optionally selected. From the viewpoint of the stability and applicability of the dispersion, however, it is generally preferable to use the inorganic particles in a range of 10% by mass to 500% by mass with respect to the binder resins.

<Photosensitive Layer>

Specific examples of the photosensitive layer include a laminated photoreceptor obtained by laminating a charge generation layer containing a charge generation substance as a main component, and a charge transport layer containing a charge transport substance and a binder resin as main components on the conductive support; and a dispersion type (single layer type) photoreceptor having a photosensitive layer in which the charge generation substance is dispersed in a layer including the charge transport substance and the binder resin, on the conductive support. Further, a protective layer may be provided on the outermost surface of the photoreceptor. The fluororesin particle and the dispersant for fluororesin are generally used for the outermost surface layer, and in a case of the laminated photoreceptor, preferably used for the charge transport layer, in a case where a single layer type photoreceptor, preferably used for a single layer, and in a case of the photoreceptor including a protective layer, preferably used for the protective layer.

As a type of the photosensitive layer, there are a single layer type in which the charge generation substance and the charge transport substance are present on the same layer, and are dispersed in the binder resin, and a function separation type (laminated type) formed of two layers of the charge generation layer in which the charge generation substance is dispersed in the binder resin and the charge transport layer in which the charge transport substance is dispersed in the binder resin, and any of two types of the photosensitive layers may be used. Examples of the lamination type photosensitive layer include a normal lamination type photosensitive layer in which the charge generation layer and the charge transport layer are laminated and disposed in this order from the conductive support side, and a reverse lamination type photosensitive layer in which the charge transport layer and the charge generation layer are laminated and disposed in this order from the conductive support side. Although either type can be employed, the normal lamination type photosensitive layer is preferable because this photosensitive layer can exhibit an especially well balanced photoconductivity.

[Charge Generation Layer-Lamination Type]

In a case of the laminated photoreceptor (function separation type photoreceptor), the charge generation layer is formed by bonding the charge generation substance by using the binder resin. The thickness thereof is generally 0.1 μm or more, is preferably 0.15 μm or more, and is generally 10 μm or less, and is preferably 0.6 μm or less.

Examples of the charge generation substance include an inorganic photoconductive such as material selenium and an alloy thereof, and cadmium sulfide, and an organic photoconductive material such as an organic pigment. Among them, the organic photoconductive material is preferable, and the organic pigment is particularly preferable. Examples of the organic pigment include a phthalocyanine pigment, an azo pigment, a dithioketopyrrolopyrrole pigment, a squalene (squarylium) pigment, a quinacridone pigment, an indigo pigment, a perylene pigment, a polycyclic quinone pigment, an anthanthrone pigment, and a benzimidazole pigment. Among these, a phthalocyanine pigment or an azo pigment is particularly preferable. In a case where the organic pigment is used as the charge generation substance, typically, fine particles of the organic pigments are used in the form of a dispersed layer bonded with various binder resins.

In the case where a metal-free phthalocyanine compound or a metal-containing phthalocyanine compound is used as the charge generation substance, it is possible to obtain the photoreceptor with high sensitivity with respect to a laser beam having relatively long wavelength, for example, a laser beam having a wavelength in the vicinity of 780 nm. In addition, in a case of using an azo pigment such as monoazo, diazo or trisazo, it is possible to obtain a photoreceptor having sufficient sensitivity with respect to white light, a laser beam having a wavelength in the vicinity of 660 nm, or a laser beam having relatively short wavelength (for example, a laser beam having a wavelength in the vicinity of 450 nm and 400 nm).

In a case of using an organic pigment as a charge generation substance, a phthalocyanine pigment or an azo pigment is particularly preferable. The phthalocyanine pigment is excellent from the viewpoint that a photoreceptor highly sensitive to laser light having relatively long wavelength can be obtained, and the azo pigment is excellent from the viewpoint of having sufficient sensitivity to white light and laser light having relatively short wavelength.

In a case where a phthalocyanine pigment is used as the charge generation substance, specific examples thereof include metal-free phthalocyanine, metal such as copper, indium, gallium, tin, titanium, zinc, vanadium, silicon, germanium, and aluminum, those having crystal forms of coordinated phthalocyanines such as halides, hydroxides, and alkoxides, and phthalocyanine dimers using an oxygen atom or the like as a bridge atom. Particularly, an X form with high sensitivity, a τ-form metal-free phthalocyanine, titanyl phthalocyanines (alternative name: oxytitanium phthalocyanine) such as A form (also known as a β form), a B form (also known as an α form), or a D form (also known as a Y form), vanadyl phthalocyanine, chloroindium phthalocyanine, hydroxy indium phthalocyanine, II-form chlorogallium phthalocyanine, V-form hydroxygallium phthalocyanine, G-form or I-form μ-oxo-gallium phthalocyanine dialer, or II-form μ-oxo-aluminum phthalocyanine dimer is preferable.

In addition, among the aforementioned phthalocyanines, the A form (also known as the β form), the B form (also known as the α form), and the D-form (Y form) titanyl phthalocyanine in which a diffraction angle 2θ (±0.2°) of powder X-ray diffraction having an obvious peak at an angle at 27.1° or 27.3°, the II-form chlorogallium phthalocyanine, the V-form hydroxygallium phthalocyanine, hydroxygallium phthalocyanine which has the most intense peak at an angle of 28.1°, or hydroxygallium phthalocyanine which has an obvious peak at an angle of 28.1° without having a peak at angle of 26.2° and in which a half value width W at angle of 25.9° is in a range of 0.1°≤W≤0.4° and a G-form μ-oxogallium phthalocyanine dimer are particularly preferable. Among these. D form (Y form) titanyl phthalocyanine is preferable from the viewpoint of exhibiting excellent sensitivity.

A single phthalocyanine compound may be used alone, or a mixture of some phthalocyanine compounds or a mixture of some crystal states may be used. This mixed state of phthalocyanine compounds or of crystal states to be used here may be a mixture obtained by mixing the components prepared beforehand, or may be a mixture which came into the mixed state during phthalocyanine compound production/treatment steps such as synthesis, pigment formation, and crystallization. Known as such treatment steps include an acid paste treatment, grinding, solvent treatment, and the like. Examples of methods for obtaining a mixed-crystal state include a method in which two kinds of crystals are mixed, subsequently mechanically ground to render the crystals amorphous, and then subjected to a solvent treatment to convert into specific crystal states, as described in JP-A-10-48859.

The binder resin used for the charge generation layer is not particularly limited. Examples thereof include insulating resins such as a polyvinyl acetal resin, for example, a polyvinyl butyral resin, a polyvinyl formal resin, and a partly acetalized polyvinyl butyral resin in which the butyral moieties have been partly modified with formal, acetal, or the like, a polyarylate resin, a polycarbonate resin, a polyester resin, a modified ether-type polyester resin, a phenoxy resin, a polyvinyl chloride resin, a polyvinylidene chloride resins, a polyvinyl acetate resin, a polystyrene resin, an acrylic resin, a methacrylic resin, a polyacrylamide resin, a polyamide resin, a polyvinylpyridine resin, a cellulosic resin, a polyurethane resin, an epoxy resin, a silicon resin, a polyvinyl alcohol resin, a polyvinylpyrrolidone resin, casein, copolymers based on vinyl chloride and vinyl acetate, for example, vinyl chloride/vinyl acetate copolymers, hydroxy-modified vinyl chloride/vinyl acetate copolymers, carboxyl-modified vinyl chloride/vinyl acetate copolymers, and vinyl chloride/vinyl acetate/maleic anhydride copolymers, styrene/butadiene copolymers, vinylidene chloride/acrylonitrile copolymers, styrene-alkyd resins, silicon-alkyd resins, and phenol-formaldehyde resins; and organic photoconductive polymers such as poly-N-vinylcarbazole, polyvinylanthracene, and polyvinylperylene. Any one of these binder resins may be used alone, or any desired combination of two or more thereof may be used as a mixture thereof.

In the charge generation layer, regarding the mixing ratio (the mass ratio) of the charge generation substance to the binder resin, the charge generation substance is generally 10 parts by mass or more, and is preferably 30 parts by mass or more, and is generally 1000 parts by mass or less, and is preferably 500 parts by mass or less, with respect to 100 parts by mass of the binder resin.

[Charge Transport Layer-Lamination Type]

The charge transport layer of the laminated photoreceptor contains a charge transport substance and generally contains a binder resin and other components which are used as necessary. The charge transport layer may be formed of a single layer or may be formed by laminating a plurality of layers having different constituent components and composition ratios. The thickness thereof is generally 5 μm to 50 μm, and is preferably 10 μm to 45 μm.

The charge transport substance is not particularly limited, and any substances can be used. Examples of the charge transport substance include an electron withdrawing substance such as an aromatic nitro compound such as 2,4,7-trinitrofluorenone, a cyano compound such as tetracyanoquinodimethane, and a quinone compound such as diphenoquinone, a heterocyclic compound such as a carbazole derivative, an indole derivative, an imidazole derivative, an oxazole derivative, a pyrazole derivative, a thiadiazole derivative, and a benzofuran derivative, an aniline derivative, a hydrazone derivative, an aromatic amine derivative, a stilbene derivative, a butadiene derivative, an enamine derivative, a combination of plural types of these compounds, and an electron-donating substance such as a polymer having a group composed of these compounds in a main chain or a side chain. Among them, a carbazole derivative, an aromatic amine derivative, a stilbene derivative, a butadiene derivative, an enamine derivative, and the combination of plural kinds of these compounds are preferable. These charge transport substances may be used alone or several substances may be used in combination. Specific examples of the preferable structure of the charge transport substance are as follows.

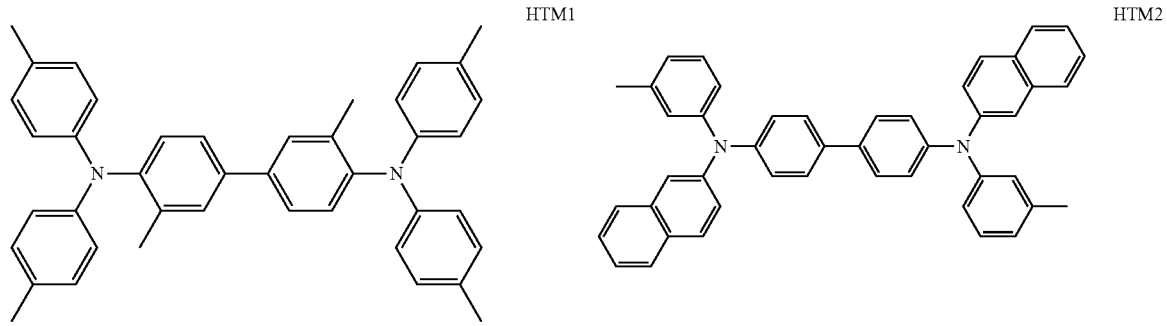

HTM1    HTM2

-continued
HTM3
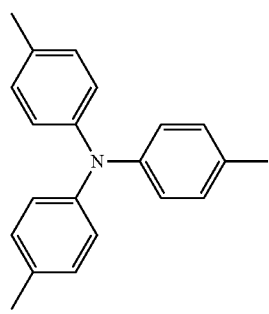
HTM4
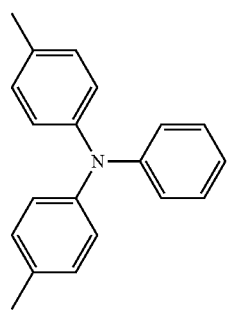
HTM5
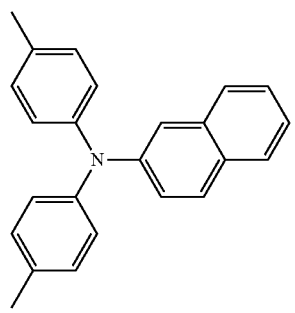
HTM6
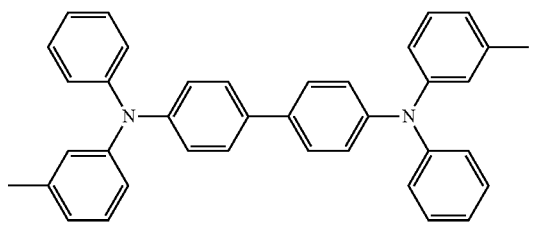
HTM7
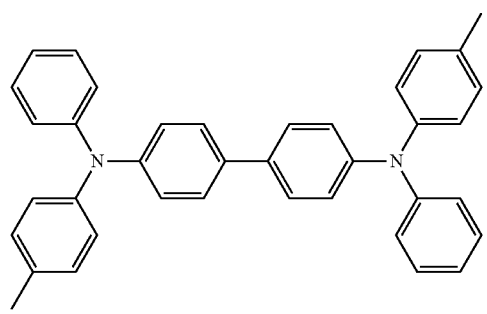
HTM8
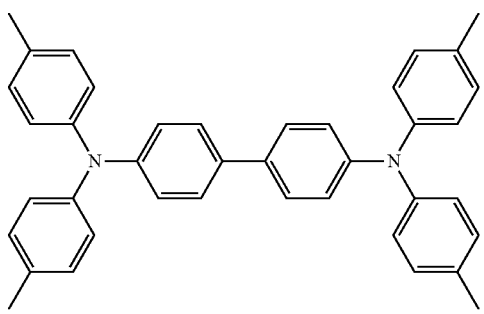
HTM9
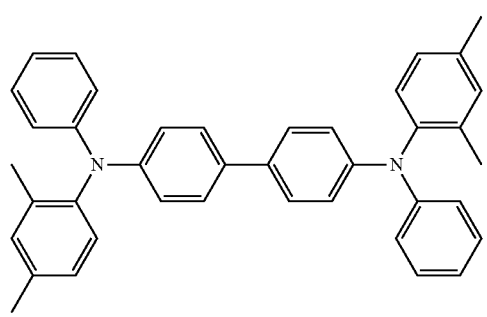
HTM10
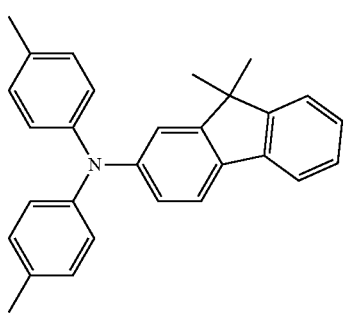
HTM11
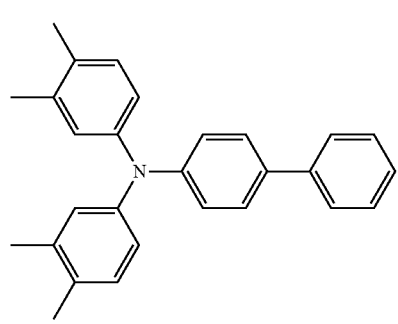
HTM12
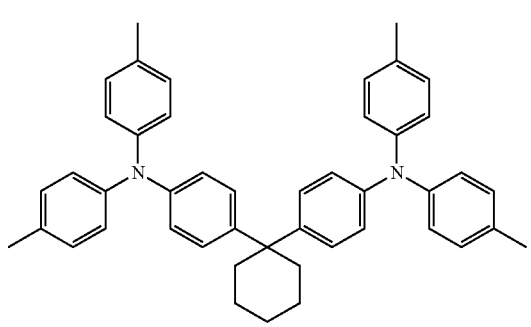

-continued
HTM13
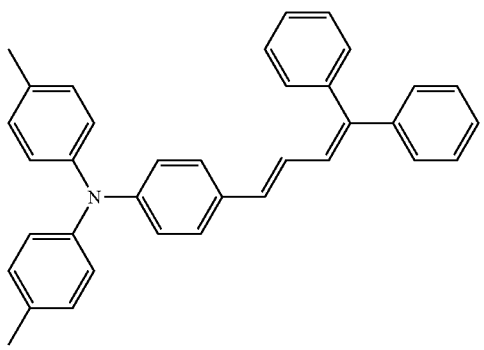
HTM14
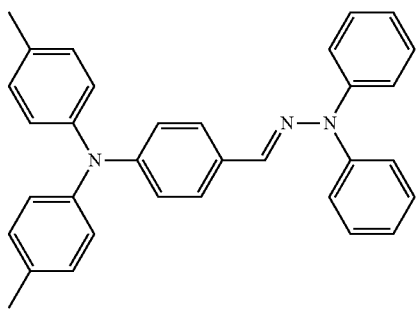
HTM15
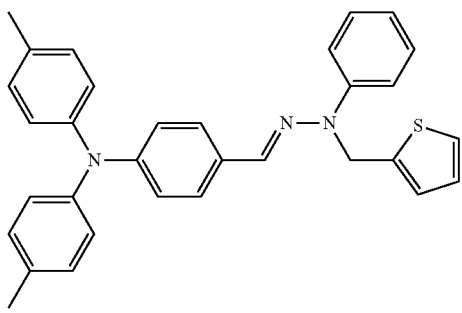
HTM16
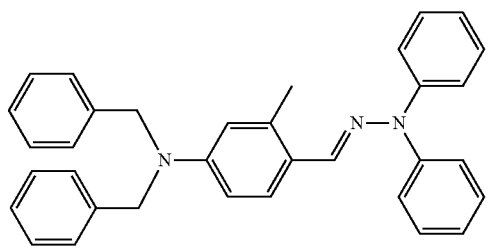
HTM17
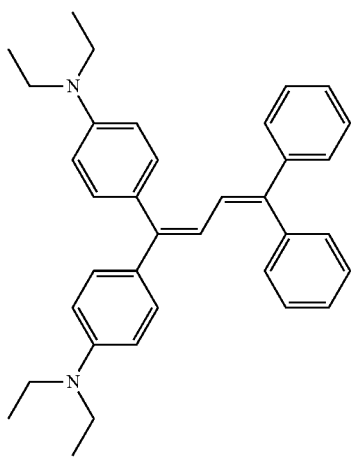
HTM18
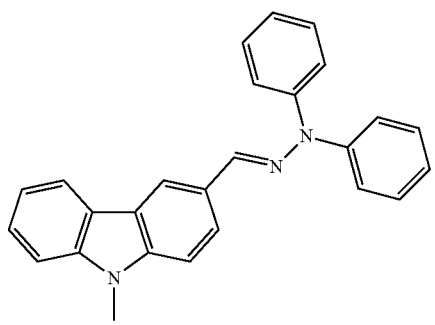
HTM19
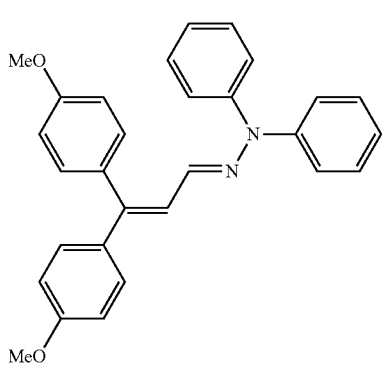
HTM20
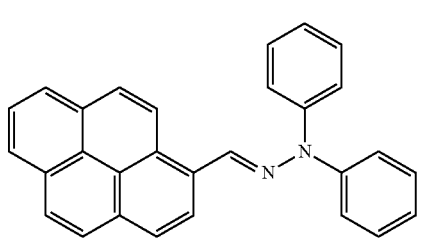

-continued
HTM21
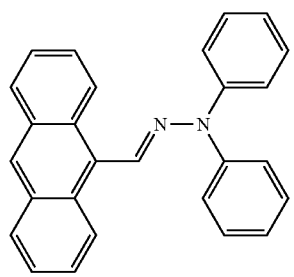
HTM22
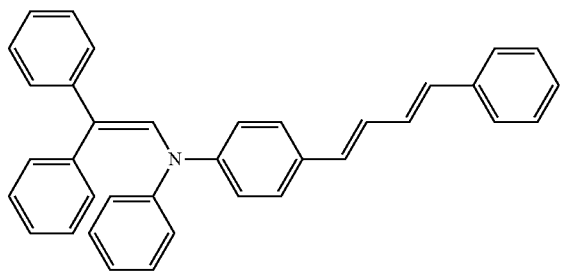
HTM23
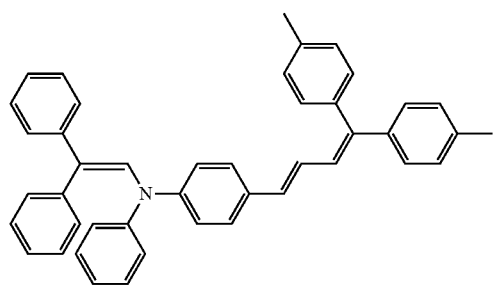
HTM24
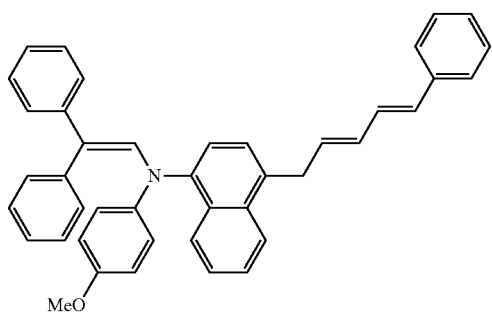
HTM25
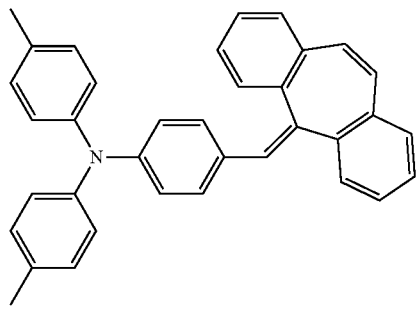
HTM26
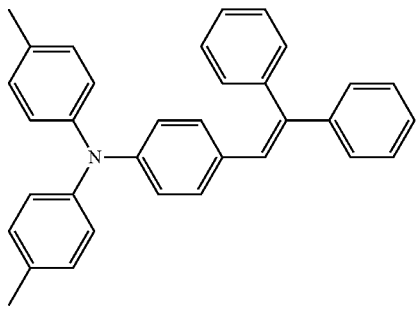
HTM27
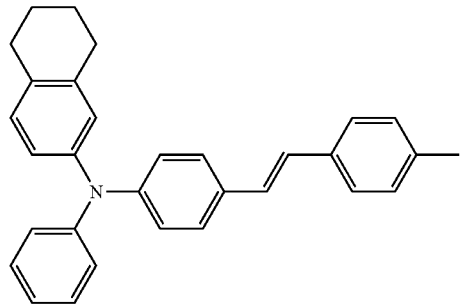
HTM28
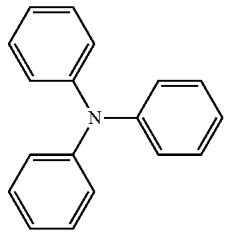

-continued
HTM29
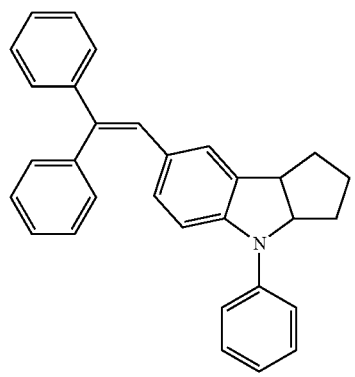
HTM30
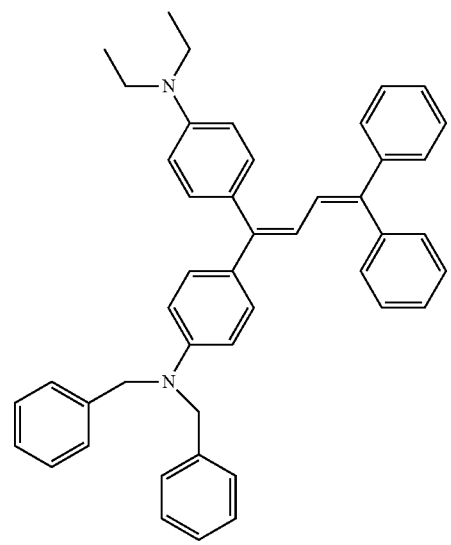
HTM31
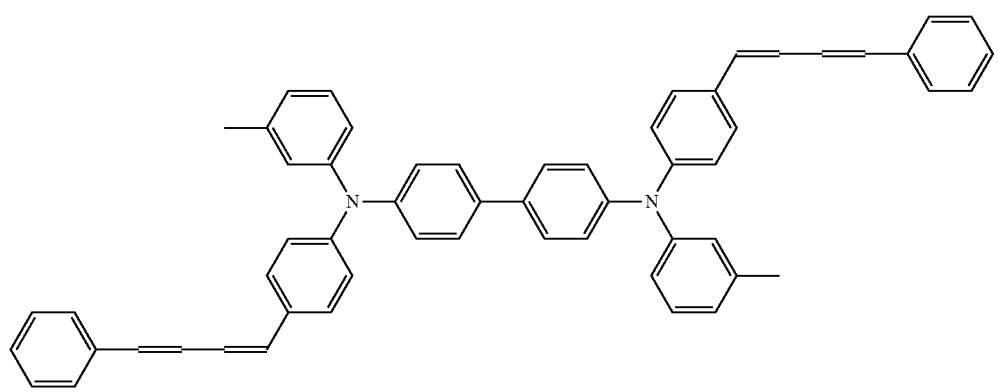
HTM32
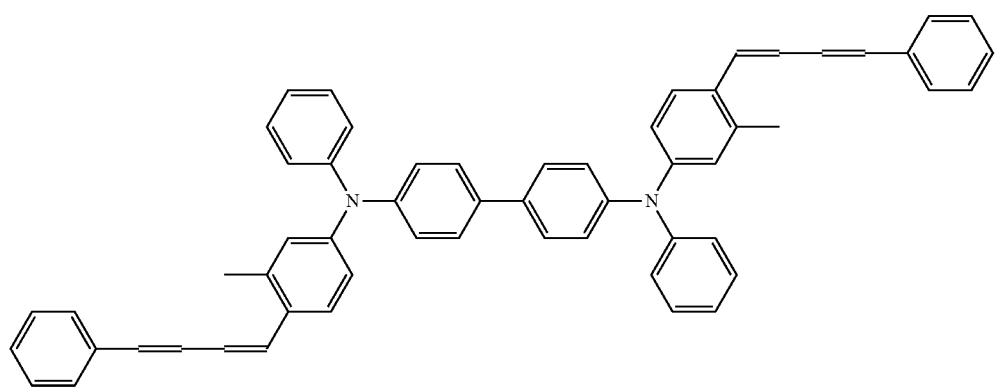

HTM33
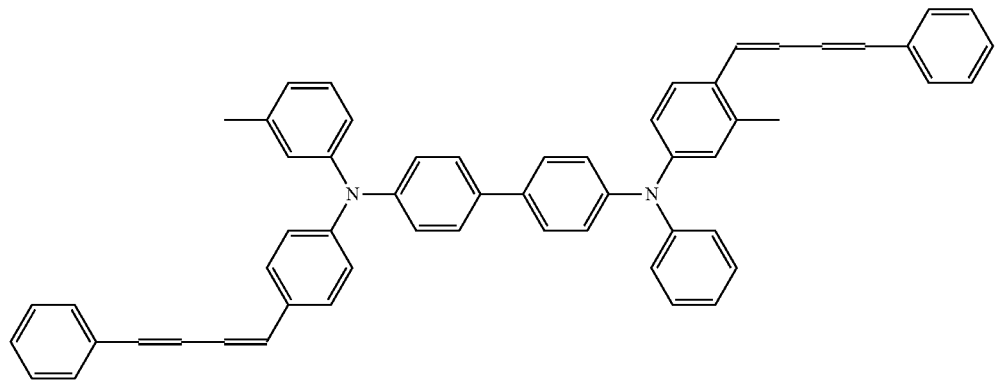
HTM34
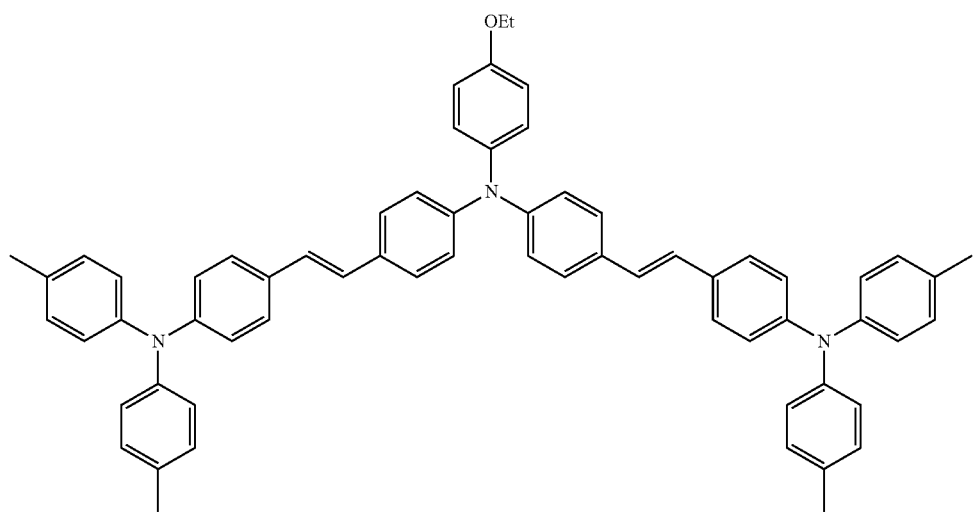
HTM35
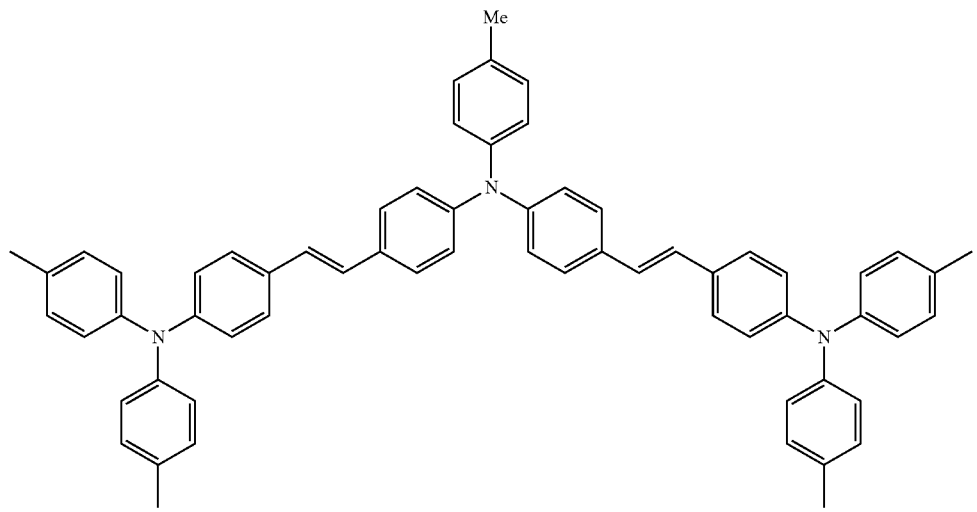

-continued
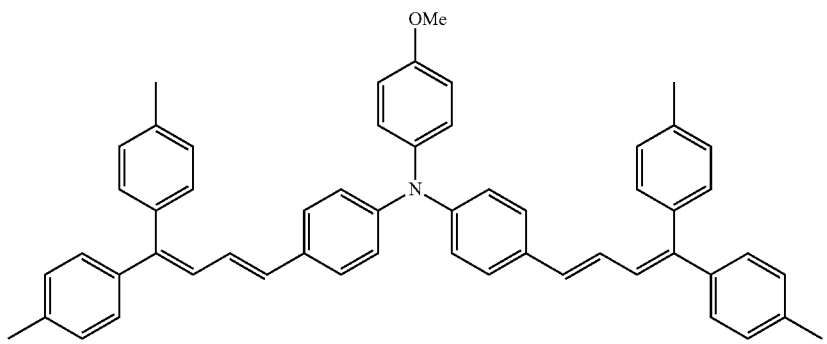
HTM36
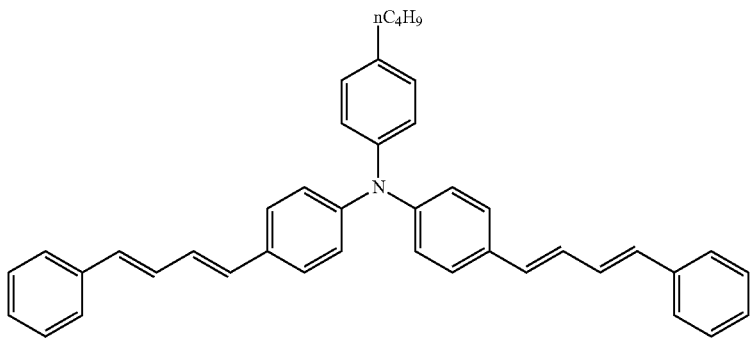
HTM37
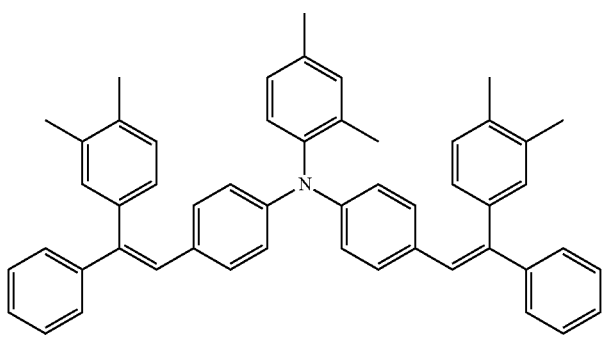
HTM38
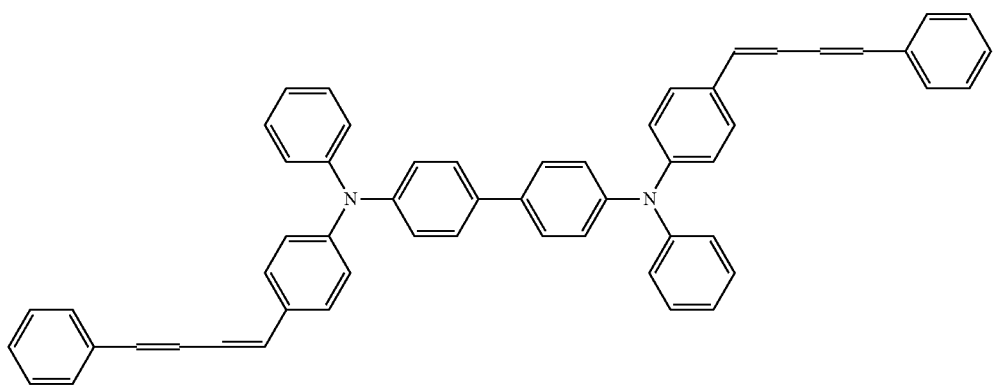
HTM39

HTM40
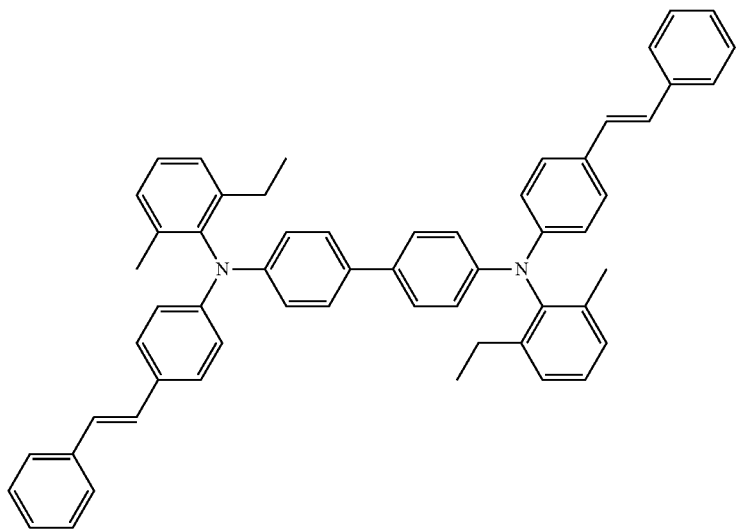
HTM41
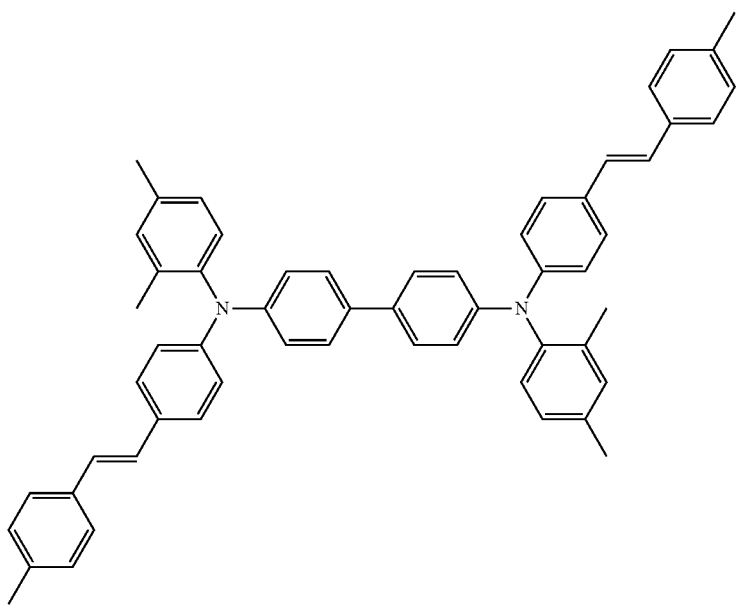
HTM42
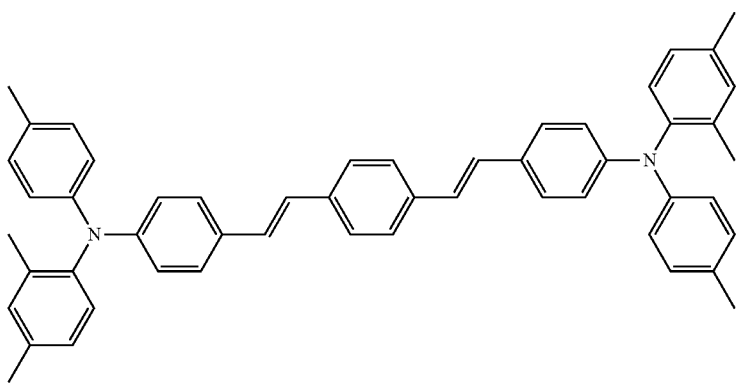

-continued

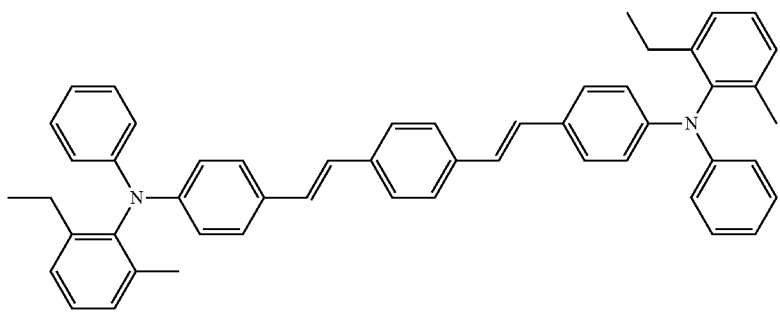
HTM43

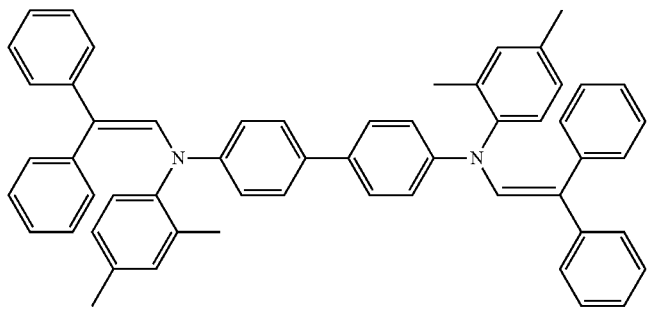
HTM44

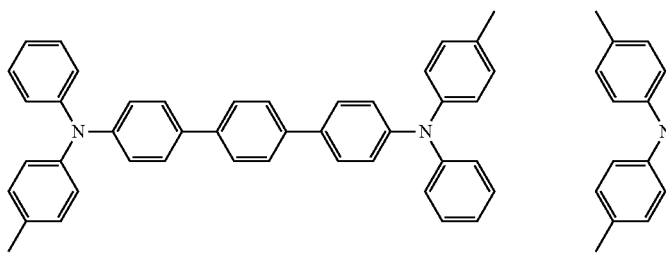
HTM45

HTM46

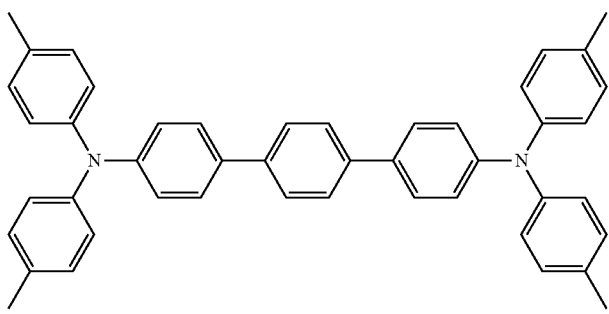
HTM47

The charge transport layer is formed by binding the charge transport substance or the like using the binder resin. Examples of the binder resin include a vinyl polymer such as polymethyl methacrylate, polystyrene, and polyvinyl chloride, and copolymers thereof, a thermoplastic resin such as polycarbonate, polyester, polyester polycarbonate, polysulfone, phenoxy, epoxy, and a silicone resin, and various thermosetting resins. Among these resins, from the viewpoint of light attenuation properties as the photoreceptor and the mechanical strength, the polycarbonate resin or the polyester resin is preferable.

Specific examples of a repeating structure unit suitable for the binder resin will be described below. These specific examples are merely for the sake of illustration, and any well-known binder resin may be mixed and used unless contrary to the gist of the invention.

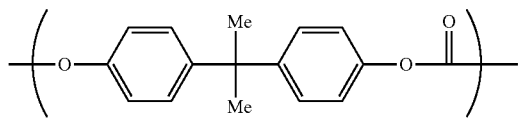

-continued

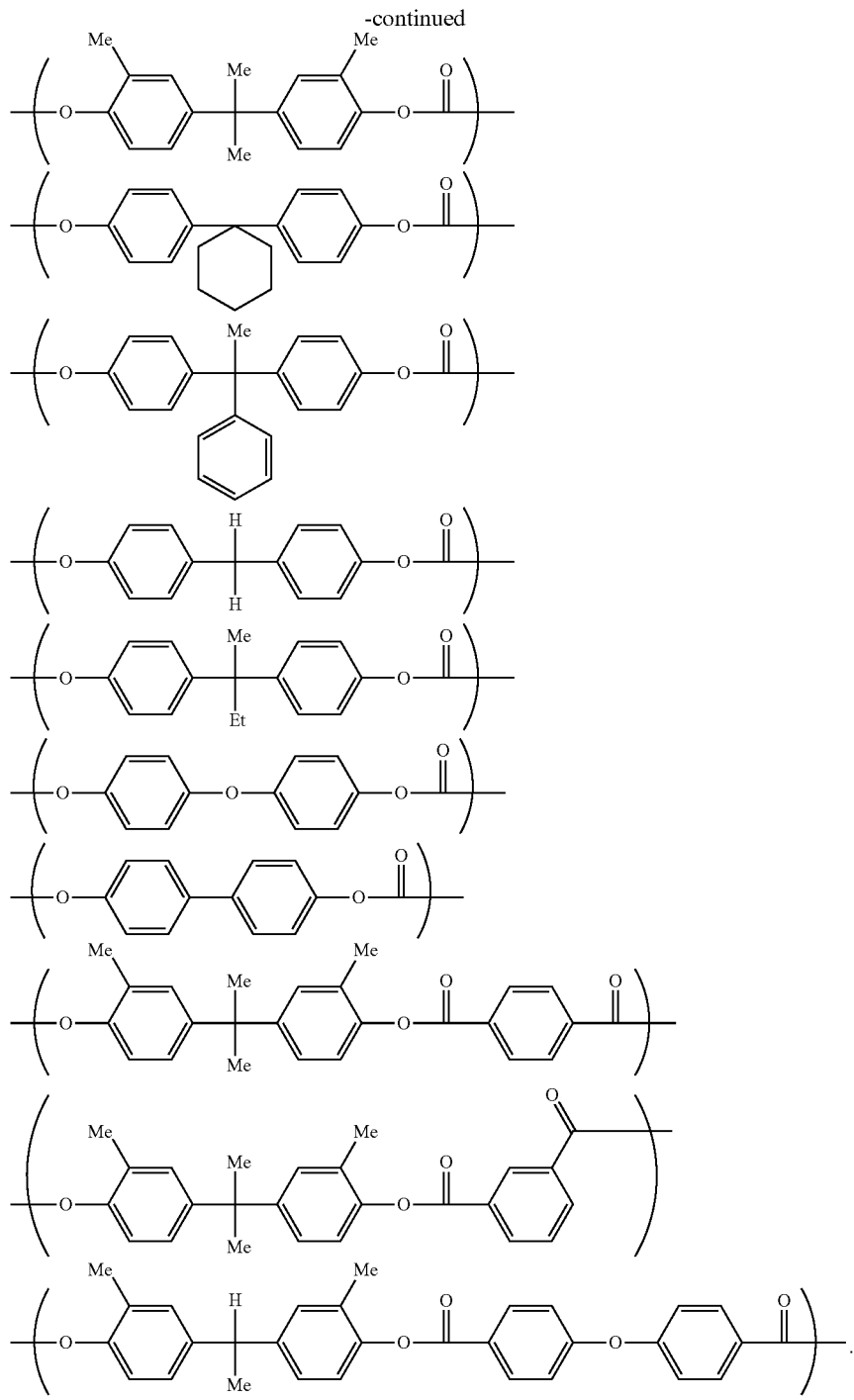

The viscosity average molecular weight of the binder resin is generally 20,000 or more, is preferably 30,000 or more, is more preferably 40,000 or more, and is still more preferably 50,000 or more, and from the viewpoint of creating the coating liquid for forming a photosensitive layer, it is generally 150,000 or less, is preferably 120,000 or less, and is more preferably 100,000 or less.

As the ratio of the charge transport substance to the entire binder resin, generally, a charge transport material is used in an amount of 10 parts by mass or more with respect to 100 parts by mass of the binder resin in the same layer. Among them, the ratio is preferably 20 parts by mass or more from the viewpoint of the reduction of the residual potential, and is further preferably 30 parts by mass or more from the viewpoint of stability and charge mobility in repeated use. On the other hand, the ratio of the charge transport substance is generally 150 parts by mass or more, and from the viewpoint of the thermal stability of the photosensitive layer, it is used in an amount of 120 parts by mass or more. Among them, it is preferably 100 parts by mass or less from the viewpoint of compatibility between the charge transport substance and the binder resin, is more preferably 80 parts by mass or less from the viewpoint of the abrasion resistance.

As the kinds of the fluororesin contained in the charge transport layer, the same kinds as those described in the section of <<Fluororesin and dispersion thereof>> can be used. The content of the fluororesin contained in the charge transport layer is generally 1 parts by mass or more with respect to 100 parts by mass the binder resin, and from the viewpoint of sliding property and abrasion resistance, it is preferably 3 parts by mass or more, and is more preferably 5 parts by mass or more. On the other hand, it is generally 30 parts by mass or less, and from the viewpoint of the stability of the coating liquid and the electrical properties, it is more preferably 25 parts by mass or less.

The content of the dispersant for fluororesin contained in the charge transport layer is generally 0.01 parts by mass or more with respect to 100 parts by mass the binder resin, and from the viewpoint of the dispersibility, it is preferably 0.05 parts by mass or more, and is more preferably 0.1 parts by mass or more. On the other hand, it is generally 3 parts by mass or less, and from the viewpoint of the electrical properties, it is more preferably 2 parts by mass or less.

In order to improve the film forming property, flexibility, coating property, stain resistance, gas resistance, light resistance, and the like, additives such as well-known plasticizers, antioxidants, ultraviolet absorbers, electron-withdrawing compounds, dyes, pigments, leveling agents and the like may be contained. Examples of antioxidants include a hindered phenol compound and a hindered amine compound. Examples of dyes and pigments include various dye compounds, azo compounds and the like.

<Single Layer Type Photosensitive Layer>

The single layer type photosensitive layer is formed of, in addition to the charge generation substance and the charge transport substance, a binder resin for securing the film strength similar to the charge transport layer of the laminated photoreceptor. Specifically, single layer type photosensitive layer can be obtained in such a manner that a coating liquid is prepared by dissolving or dispersing the charge generation substance, the charge transport substance, and various kinds of the binder resins in a solvent, and then the prepared coating liquid is applied and dried on a conductive support (on an undercoat layer in a case of providing the undercoat layer). It is preferable to use a combination of a hole transport substance and an electron transport substance as a charge transport substance. As the hole transport material, the charge transport material exemplified in [Charge transport layer-laminated type] can be used, and as the electron transport substance, a diphenoquinone compound or a dinaphthoquinone compound can be used.

The kinds and the use ratio of the charge generation substance, the charge transport substance, the fluororesin, and the binder resin are the same as those described in the description for charge transport layer of the laminated photoreceptor. The charge generation substance is further dispersed in a charge transport medium formed of the charge transport substance and the binder resin. In a case of the photosensitive layer of the single layer type photoreceptor, it is necessary to make the particle diameter of the charge generation substance sufficiently small. Specifically, it is generally 1 µm or smaller, and is preferably 0.5 µm or smaller.

When the amount of the charge generation substance dispersed in the single layer type photosensitive layer is excessively small, sufficient sensitivity cannot be obtained, whereas when it is excessively large, there are adverse effects such as deterioration of the charging properties and a decrease in sensitivity, and thereby it is generally used in an amount of 0.5% by mass or more, and is preferably 1% by mass or more, and is generally 50% by mass or less, and is preferably 20% by mass or less with respect to the entire single layer type photosensitive layer.

Regarding the use ratio of the charge generation substance to the binder resin in the single layer type photosensitive layer, the charge generation substance is generally 0.1 parts by mass or more, and is preferably 1 part by mass or more, and is generally 30 parts by mass or less, and is preferably 10 parts by mass or less, with respect to 100 parts by mass of the binder resin.

The thickness of the single layer type photosensitive layer is generally 5 µm or more, is preferably 10 µm or more, and is generally 100 µm or less, and is preferably 50 µm or less. Also in this case, known plasticizers for improving film forming property, flexibility, mechanical strength, and the like, additives for suppressing residual potential, dispersion aid for improving dispersion stability, a leveling agent for improving coating property, a surfactant such as a silicone oil, a fluorine-based oil, and other additives may be added to the composition of the invention.

<Other Functional Layers>

For the purpose of improving film forming property, flexibility, coating property, contamination resistance, gas resistance or light fastness, additives such as a well-known antioxidant, a plasticizer, an ultraviolet absorber, an electron-withdrawing compound, a leveling agent, and a visible light shielding agent may be contained in the photosensitive layer or the respective layers to be formed of both the laminated photoreceptor and the single layer type photoreceptor. In addition, for the purpose of reducing the frictional resistance or abrasion of the surface of the photoreceptor or increasing the transfer efficiency of the toner from the photoreceptor to the transfer belt or paper, particles of a silicone resin, a polyethylene resin, or the like or particles of an inorganic compound may be contained in the surface layer. Alternatively, a layer containing these resins or particles may be newly formed as a surface layer. Further, if necessary, a layer for improving electrical and mechanical properties such as a barrier layer, an intermediate layer such as an adhesive layer and a blocking layer, a transparent insulating layer, and the like may be provided.

<Method for Forming Each Layer>

The layers for constituting the photoreceptor are formed in the following manner. The substances to be contained in each layer are dissolved or dispersed in a solvent to obtain a coating liquid. The coating liquids thus obtained for the respective layers are successively applied on a support by a known technique, such as dip coating, spray coating, nozzle coating, bar coating, roll coating, or blade coating, and dried. The constituent layers are formed by repeating this application and drying step for each layer.

The solvent or dispersion medium to be used for producing the coating liquids is not particularly limited. However, specific examples thereof include alcohols such as methanol, ethanol, propanol and 2-methoxyethanol, ethers such as tetrahydrofuran, 1,4-dioxane and dimethoxyethane, esters such as methyl formate and ethyl acetate, ketones such as acetone, methyl ethyl ketone, cyclohexanone, aromatic hydrocarbons such as benzene, toluene, and xylene, chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichlorethylene, nitrogen-containing compounds such as n-butylamine, isopropanolamine, diethylamine, triethanolamine, ethylenediamine, and triethylenediamine, and aprotic polar solvents such as acetonitrile, N-methyl pyrrolidone, N,N-dimethyl formamide, and dimethyl sulfoxide. Among these solvents, a non-halogen type solvent is preferable from the viewpoint of environmental consideration, and from the viewpoint of solubility, toluene, xylene, anisole, dimethoxyethane, tetrahydrofuran, and 1,4-dioxane are particularly preferable. These may be used alone or two or more kinds thereof may be used in combination.

The amount of the solvent or dispersion medium to be used is not particularly limited. It is, however, preferred to suitably regulate the amount thereof so that the properties of the coating liquid, such as solid concentration and viscosity, are within desired ranges, while taking account of the purpose of each layer and the nature of the selected solvent or dispersion medium.

For example, in the case of the charge transport layer of the single layer type photoreceptor and the function separation type photoreceptor, the solid concentration of the coating liquid is generally 5% by mass or more, and is preferably 10% by mass or more, and is generally 40% by mass or less, and is preferably 35% by mass or less. Moreover, the viscosity of the coating liquid is generally 10 cps or more, and is preferably 50 cps or more, and is generally 500 cps or less, and is preferably 400 cps or less.

In the case of the charge generation layer of the laminated photoreceptor, the solid concentration of the coating liquid is generally 0.1% by mass or more, and is preferably 1% by mass or more, and is generally 15% by mass or less, and is preferably 10% by mass or less. Moreover, the viscosity of the coating liquid is generally 0.01 cps or more, and is preferably 0.1 cps or more, and is generally 20 cps or less, and is preferably 10 cps or less.

As methods for applying the coating liquid, there may be mentioned a dip coating method, a spray coating method, a spinner coating method, a bead coating, a wire bar coating method, a blade coating method, a roller coating method, an air-knife coating method, a curtain coating method, and the like. It is also possible to use other known coating methods.

In a preferred method for drying each coating liquid, the coating liquid applied is dried at room temperature until the coating film becomes dry to the touch, and is thereafter dried with heating at a temperature usually in the range of 30° C. to 200° C. for one minute to two hours, stationarily or with air blowing. Further, the heating temperature may be constant, or the heating for drying may be conducted while changing the temperature.

<Image Forming Apparatus>

Next, embodiments of the image forming apparatus (image forming apparatus of the invention) which employs the electrophotographic photoreceptor of the invention are explained by reference to FIG. 1, which illustrates the configuration of a main part of the apparatus. Note that, the embodiments of the apparatus are not limited to the following descriptions and the apparatus can be modified at will unless the modifications depart from the spirit of the invention.

As illustrated in FIG. 1, the image forming apparatus is provided with an electrophotographic photoreceptor 1, a charging device 2, an exposure device 3, and a developing device 4, and if necessary, is further provided with a transfer device 5, a cleaning device 6, and a fixing device 7.

The electrophotographic photoreceptor 1 is not particularly limited as long as it is the electrophotographic photoreceptor of the invention described above. FIG. 1 illustrates, as an example thereof, a drum-shaped photoreceptor obtained by forming the photosensitive layer described above on the surface of a cylindrical conductive support. The charging device 2, the exposure device 3, the developing device 4, the transfer device 5, and the cleaning device 6 are disposed along the peripheral surface of this electrophotographic photoreceptor 1.

Incidentally, the electrophotographic photoreceptor 1 may be combined with one or more of the charging device 2, the exposure device 3, the developing device 4, the transfer device 5, the cleaning device 6, and the fixing device 7 to constitute an integrated cartridge (hereinafter, appropriately referred to as "electrophotographic photoreceptor cartridge"), and this electrophotographic photoreceptor cartridge may be used in a configuration in which the cartridge can be demounted from the main body of an electrophotographic apparatus, such as copier and laser beam printer. In this case, for example, in a case where the electrophotographic photoreceptor 1 and other members are deteriorated, this electrophotographic photoreceptor cartridge is detached from the image forming apparatus main body, and another new electrophotographic photoreceptor cartridge is attached to the image forming apparatus main body so as to easily maintain and manage the image forming apparatus.

EXAMPLES

The specific embodiment of the invention will be described in more detail with reference to examples, but the invention is by no means restricted to the following Examples so long as it does not exceed the gist thereof.

Preparation of (Meth)Acrylate-Containing Resin

<Preparation Example 1> Preparation of Oligomer Solution 1

With stirring under a nitrogen atmosphere, deionized water (24.52 kg), 25% by mass of sodium hydroxide aqueous solution (7.69 kg), sodium hydrosulfite (5.68 g), 2,2-bis(4-hydroxy-3-methyl phenyl) propane (2.5 kg) (hereinafter, referred to as BP-1), and 1,1-bis(4-hydroxyphenyl)-1-phenyl ethane (2.53 kg) (hereinafter, referred to as BP-2) are added and dissolved homogeneously (hereinafter, referred to as an alkaline aqueous solution A).

The reaction was performed for a predetermined time by continuously adding the above solutions into a continuous-now stirred tank reactor (CSTR reaction vessel) equipped with three reaction vessels (1.8 L, 1.8 L, and 4.5 L of internal volumes) having steps so as to satisfy the following conditions. The liquid after the reaction was allowed to stand and separated into an organic phase and an aqueous phase so as to obtain an oligomer solution 1 as the organic phase.

First Reaction Vessel (Internal Temperature 35° C.)
   The above-described alkaline aqueous solution A (7858 ml/hours)
   Dichloromethane (325 ml/hour)
   Gaseous phosgene (10.6 g/minute)

Second Reaction Vessel (Internal Temperature 30° C.)
   Dichloromethane solution of 16% by mass of p-tert-butyl phenol (109 ml/hour)

Third Reaction Vessel (Internal Temperature 30° C.)
   2% by mass of triethylamine aqueous solution (16.8 ml/hour)

Analytical values of the oligomer solution 1 are as follows.
   Oligomer concentration (measured by evaporating and drying): 22.5% by mass Terminal chloroformate group concentration (measured by diluting the oligomer solution with dichloromethane, then adding aniline and pure water, and titrating 0.2 N sodium hydroxide aqueous solution by using phenolphthalein as an indicator): 0.39 N Terminal phenolic hydroxyl group concentration (after the oligomer solution was diluted with dichloromethane, titanium tetrachloride, and acetic acid solution were added to develop color so as to measure the absorbance at a wavelength of 546 nm by using a spectrophotometer ("UV-1200", manufactured by Shimadzu Corporation). Hereinafter, the same applies): 0.10 N <Preparation Example 2> Preparation of Oligomer Solution 2

With stirring under a nitrogen atmosphere, deionized water (27.75 kg), 25% by mass of sodium hydroxide aqueous solution (3.58 kg), sodium hydrosulfite (2.26 g), and 1,1-bis (4-hydroxyphenyl) cyclohexane (2.0 kg) are added and dissolved homogeneously (hereinafter, referred to as an alkaline aqueous solution B). The mixture was continuously added to the same CSTR reaction reactor as in Preparation Example 1 so as to satisfy the following conditions, and the reaction was performed for a predetermined time. The liquid after the reaction was allowed to stand and separated into an organic phase and an aqueous phase so as to obtain an oligomer solution 2 as the organic phase.

First Reaction Vessel (Internal Temperature 35° C.)
  The above-described alkaline aqueous solution B (8835 ml/hour)
  Dichloromethane (2276 ml/hour)
  Gaseous phosgene (6.4 g/minute)
Second Reaction Vessel (Internal Temperature 30° C.)
  Dichloromethane solution of 16% by mass of p-tert-butyl phenol (17.3 ml/hour)

Analytical values of the oligomer solution 2 are as follows.

Oligomer concentration (measured by evaporating and drying): 18.3 by mass

Terminal chloroformate group concentration (measured by diluting the oligomer solution with dichloromethane, then adding aniline and pure water, and titrating 0.2 N sodium hydroxide aqueous solution by using phenolphthalein as an indicator): 0.44 N Terminal phenolic hydroxyl group concentration (after the oligomer solution was diluted with dichloromethane, titanium tetrachloride, and acetic acid solution were added to develop color so as to measure the absorbance at a wavelength of 546 nm by using a spectrophotometer): 0.01 N or less <Preparation Example 3> Preparation of (Meth)Acrylate-Containing Polycarbonate Resin (PC-1)

The above oligomer solution 1 (118.34 g), 4-hydroxybutyl acrylate (0.69 g: prepared by Tokyo Chemical Industry Co., Ltd.) (hereinafter, referred to as 4HBA) and 2-hydroxyethyl methacrylate (0.62 g: prepared by Tokyo Chemical Industry Co., Ltd.) (hereinafter, referred to as 2HEMA) were weighed and mixed homogeneously in a 500 ml four-neck reactor in which nitrogen substitution was performed.

Subsequently, a mixed solution of triethylamine (1.94 g: prepared by Tokyo Chemical Industry Co., Ltd.) and dichloromethane (10 ml) was added dropwise to the reactor cooled to 10° C. over 5 minutes. After continuously stirring at reaction temperature of 10° C. for one hour, dichloromethane (60 nil) was added to dilute, then the reaction solution was washed twice with 0.1 N hydrochloric acid (100 ml), and washed again with demineralized water (100 ml) so as to transfer the washed organic layer to 500 ml four-neck reactor. A mixed solution of separately prepared sodium hydroxide (1.53 g), demineralized water (112 ml), and triethylamine (0.024 g) was added while maintaining the external temperature of the reaction vessel at 10° C. and stirring the washed organic layer.

Thereafter, after continuously stirring for two hours, dilution with dichloromethane (50 ml) was performed, then the stirring was stopped and the mixture was allowed to stand for 30 minutes, and then the organic layer was separated. This organic layer was washed three times with 0.1 N hydrochloric acid (157 ml) and further washed twice with demineralized water (157 nil). A precipitate obtained by pouring the washed organic layer into methanol (1600 ml) was filtered, extracted, and dried so as to obtain a (meth) acrylate-containing polycarbonate resin (PC-1) at a target terminal. The weight average molecular weight (Mw) of the obtained polycarbonate resin was 29,100. The structural formula of the obtained polycarbonate resin (PC-1) is as follows.

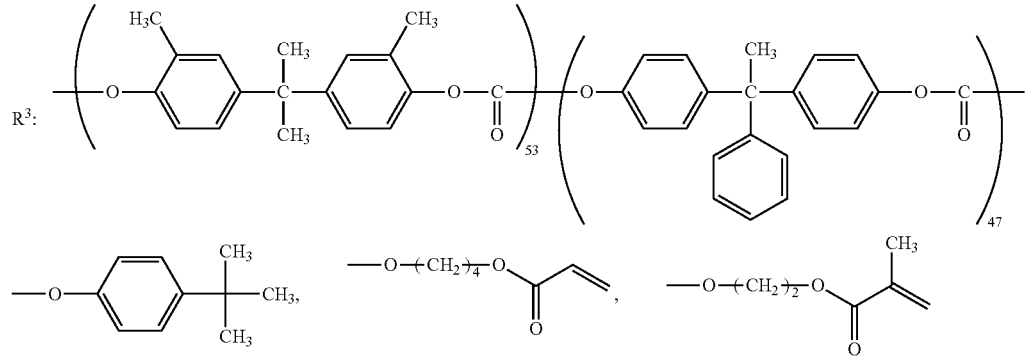

Main Resin Terminal Group: Polycarbonate Resin (PC-1)

[Method of Measuring Weight Average Molecular Weight (Mw)]

Prepared samples were eluted at each molecular weight with gel permeation chromatography (GPC) (column: TSK-GEL GMHXL manufactured by Tosoh Corporation, temperature 40° C., elution solvent: THF) capable of separating molecules of different molecular weights so as to obtain molecular weight distribution. A calibration curve was obtained from a polystyrene standard substance of known molecular weight in advance and the weight average molecular weight (Mw) of the polycarbonate resin was obtained in comparison with the molecular weight distribution of the polycarbonate resin.

<Preparation Example 4> Preparing (Meth)Acrylate-Containing Polycarbonate Resin (PC-2)

The above-described oligomer solution 2 (150.26 g), 4HBA (2.00 g), 2HEMA (0.31 g) and p-tert-butyl phenol (0.50 g) were weighed and mixed homogeneously in a 500 ml four-neck reactor in which nitrogen substitution was performed. Subsequently, a mixed solution of triethylamine (2.16 g) and dichloromethane (10 ml) was added dropwise to the reactor cooled to 10° C. over five minutes. After continuously stirring at reaction temperature of 10° C. for 1.5 hours, dichloromethane (60 ml) was added to dilute, then the reaction solution was washed twice with 0.1 N hydrochloric acid (120 ml), and washed again with demineralized water (120 ml) so as to transfer the washed organic layer to 500 ml four-neck reactor. A mixed solution of separately prepared sodium hydroxide (3.40 g), demineralized water (108 ml), and triethylamine (0.037 g) was added while maintaining the external temperature of the reaction vessel at 10° C. and stirring the washed organic layer.

Thereafter, after continuously stirring for two hours, dilution with dichloromethane (50 ml) was performed, then the stirring was stopped and the mixture was allowed to stand for 30 minutes, and then the organic layer was separated. This organic layer was washed three times with 0.1 N hydrochloric acid (157 ml) and further washed twice with demineralized water (157 ml). A precipitate obtained by pouring the washed organic layer into methanol (1600 ml) was filtered, extracted, and dried so as to obtain a (meth)acrylate-containing polycarbonate resin (PC-2) at a target terminal. The weight average molecular weight (Mw) of the obtained polycarbonate resin was 20,300. The structural formula of the obtained polycarbonate resin (PC-2) is as follows.

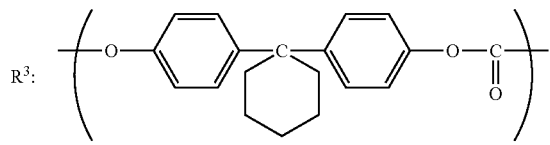

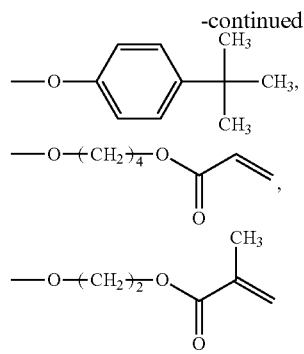

Main Resin Terminal Group: Polycarbonate Resin (PC-2)

<Preparation Example 5> Preparation of (Meth)Acrylate-Containing Polyester Resin (PE-1)

4HBA (1.21 g), terephthaloyl chloride (6.56 g: prepared by Tokyo Chemical Industry Co., Ltd.) (hereinafter, referred to as TPACL), and isophthaloyl chloride (6.56 g: prepared by Tokyo Chemical Industry Co., Ltd.) (hereinafter, referred to as IPACL) were weighed, dichloromethane (50 ml) was added thereto, and the mixture was dissolved in a 500 ml four-neck reactor. Subsequently, a mixed solution of triethylamine (1.15 g) and dichloromethane (10 ml) was added dropwise to the reactor cooled to 10° C. over five minutes, and then the stirring was performed at a reaction temperature 15° C. to 20° C. for one hour. After adding BP-1 (15.37 g) in the reactor, separately prepared triethylamine (13.00 g) and a dichloromethane (70 ml) solution were added dropwise for 20 minutes. After stirring for 30 minutes and performing dilution with the dichloromethane (70 ml), stirring was continuously performed for four hours. The above reaction solution was added to a separately prepared container where demineralized water (160 ml) was added and stirred, and then stirred for 30 minutes so as to perform washing with water.

Thereafter, the organic layer was separated, and this separated organic layer was washed three times with 0.2 N hydrochloric acid (160 ml) and further washed twice with demineralized water (160 ml). A precipitate obtained by pouring the washed organic layer into methanol (1800 ml) was filtered, extracted, and dried so as to obtain a (meth)acrylate-containing polyester resin (PE-1) at a target terminal. The weight average molecular weight (Mw) of the obtained polyester resin was 15,800. The structural formula of the polyester resin (PE-1) is as follows,

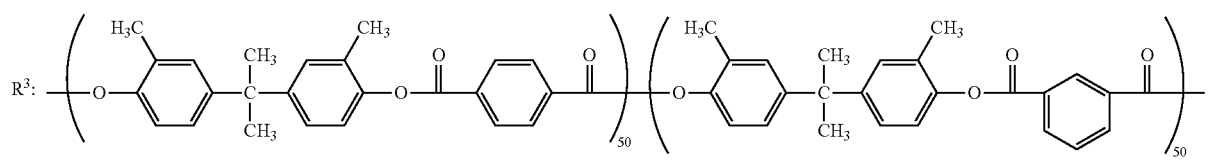

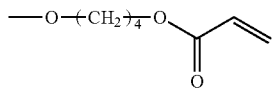

Main Resin Terminal Group: Polyester Resin PE-1)

<Preparation Example 6> Preparation of (Meth)Acrylate-Containing Polyester Resin (PE-2)

4HBA (2.04 g), TPACL (6.54 g), and IPACL (6.54 g) were weighed, dichloromethane (50 ml) was added thereto, and the mixture was dissolved in a 500 ml four-neck reactor. Subsequently, a mixed solution of triethylamine (1.90 g) and dichloromethane (10 ml) was added dropwise to the reactor cooled to 10° C. over five minutes, and then the stirring was performed at a reaction temperature 1.5° C. to 20° C. for one hour. After adding BP-1 (14.57 g) in the reactor, separately prepared triethylamine (12.20 g) and a dichloromethane (70 ml) solution were added dropwise for 20 minutes. After stirring for 30 minutes and performing dilution with the dichloromethane (70 ml), stirring was continuously performed for four hours. The above reaction solution was added to a separately prepared container where demineralized water (160 ml) was added and stirred, and then stirred for 30 minutes so as to perform washing with water.

Thereafter, the organic layer was separated, and this separated organic layer was washed three times with 0.2 N hydrochloric acid (160 ml) and further washed twice with demineralized water (160 ml). A precipitate obtained by pouring the washed organic layer into methanol (1800 ml) was filtered, extracted, and dried so as to obtain a (meth)acrylate-containing polyester resin (PE-2) at a target terminal. The weight average molecular weight (Mw) of the obtained polyester resin was 9,700. The structural formula of the polyester resin (PE-2) is as follows.

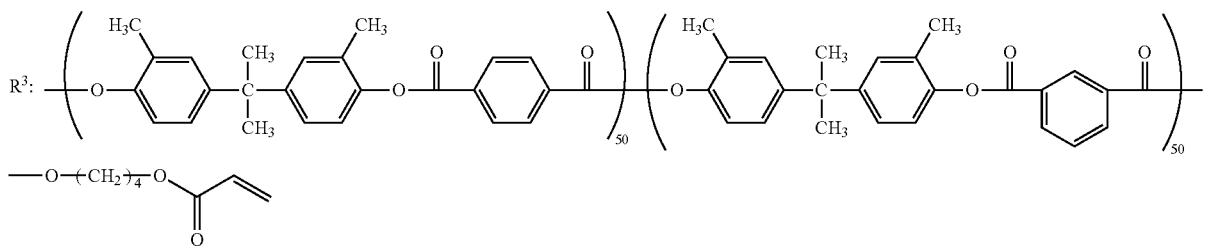

Main Resin Terminal Group: Polyester Resin (PE-2)

<Preparation Example 7> Preparation of (MeTH)Acrylate-Containing Polyester Resin (PE-3)

4HBA (1.21 g), 2,3,5-trimethyl phenol (0.38 g), TPACL (6.60 g), and IPACL (6.60 g) were weighed, dichloromethane (50 ml) was added thereto, and the mixture was dissolved in a 500 ml tour-neck reactor. Subsequently, a mixed solution of triethylamine (1.50 g) and dichloromethane (10 ml) was added dropwise to the reactor cooled to 10° C. over five minutes, and then the stirring was performed at a reaction temperature 15° C. to 20° C. for one hour. After adding BP-1 (15.11 g) in the reactor, separately prepared triethylamine (12.90 g) and a dichloromethane (70 ml) solution were added dropwise for 20 minutes. After stirring for 30 minutes and performing dilution with the dichloromethane (70 ml), stirring was continuously performed for four hours. The above reaction solution was added to a separately prepared container where demineralized water (160 ml) was added and stirred, and then stirred for 30 minutes so as to perform washing with water.

Thereafter, the organic layer was separated, and this separated organic layer was washed three times with 0.2 N hydrochloric acid (160 ml) and further washed twice with demineralized water (160 ml). A precipitate obtained by pouring the washed organic layer into methanol (1800 ml) was filtered, extracted, and dried so as to obtain a (meth)acrylate-containing polyester resin (PE-3) at a target terminal. The weight average molecular weight (Mw) of the obtained polyester resin was 11,400. The structural formula of the polyester resin (PE-3) is as follows.

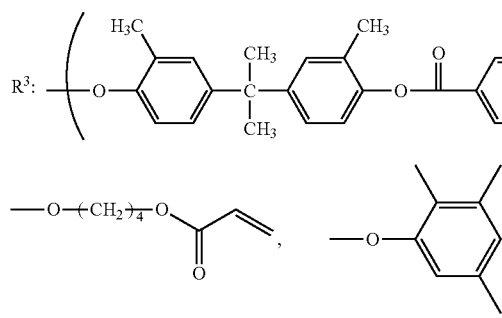
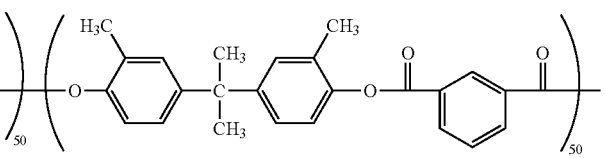

Main Resin Terminal Group: Polyester Resin (PE-3)

<Preparation Example 8> Preparation of (Meth)Acrylate-Containing Polyester Resin (PE-4)

4HBA (1.04 g) and diphenyl ether-4,4'-dicarboxylic acid chloride (15.40 g: Iharanikkei Chemical Industry Co., Ltd.) were weighed, dichloromethane (50 ml) was added thereto, and the mixture was dissolved in a 500 ml four-neck reactor. Subsequently, a mixed solution of triethylamine (0.84 g) and dichloromethane (10 ml) was added dropwise to the reactor cooled to 10° C. over five minutes, and then the stirring was performed at a reaction temperature 15° C. to 20° C. for one hour. After adding BP-1 (12.37 g) in the reactor, separately prepared triethylamine (10.55 g) and a dichloromethane (70 ml) solution were added dropwise for 20 minutes. After stirring for 30 minutes and performing dilution with the dichloromethane (70 ml), stirring was continuously performed for four hours. The above reaction solution was added to a separately prepared container where demineralized water (160 ml) was added and stirred, and then stirred for 30 minutes so as to perform washing with water.

Thereafter, the organic layer was separated, and this separated organic layer was washed three times with 0.2 N hydrochloric acid (160 ml) and further washed twice with demineralized water (160 ml). A precipitate obtained by pouring the washed organic layer into methanol (1,800 ml) was filtered, extracted, and dried so as to obtain a (meth)acrylate-containing polyester resin (PE-4) at a target terminal. The weight average molecular weight (Mw) of the obtained polyester resin was 19,300. The structural formula of the polyester resin (PE-4) is as follows.

weighed, dichloromethane (200 ml) was added thereto, and the mixture was dissolved in a 1,000 ml four-neck reactor. Subsequently, a mixed solution of triethylamine (5.40 g) and dichloromethane (10 ml) was added dropwise to the reactor cooled to 10° C. for five minutes, and then the stirring was performed at a reaction temperature 15° C. to 20° C. for one hour. After 1,1-bis(4-hydroxyphenyl)-1-phenyl ethane (50.00 g) was added into the reactor, dilution was performed with dichloromethane (200 ml). Subsequently, separately prepared triethylamine (37.90 g) and a dichloromethane (100 ml) solution were added dropwise for 30 minutes. After stirring for 30 minutes and performing dilution with the dichloromethane (250 ml), stirring was continuously performed for four hours. The above reaction solution was added to a separately prepared container where demineralized water (600 ml) was added and stirred, and then stirred for 30 minutes so as to perform washing with water.

Thereafter, the organic layer was separated, and this separated organic layer was washed three times with 0.2 N hydrochloric acid (600 ml) and further washed twice with demineralized water (600 ml). A precipitate obtained by pouring the washed organic layer into methanol (5,000 ml)

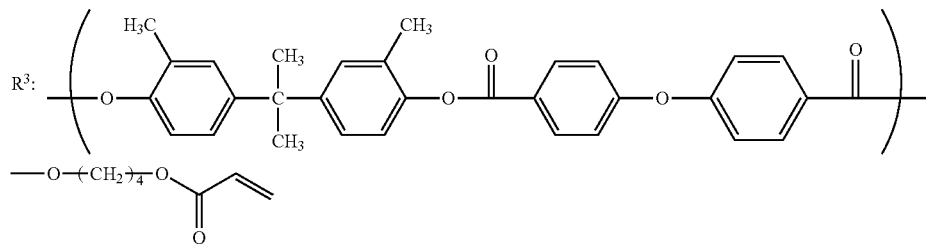

Main Resin Terminal Group: Polyester Resin (PE-4)

<Preparation Example 9> Preparation of (Meth)Acrylate-Containing Polyester Resin (PE-5)

4HBA (4.84 g), 2,3,5-trimethyl phenol (1.52 g), diphenyl ether-4,4'-dicarboxylic acid chloride (58.20 g) were was filtered, extracted, and dried so as to obtain a (meth)acrylate-containing polyester resin (PE-5) at a target terminal. The weight average molecular weight (Mw) of the obtained polyester resin was 11,000. The structural formula of the polyester resin (PE-5) is as follows.

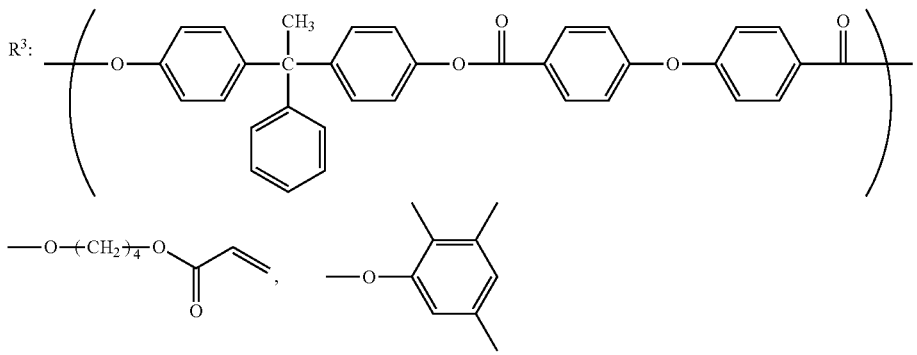

Main Resin Terminal Group: Polyester Resin (PE-5)

<Preparation Example 10> Preparation of Polyester Resin (PE-6) Containing (Meth)Acrylate 4HBA (1.00 g), 2,3,5-trimethyl phenol (0.95 g), diphenyl ether-4,4'-dicarboxylic acid Chloride (15.76 g) were weighed, dichloromethane (50 ml) was added thereto, and the mixture was dissolved in a 500 ml four-neck reactor. Subsequently, a mixed solution of triethylamine (1.83 g) and dichloromethane (10 ml) was added dropwise to the reactor cooled to 10° C. over five minutes, and then the stirring was performed at a reaction temperature 15° C. to 20° C. for one hour. After adding 1,1-bis(4-hydroxy-3-methyl phenyl) ethane (11.16 g) in the reactor, separately prepared triethylamine (9.90 g) and a dichloromethane (70 ml) solution were added dropwise for 20 minutes. After stirring for 30 minutes and performing dilution with the dichloromethane (70 ml), stirring was continuously performed for four hours. The above reaction solution was added to a separately prepared container where demineralized water (160 ml) was added and stirred, and then stirred for 30 minutes so as to perform washing with water.

Thereafter, the organic layer was separated, and this separated organic layer was washed three times with 0.2 N hydrochloric acid (160 ml) and further washed twice with demineralized water (160 ml). After performing dilution with dichloromethane (100 ml), a precipitate obtained by pouring the washed organic layer into methanol (1,800 ml) was filtered, extracted, and dried so as to obtain a (meth)acrylate-containing polyester resin (PE-6) at a target terminal. The weight average molecular weight (Mw) of the obtained polyester resin was 12,400. The structural formula of the polyester resin (PE-6) is as follows.

Main Resin Terminal Group: Polyester Resin (PE-6)

Preparation of Perfluoroalkyl Acrylate Polymer

<Preparation Example 11> Preparation of Polyacrylate-Polycarbonate Polymer (Polymer 1)

The polycarbonate resin (PC-1) (0.65 g) prepared in Preparation Example 3, 2-(perfluorohexyl) ethyl acrylate having the structure of Formula (13) (0.35 g: prepared by Tokyo Chemical Industry Co., Ltd.) (hereinafter, referred to as PFHA), and anisole (3.00 ml) were added in a 50 ml four-necked reaction vessel, and the mixture was heated to 115° C. and stirred under a nitrogen atmosphere.

Benzoyl peroxide (10 mg: prepared by Tokyo Chemical Industry Co., Ltd., about 25% water-wetted product) (hereinafter, referred to as BPO) which is a polymerization initiator was added thereto and stirring was continuously performed for 30 minutes. After cooling to room temperature, dilution was performed by adding tetrahydrofuran (7.00 ml), then the obtained solution was poured into methanol (60 ml), and the resulting precipitate was filtered, extracted, and dried so as to obtain a desired polyperfluoroalkyl acrylate-polycarbonate resin polymer (polymer 1). The weight average molecular weight (Mw) of the obtained polymer was 36,900.

Formula (13)

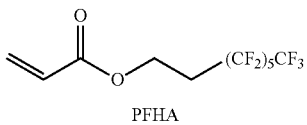

PFHA

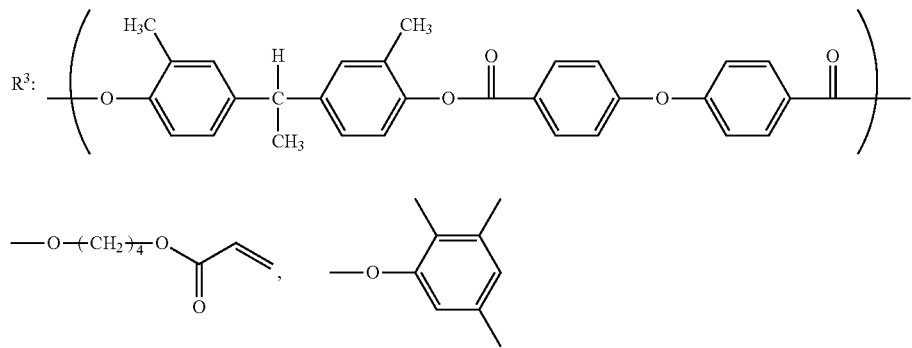

Repeating Structure of Polymer 1

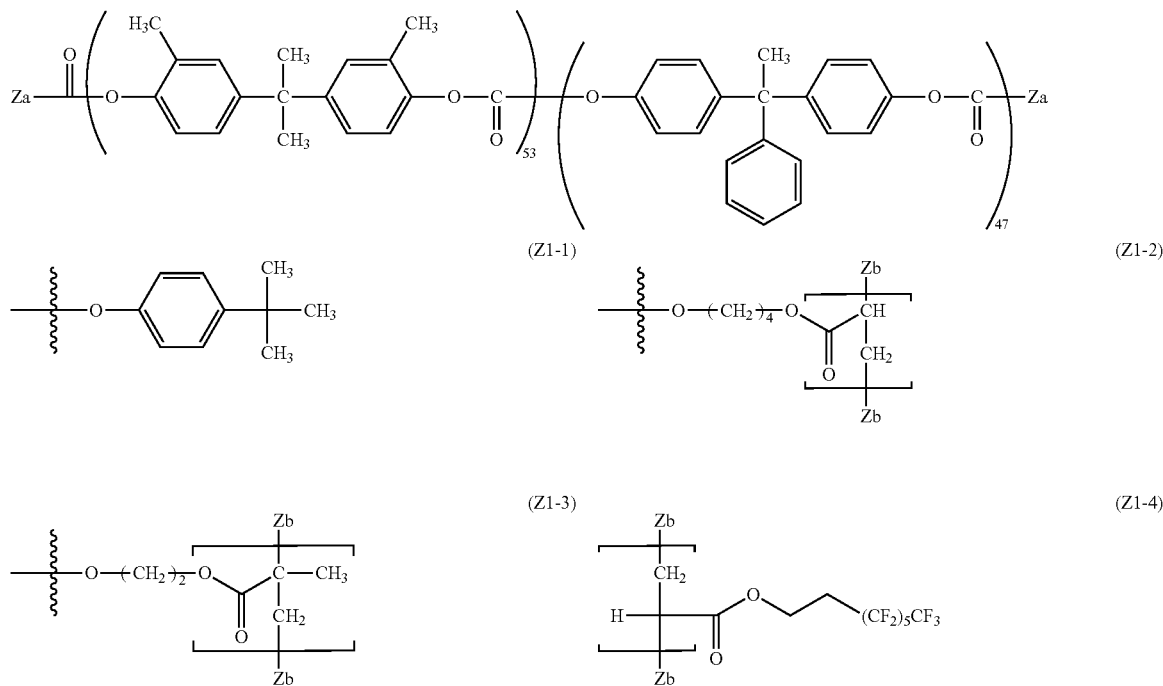

Here, (Z1-1), (Z1-2), or (Z1-3) independently exists in a binding site Za, and Zb's independently exist in a state of being bonded to each other in a binding site Zb in (Z1-2), (Z1-3), and (Z1-4).

<Preparation Example 12> Preparation of Polyacrylate-Polycarbonate Polymer (Polymer 2)

A polyperfluoroalkyl acrylate-polycarbonate resin polymer (polymer 2) was obtained by the same operation with that used in Preparation Example 11 except that a polycarbonate resin (PC-1) (0.55 g), PFHA (0.40 g), and tetrahydrofurfuryl acrylate (0.05 g: prepared by Tokyo Chemical Industry Co., Ltd.) (hereinafter, referred to as "THFA") having a structure represented by Formula (4) were used as a compound having (meth)acrylate. The weight average molecular weight (Mw) of the obtained polymer was 39,200.

Formula (14)

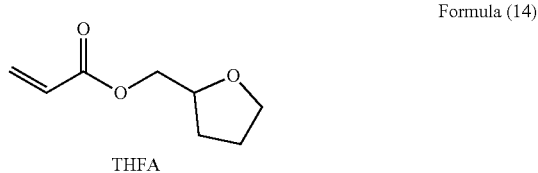

THFA

Repeating Structure of Polymer 2

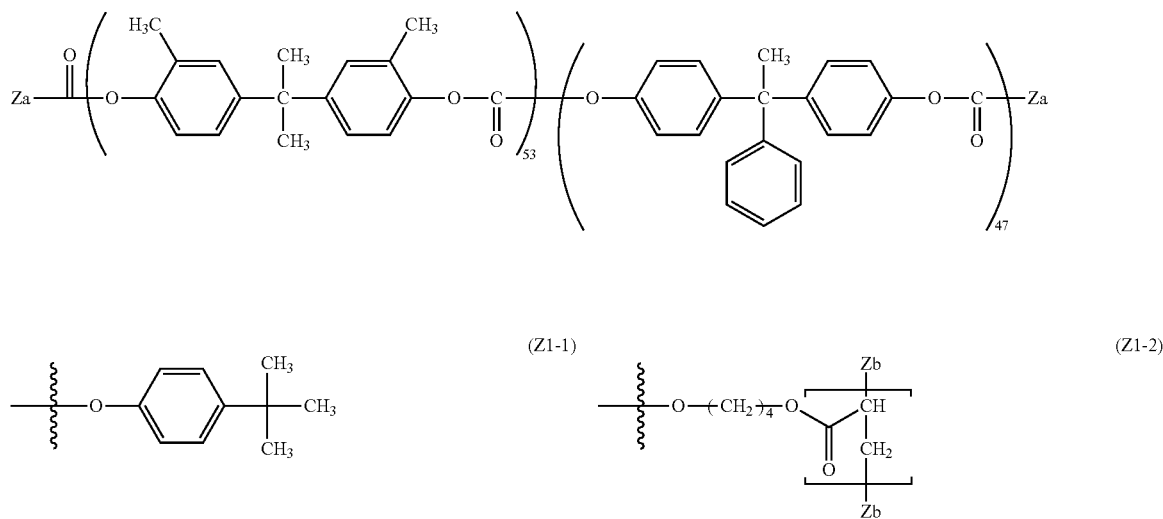

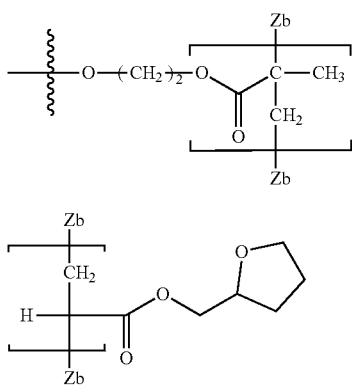

Here, (Z1-1), (Z1-2), or (Z1-3) independently exists in a binding site Za, and Zb's independently exist in a state of being bonded to each other in a binding site Zb in (Z1-2), (Z1-3), (Z1-4), and (Z1-5).

<Preparation Example 13> Preparation of Polyacrylate-Polycarbonate Polymer (Polymer 3)

The polycarbonate resin (PC-2) (3.84 g) prepared in Preparation Example 4, PFHA (2.16 g), and anisole (18 ml) were added in a 100 ml four-necked reaction vessel, and the mixture was heated to 115° C. and stirred under a nitrogen atmosphere. Here. BPO (60 mg) which is a polymerization initiator was added and continuously stirred for 30 minutes. After cooling to room temperature, dilution was performed by adding tetrahydrofuran (42 ml), then the obtained solution was poured into methanol (250 ml), and the resulting precipitate was filtered, extracted, and dried so as to obtain a desired polyperfluoroalkyl acrylate-polycarbonate resin polymer (polymer 3). The weight average molecular weight (Mw) of the obtained polymer was 29,400.

Repeating Structure of Polymer 3

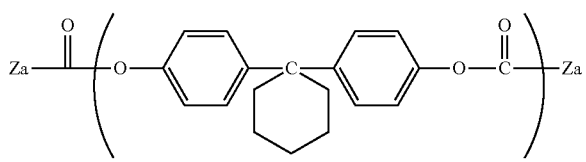

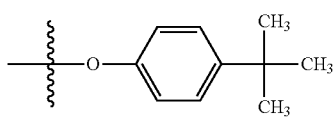
(Z1-1)

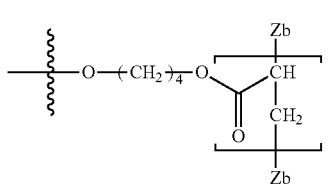
(Z1-2)

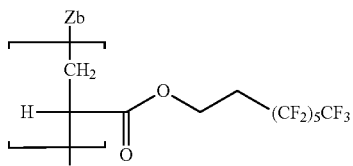
(Z1-3)

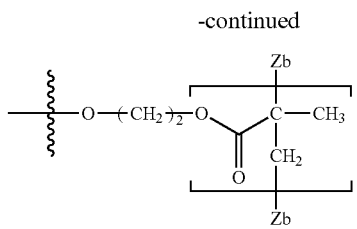
(Z1-4)

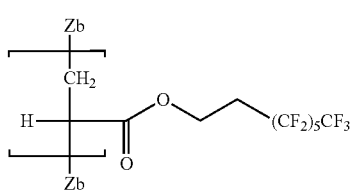
(Z1-3)

(Z1-4)

Here, (Z1-1), (Z1-2), or (Z1-3) independently exists in a binding site Za, and Zb's independently exist in a state of being bonded to each other in a binding site Zb in (Z1-2), (Z1-3), and (Z1-4).

<Preparation Example 14> Preparation of Polyacrylate-Polyester Polymer (Polymer 4)

The polyester resin (PE-1) (0.60 g) prepared in Preparation Example 5, PFHA (0.40 g), and anisole (3.00 ml) were added in a 50 ml four-necked reaction vessel, and the mixture was heated to 115° C. and stirred under a nitrogen atmosphere. 2,2'-azobis (isobutyronitrile) (10 mg: prepared by Tokyo Chemical Industry Co., Ltd.) (hereinafter, referred to as AIBN) which is a polymerization initiator was added thereto and stirring was continuously performed for 30 minutes. After cooling to room temperature, dilution was performed by adding tetrahydrofuran (7.00 ml), then the obtained solution was poured into methanol (60 ml), and the resulting precipitate was filtered, extracted, and dried so as to obtain a desired polyperfluoroalkyl acrylate-polyester resin polymer (polymer 4). The weight average molecular weight (Mw) of the obtained polymer was 79,400.

Repeating Structure of Polymer 4

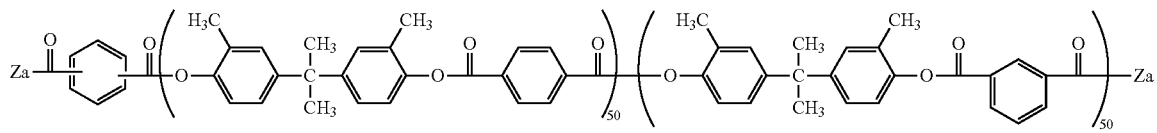

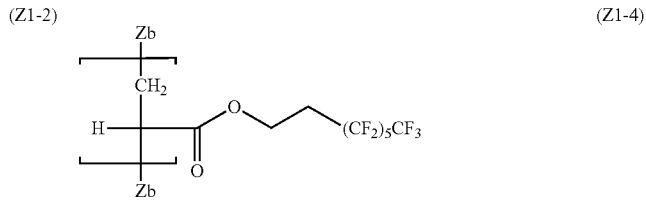

Here, (Z1-2) exists in a binding site Za, and Zb's independently exist in a state of being bonded to each other in a binding site Zb in (Z1-2) and (Z1-4).

<Preparation Example 15> Preparation of Polyacrylate-Polyester Polymer (Polymer 5)

A polyperfluoroalkyl acrylate-polyester resin polymer (polymer 5) was obtained by the same operation with that used in Preparation Example 14 except that a polyester resin (PE-1) (0.50 g) and PFHA (0.50 g) were used as a compound having (meth)acrylate. The weight average molecular weight (Mw) of the obtained polymer was 130,400.

The repeating structure unit of the polymer 5 is the same as that of the polymer 4.

<Preparation Example 16> Preparation of Polyacrylate-Polyester Polymer (Polymer 6)

A polyperfluoroalkyl acrylate-polyester resin polymer (polymer 6) was obtained by the same operation with that used in Preparation Example 14 except that a polyester resin (PE-1) (0.40 g) and PFHA (0.60 g) were used as a compound having (meth)acrylate. The weight average molecular weight (Mw) of the obtained polymer was 58,400.

The repeating structure unit of the polymer 6 is the same as that of the polymer 4.

<Preparation Example 17> Preparation of Poly Acrylate-Polyester Polymer (Polymer 7)

A polyperfluoroalkyl acrylate-polyester resin polymer (polymer 7) was obtained by the same operation with that used in Preparation Example 14 except that the polyester resin (PE-2) (0.60 g) prepared in Preparation Example 6 and PFHA (0.40 g) were used as a compound having (meth)acrylate, and the operation was performed at a reaction temperature of 130° C. The weight average molecular weight (Mw) of the obtained polymer was 80,500.

The repeating structure unit of the polymer 7 is the same as that of the polymer 4.

<Preparation Example 18> Preparation of Polyacrylate-Polyester Polymer (Polymer 8)

A polyperfluoroalkyl acrylate-polyester resin polymer (polymer 8) was obtained by the same operation with that used in Preparation Example 14 except that the polyester resin (PE-3) (0.67 g) prepared in Preparation Example 7 and PFHA (0.40 g) were used as a compound having (meth)acrylate. The weight average molecular weight (Mw) of the obtained polymer was 34,900.

Repeating Structure of Polymer 8

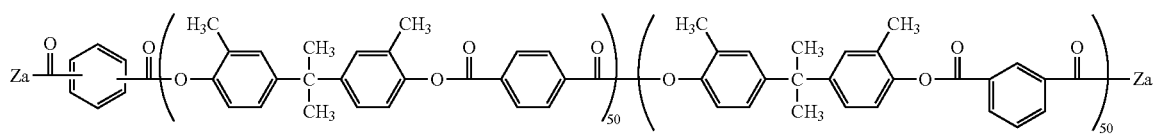

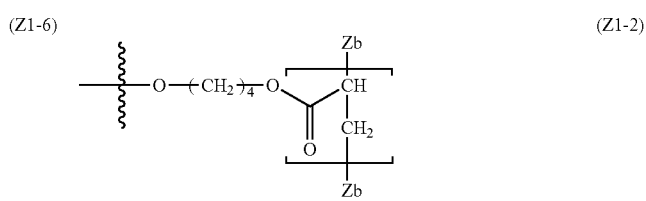

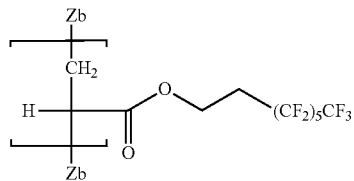

Here, (Z1-6) or (Z1-2) independently exists in a binding site Za, and Zb's independently exist in a state of being bonded to each other in a binding site Zb in Z1-2) and (Z1-4).

<Preparation Example 19> Preparation of Polyacrylate-Polyester Polymer (Polymer 9)

A polyperfluoroalkyl acrylate-polyester resin polymer (polymer 9) was obtained by the same operation with that used in Preparation Example 14 except that the polyester resin (PE-4) (0.65 g) prepared in Preparation Example 8 and PFHA (0.35 g) were used as a compound having (meth) acrylate. The weight average molecular weight (Mw) of the obtained polymer was 40.800.

Repeating Structure of Polymer 9

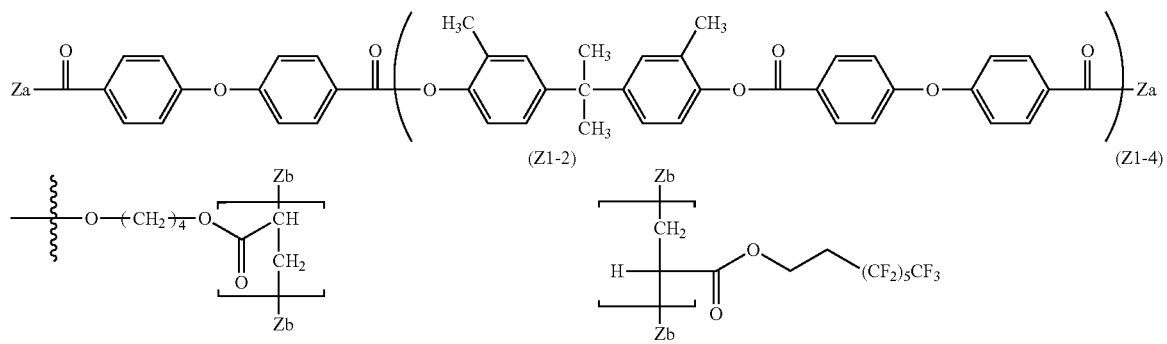

Here, (Z1-2) exists in a binding site Za, and Zb's independently exist in a state of being bonded to each other in a binding site Zb in (Z1-2) and (Z1-4).

<Preparation Example 20> Preparation of Acrylate-Polyester Polymer (Polymer 10)

A polyperfluoroalkyl acrylate-polyester resin polymer (polymer 10) was obtained by the same operation with that used in Preparation Example 14 except that the polyester resin (PE-5) (0.60 g) prepared in Preparation Example 9 and PFHA (0.40 g) were used as a compound having (meth) acrylate. The weight average molecular weight (Mw) of the obtained polymer was 43,000.

Repeating Structure of Polymer 10

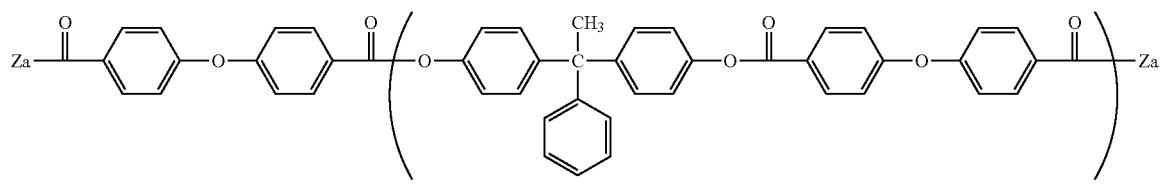

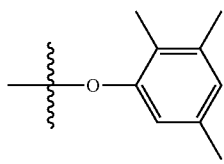
(Z1-6)

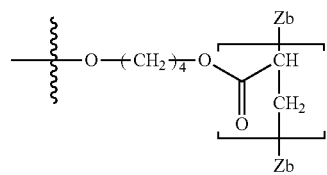
(Z1-2)

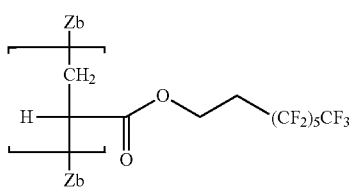
(Z1-4)

Here, (Z1-6) or (Z1-2) independently exists in a binding site Za, and Zb's independently exist in a state of being bonded to each other in a binding site Zb in (Z1-2) and (Z1-4).

<Preparation Example 21> Preparation of Acrylate-Polyester Polymer (Polymer 11)

A polyperfluoroalkyl acrylate-polyester resin polymer (polymer 11) was obtained by the same operation with that used in Example 14 except that the polyester resin (PE-6) (0.50 g) prepared in Preparation Example 10 and PFHA (0.50 g) were used as a compound having (meth)acrylate. The weight average molecular weight (Mw) of the obtained polymer was 24,500.
Repeating Structure of Polymer 11

Here, (Z1-6) or (Z1-2) independently exists in a binding site Za, and Zb's independently exist in a state of being bonded to each other in a binding site Zb in (Z1-2) and (Z1-4).

<Preparation Comparative Example 1> Preparation of Acrylate-Polyester Polymer (Polymer 12)

When the same operation as that in Preparation Example 14 except that a polyester resin (PE-A) (0.60 g) having the following repeating structure which does not have (meth)acrylate in the resin and PFHA (0.40 g) were used, a homopolymer of poorly soluble PFHA was precipitated in the lower portion of the reaction solution, and thereby a polymer of polyperfluoroalkyl acrylate-polyester resin was not able to be obtained,

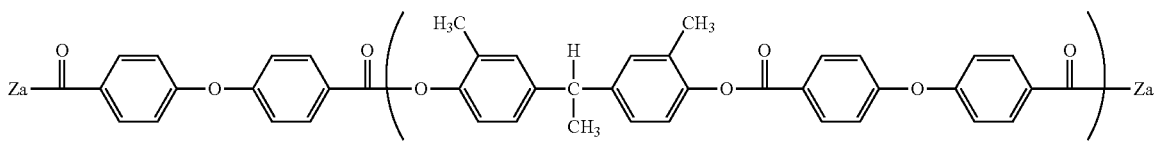

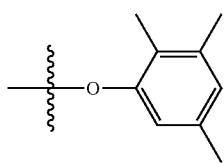
(Z1-6)

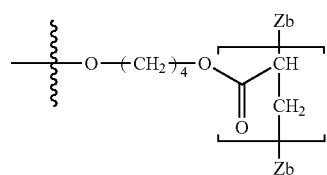
(Z1-2)

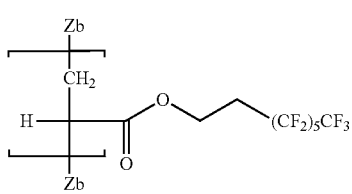
(Z1-4)

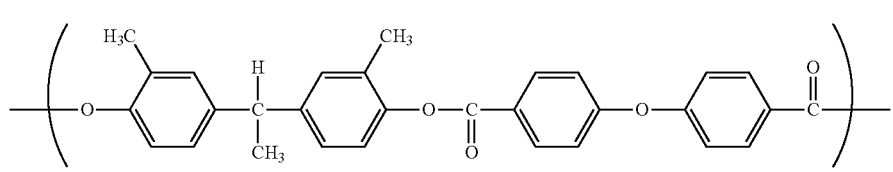

(PE-A)

Resin terminal group:

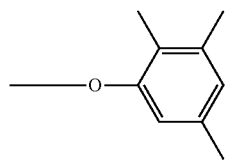

<Preparation Comparative Example 2> Preparation of Polyacrylate (Polyacrylate Polymer 1)

PFHA (0.50 g), THFA (0.50 g), and anisole (1.00 ml) were added in a 50 ml four-necked reaction vessel, and the mixture was heated to 115° C. and stirred under a nitrogen atmosphere. Here, AIBN (10 mg) as a polymerization initiator was added and continuously stirred for 30 minutes. By cooling the temperature to room temperature, 50% of solid solution of the polymer (polyacrylate polymer 1) was obtained. When a portion of the obtained polymer was extracted and dried so as to measure molecular weight, the weight average molecular weight (Mw) of the polyacrylate polymer 1 was 70,800.

Repeating Structure of Polyacrylate Polymer 1

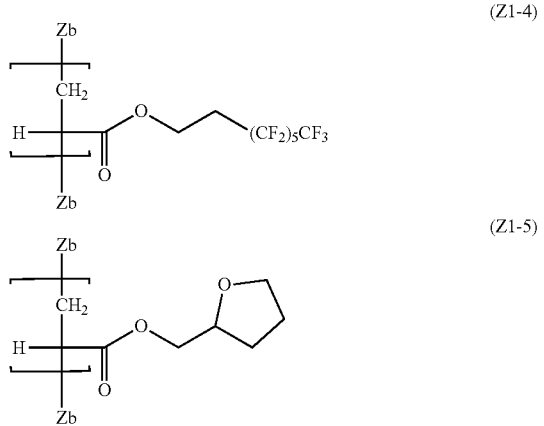

Here, Zb's independently exist in a state of being bonded to each other in a binding site Zb in (Z1-4) and (Z1-5).

<Preparation Comparative Example 3> Preparation of Polyacrylate (Polyacrylate Polymer 2)

PFHA (0.65 g), THFA (0.35 g), and anisole (1.00 ml) were added in a 50 ml four-necked reaction vessel, and the mixture was heated to 115° C. and stirred under a nitrogen atmosphere. Here, AIBN (10 mg) as a polymerization initiator was added and continuously stirred for 30 minutes. By cooling the temperature to room temperature, 50% of solid solution of the polymer (polyacrylate 2) was obtained. When a portion of the obtained polymer was extracted and dried so as to measure molecular weight, the weight average molecular weight (Mw) of the polyacrylate polymer 2 was 79,600.

The repeating structure unit of the polyacrylate polymer 2 is the same as that of the polyacrylate polymer 1.

[Dispersion of Fluororesin]

Example 1

After dissolving the polymer 1 (005 g) prepared in Preparation Example 11 into tetrahydrofuran (9.00 g), polytetrafluoroethylene (hereinafter, referred to as PTFE) powder (KTL-500F prepared by Kitamura Limited: primary particle diameter of 0.3 µm) (1.00 g) was added. Subsequently, the prepared solution was dispersed for one hour under ultrasonic conditions of an oscillation frequency of 40 kHz and a high-frequency output of 600 W.

Examples 2 to 11

PTFE was dispersed in the same manner as in Example 1 except that the polymer 1 of Example 1 was changed to polymers 2 to 11, respectively.

Comparative Example 1

PTFE was dispersed in the same manner as that in Example 1 except that the polymer 1 of Example 1 was changed with the same amount of the acrylate polymer 1 polymerized in Comparative Preparation Example 2 as the solid content, but PTFE particles immediately settled out after completion of dispersion.

Comparative Example 2

PTFE was dispersed in the same manner as that in Example 1 except that the polymer 1 of Example 1 was changed with the same amount of the acrylate polymer 2 polymerized in Comparative Preparation Example 3 as the solid content.

Comparative Example 3

PTFE was dispersed in the same manner as that in Example 1 except that the polymer 1 of Example 1 is changed with a fluorinated graft polymer (GF-400: prepared by TOAGOSEI Co., Ltd.) which is a methacrylate fluorocarbon agent.

Repeating Structure of GE-400

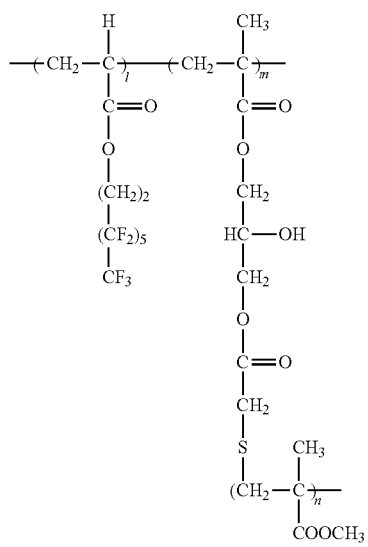

(Mw = 85,000, l:m = 84:16, n = 30)

Comparative Example 4

PTFE was dispersed in the same manner as that in Example 1 except that the polymer 1 of Example 1 was not added, but PTFE particles immediately settled out after completion of dispersion.

[Evaluation of Dispersibility]

With respect to the PTFE dispersions prepared in Examples 1 to 11 and Comparative Examples 2 and 3, particle size distribution of PTFE particles was measured at 25° C. by a dynamic light scattering method using a nano-track particle size distribution analyzer UPA-EX 150 (manufactured by Nikkiso Co., Ltd). The obtained average particle diameter, D50 and D90 (D50 and D90 each represent a particle diameter equal to 0.5 (50 number %) and 0.9 (90 number %) of the total number of particles of the dispersed particles j were calculated. The results are indicated in Table-1 and Table-2.

The smaller the value, the more excellent the dispersibility is. As a determination of dispersibility, a case where the value of D90 was 500 or less is determined as S, a case where the value of D90 was 500 to 800 is determined as A, a case where the value of D90 was 800 to 1000 is determined as B, a case where the value of D90 was 1000 or more or a case where the dispersibility does not exist is determined as C.

TABLE 1

| | | Polymer composition | | | PTFE average particle diameter | | |
| | | PC, PE | PFHA | THFA | | | |
| | Polymer No. | No. | % by mass | % by mass | % by mass | D50 | D90 | Determination of dispersibility |
|---|---|---|---|---|---|---|---|---|
| Example 1 | 1 | PC-1 | 65 | 35 | — | 327 | 490 | S |
| Example 2 | 2 | PC-1 | 55 | 40 | — | 289 | 456 | S |
| Example 3 | 3 | PC-2 | 64 | 36 | — | 272 | 458 | S |
| Example 4 | 4 | PE-1 | 60 | 40 | — | 317 | 435 | S |
| Example 5 | 5 | PE-1 | 50 | 50 | — | 297 | 710 | A |
| Example 6 | 6 | PE-1 | 40 | 60 | — | 323 | 562 | A |
| Example 7 | 7 | PE-2 | 60 | 40 | — | 382 | 660 | A |
| Example 8 | 8 | PE-3 | 37 | 63 | — | 323 | 601 | A |
| Example 9 | 9 | PE-4 | 35 | 65 | — | 350 | 587 | A |
| Example 10 | 10 | PE-5 | 36 | 64 | — | 330 | 452 | S |
| Example 11 | 11 | PE-6 | 50 | 50 | — | 330 | 600 | A |

TABLE 2

|  | Polymer No. | Polymer composition | | | PTFE average particle diameter | | Determination of dispersibility |
|  |  | PC, PE No. | PFHA % by mass | THFA % by mass | D50 | D90 |  |
| --- | --- | --- | --- | --- | --- | --- | --- |
| Comparative Example 1 | Polyacrylate 1 | — | 50 | 50 | Sediment immediately | | C |
| Comparative Example 2 | Polyacrylate 2 | — | 65 | 35 | 280 | 368 | S |
| Comparative Example 3 | GF400 | — | — | — | 344 | 929 | B |
| Comparative Example 4 | — | — | — | — | Sediment immediately | | C |

Production of Photoreceptor Sheet

Example 12

The dispersion for undercoat layer was prepared by the following method. That is, rutile type titanium oxide ("TTO55N" prepared by Ishihara Sangyo Kaisha, Ltd.) having an average primary particle diameter of 40 nm and 3% by mass of methyl dimethoxysilane ("TSL8117" prepared by Toshiba Silicones Co., Ltd.) were charged into a high-speed fluidized mixing and kneading machine ("SMG 300" manufactured by Kawata Co., Ltd.), and the surface treated titanium oxide obtained by high speed mixing at a circumferential rotation speed of 34.5 in/sec was dispersed by a ball mill of methanol/1-propanol so as to prepare a dispersion slurry of hydrophobized titanium oxide.

The dispersion slurry, a mixed solvent of methanol/1-propanol/toluene, and a pellet of a copolymerized polyamide having ε-caprolactam [compounds represented by Formula (F)], his (4-amino-3-methyl cyclohexyl) methane [a compound represented by Formula (G)], hexamethylenediamine [a compound represented by Formula (H)], decamethylenedicarboxylic acid [a compound represented by Formula (I)], and octadecamethylene dicarboxylic acid [a compound represented by Formula (J)] of which the composition molar ratios are respectively 60%, 15%, 5%, 15%, and 5% are stirred and mixed with each other while being heated so as to dissolve a polyamide pellet, and then ultrasonic dispersion treatment was performed, thereby preparing an undercoat layer dispersion having a solid content concentration of 18.0%, which contains methanol/1-propano/toluene in a mass ratio of 7/1/2 and hydrophobic titanium oxide/copolymerized polyamide in a mass ratio of 3/1.

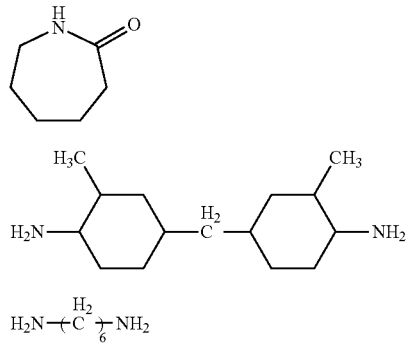

F

G

H

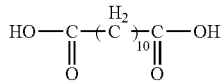

I

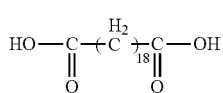

J

Figure 2:
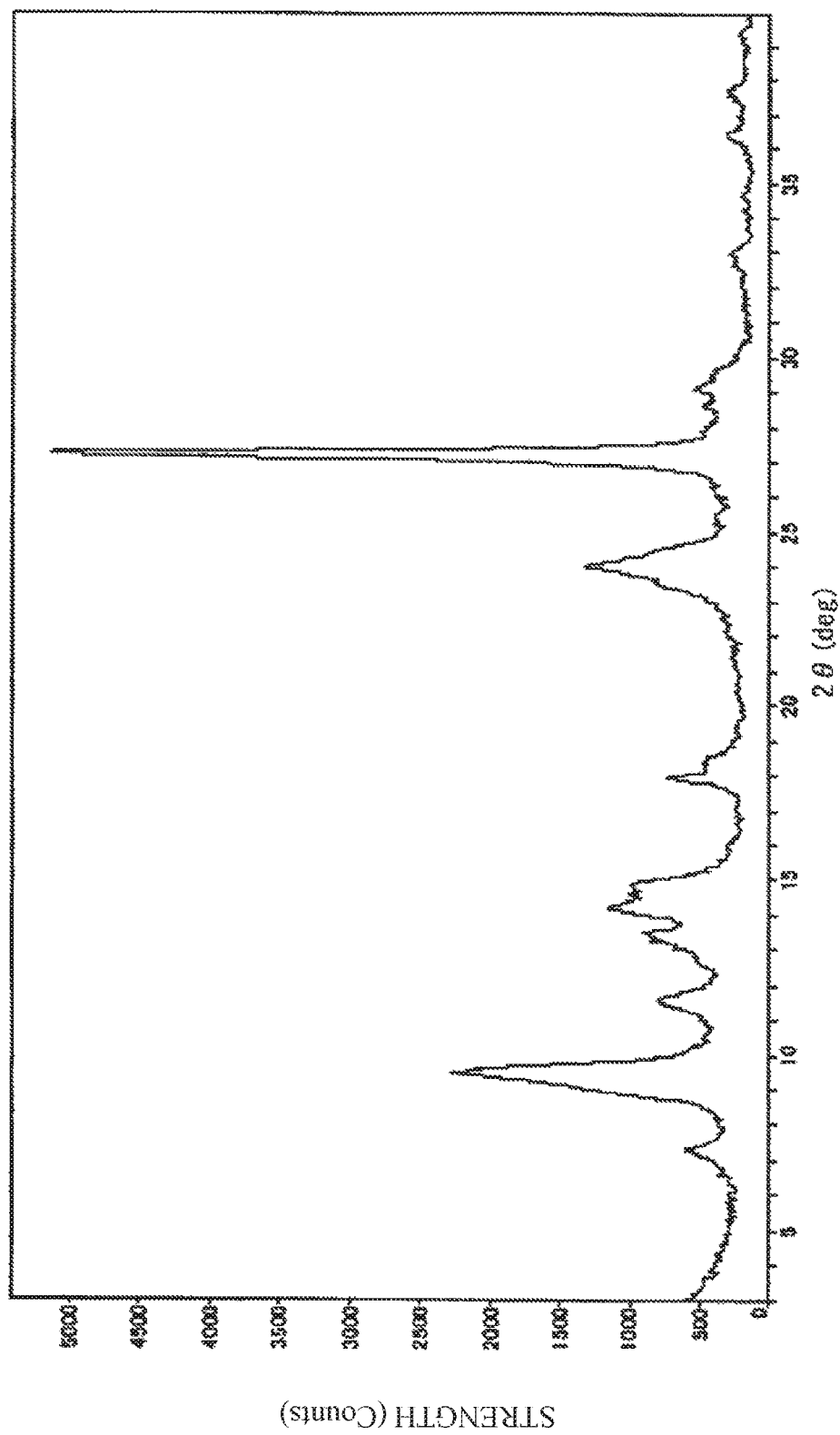
FIG. 2 is a diagram illustrating an X-ray diffraction spectrum by CuKα characteristic X-ray of oxytitanium phthalocyanine used in examples.

The coating liquid for charge generation layer was prepared by the following method. 10 parts by mass of oxytitanium phthalocyanine showing intense diffraction peak at a Bragg angle (2θ±0.2) of 27.3° in the X-ray diffraction spectrum obtained with CuKα characteristic X-ray, and having an X-ray powder diffraction spectrum as illustrated in FIG. 2 was added to 150 parts by mass of 1,2-dimethoxyethane, and was subjected to a pulverization and dispersing treatment with a sand grinding mill so as to prepare a pigment dispersion. 160 parts by mass of the pigment dispersion thus obtained, 100 parts by mass of 5% 1,2-dimethoxyethane solution of polyvinyl butyral (trade name #6000 C, prepared by Denki Kagaku Kogyo Kabushiki Kaisha), an appropriate amount of 1,2-dimethoxyethane were mixed and finally a dispersion having a solid content concentration of 4.0% was prepared.

The coating liquid for charge transport layer was prepared by the following method. 50 parts by mass of mixture CTM1, as the charge transport substance, prepared by using a method disclosed in Example 1 of JP-A-2002-080432 which is formed of a compound group of geometric isomers based on the structure described below, 100 parts by mass of polycarbonate resin PC-Z, as the binder resin, (YUPITASE PCZ-400, prepared by Mitsubishi Gas Chemical Company, Inc., viscosity average molecular weight: 40,000), 4 parts by mass of an antioxidant (IRGANOX 1076), and 0.05 parts by mass of silicone oil as a leveling agent were dissolved in a mixed solvent of 290 parts by mass of tetrahydrofuran and 112 parts by mass of toluene, and then 200 parts by mass of PTFE dispersion (corresponding to 20 parts by mass of PTFE) having a solid content of 10% by mass, prepared in the above-described Example 1, was added and mixed so as to prepare a coating liquid for forming a charge transport layer.

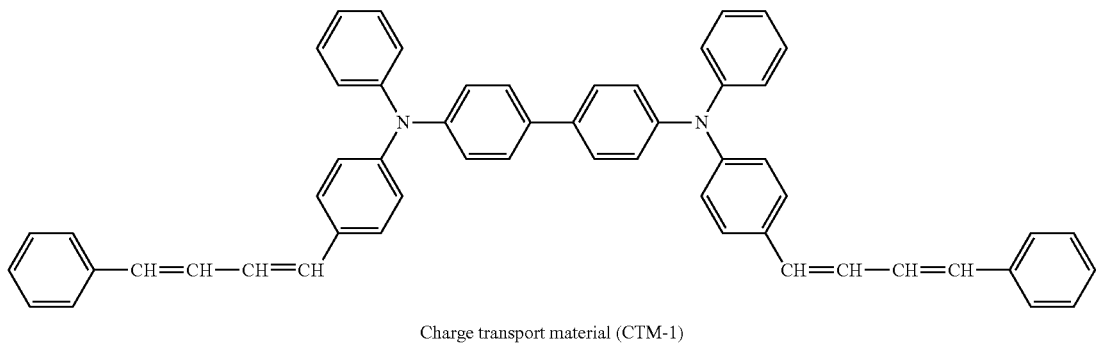 [SMILES: C(C=Cc1ccc(N(c2ccccc2)c2ccc(-c3ccc(N(c4ccccc4)c4ccc(C=CC=Cc5ccccc5)cc4)cc3)cc2)cc1)=Cc1ccccc1]

Charge transport material (CTM-1)

The dispersion for undercoat layer was applied onto a polyethylene terephthalate sheet having aluminum vapor deposited on the surface thereof by a bar coater so as to have a dry thickness of 1.25 μm and dried so as to form an undercoat layer. Subsequently, the coating liquid for charge generation layer applied onto the undercoat layer with a wire bar so that the thickness after drying was 0.4 μm, and then dried so as to form a charge generation layer. Next, a coating liquid for charge transport was applied onto the charge generation layer using an applicator so that the film thickness after drying was 25 μm, and drying was performed at 125° C. for 20 minutes so as to form a charge transporting layer, thereby preparing a photoreceptor sheet.

Example 13

A photoreceptor sheet was produced in the same manner as that in Example 12 except that the PTFE dispersion was changed with the PTFE dispersion in Example 2, Comparative Example 7

A photoreceptor sheet was produced in the same manner as that in Example 12 except that the PTFE dispersion was changed with the PTFE dispersion in Comparative Example 4.

Comparative Example 8

A photoreceptor sheet was produced in the same manner as that in Example 12 except that the PTFE dispersion was not added.

Examples 15 to 17

A photoreceptor sheet was prepared in the same manner as in Examples 12 to 14 except that the binder resin was changed from PC-Z to a polyester resin (PE-A: viscosity average molecular weight: 43,000) having a repeating structure described below.

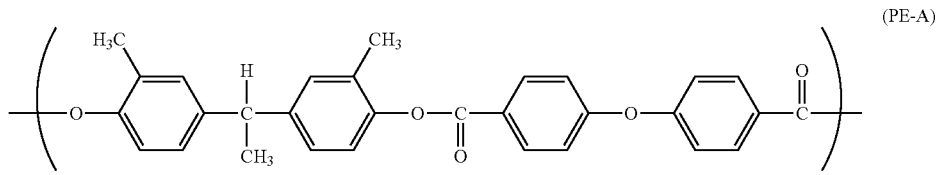

(PE-A)

Example 14

A photoreceptor sheet was produced in the same manner as that in Example 12 except that the PTFE dispersion was changed with the PTFE dispersion in Example 4.

Comparative Example 5

A photoreceptor sheet was produced in the same manner as that in Example 12 except that the PTFE dispersion was changed with the PTFE dispersion in Comparative Example 2.

Comparative Example 6

A photoreceptor sheet was produced in the same manner as that in Example 12 except that the PTFE, dispersion was changed with the PTFE, dispersion in Comparative Example 3.

Comparative Examples 9 to 12

A photoreceptor sheet was prepared in the same manner as in Comparative Examples 5 to 8 except that the binder resin was changed from PC-Z to polyester resin (PE-A).

[Visual Evaluation of Coating Film State]

The surface of the coated photosensitive sheet was visually confirmed. A case where the coating film was uniform and smooth is determined as A, a case where the coating film is partially nonuniform is determined as B, and a case where the coating film is entirely nonuniform and has unevenness or a case where there is a large particle of PTFE is determined as C. The results are indicated in Table-3.

[Evaluation of Electrical Properties]

The photoreceptor is attached to an aluminum drum to be formed into a cylindrical shape, and after the aluminum drum and the aluminum substrate of the photoconductor communicate with each other, the drum was rotated at a constant number of revolutions, and an electric property evaluation test was performed by a cycle of charging, exposure, potential measurement, and charge elimination by using an electrophotography property evaluation apparatus manufactured in accordance with the measurement standards of The Society of Electrophotography of Japan (described in The Society of Electrophotography of Japan, ed., Zoku Denshi Shashin Gijutsu No Kiso To Ōyō, Corona Publishing Co., Ltd., pp. 404-405).

At that time, the initial surface potential was set at −700 V, monochromatic light with exposure of 780 nm and static elimination at 660 nm was used, and the surface potential (VL) at the time when exposure light irradiated was 2.4 µJ/cm² was measured. For the VL measurement, the time required for the potential measurement from the exposure was set to 139 ms.

In addition, the irradiation energy (half reduction exposure energy: µJ/cm²) when the surface potential was half the initial surface potential (−350 V) was measured as sensitivity (E½). The smaller the absolute value of VL is, the more excellent the electrical properties are, while the smaller the value of E½, the higher the sensitivity. The measurement was carried out in an environment of temperature of 25° C. and relative humidity of 50% (N/N). The results are indicated in Table-3.

Note that, (N/N) is an abbreviation of the test environment and means (Normal Temperature/Normal Humidity).

[Abrasion Test]

An abrasion evaluation for a photoreceptor film was performed with a Suga abrasion tester FR-II (manufactured by Suga Test Instruments Co., Ltd). The amount of abrasion after reciprocating 2000 times was measured by comparing the mass before and after the test using wear paper (containing alumina particles with a particle diameter of 3 µm) under the test conditions of a load of 300 g in an atmosphere of 25° C. and 50% RH. The smaller the value, the more excellent the abrasion resistance is. The results are indicated in Table-3.

dispersibility of the fluororesin in the organic solvent or insufficient compatibility with the binder resin, resulting in making the coating film nonuniform. In addition, the electrical properties and abrasion resistance of the photoreceptor were insufficient.

Example 18

A photoreceptor sheet was prepared in the same manner as in Example 12 except that the PTFE dispersion was changed from 200 parts by mass to 100 parts by mass (corresponding to 10 parts by mass of PTFE).

Example 19

A photoreceptor sheet was prepared in the same manner as in Example 14 except that the PTFE dispersion was changed from 200 parts by mass to 100 parts by mass (corresponding to 10 parts by mass of PTFE).

Example 20

A photoreceptor sheet was prepared in the same manner as in Example 15 except that the PTFE dispersion was changed from 200 parts by mass to 100 parts by mass (corresponding to 10 parts by mass of PTFE).

Example 21

A photoreceptor sheet as prepared in the same manner as in Example 17 except that the PTFE dispersion was changed from 200 parts by mass to 100 parts by mass (corresponding to 10 parts by mass of PTFE).

TABLE 3

| | Binder resin | PTFE dispersion | | Coating film state | Test for electrical properties (N/N) | | Abrasion amount (-mg) |
| --- | --- | --- | --- | --- | --- | --- | --- |
| | | Dispersion No. | Dispersant No. | | $E_{1/2}$ (µJ/cm²) | VL (-V) | |
| Example 12 | PC-Z | Example 1 | Polymer 1 | A | 0.083 | 36 | 0.93 |
| Example 13 | PC-Z | Example 2 | Polymer 2 | A | 0.084 | 37 | 0.88 |
| Example 14 | PC-Z | Example 8 | Polymer 8 | A | 0.083 | 36 | 1 |
| Comparative Example 5 | PC-Z | Comparative Example 2 | Polyacrylate 2 | C | 1.777 | 578 | 1.04 |
| Comparative Example 6 | PC-Z | Comparative Example 3 | GF-400 | A | 0.084 | 38 | 0.95 |
| Comparative Example 7 | PC-Z | Comparative Example 4 | — | C | 0.083 | 37 | 1.02 |
| Comparative Example 8 | PC-Z | None | — | — | 0.082 | 38 | 1.13 |
| Example 15 | PE-A | Example 1 | Polymer 1 | A | 0.098 | 104 | 0.65 |
| Example 16 | PE-A | Example 2 | Polymer 2 | A | 0.098 | 99 | 0.7 |
| Example 17 | PE-A | Example 8 | Polymer 8 | A | 0.098 | 104 | 0.76 |
| Comparative Example 9 | PE-A | Comparative Example 2 | Polyacrylate 2 | C | — | 586 | 0.85 |
| Comparative Example 10 | PE-A | Comparative Example 3 | GF-400 | B | 0.098 | 108 | 0.78 |
| Comparative Example 11 | PE-A | Comparative Example 4 | — | C | 0.098 | 118 | 0.88 |
| Comparative Example 12 | PE-A | None | — | — | 0.098 | 120 | 1.7 |

As is apparent from Tables 1 and 2, the excellent dispersibility in an organic solvent can be obtained by using the polymer of the invention.

Also, as is apparent from Table 3, the polymer of the invention has a high compatibility with the binder resin used in the coating film, so that the obtained coating film is smooth, and the obtained photoreceptor has excellent electrical properties. Further, the photoreceptor is excellent in the abrasion resistance.

On the other hand, a dispersant not having a polycarbonate resin or a polyester resin structure has insufficient Example 22

A photoreceptor sheet was prepared in the same manner as in Example 18 except that the binder resin was changed from PC-Z to a polycarbonate resin (PC-ZB: viscosity average molecular weight: 50,000) having a repeating structure described below, and PTFE dispersion is changed to a PTFE dispersion in Example 10.

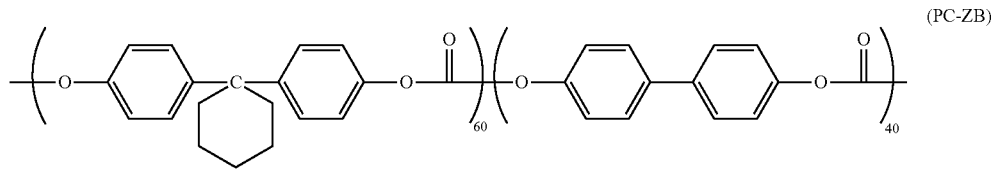
(PC-ZB)

Comparative Example 13

A photoreceptor sheet was prepared in the same manner as in Comparative Example 6 except that the PTFE dispersion was changed from 200 parts by mass to 100 parts by mass (corresponding to 10 parts by mass of PTFE).

Comparative Example 14

A photoreceptor sheet was prepared in the same manner as in Comparative Example 10 except that the PTFE dispersion was changed from 200 parts by mass to 100 parts by mass (corresponding to 10 parts by mass of PTFE).

Comparative Example 15

A photoreceptor sheet was produced in the same manner as that in Example 22 except that the PTFE dispersion was changed from the PTFE dispersion in Example 10 to the PTFE dispersion Comparative Example 3.

[Evaluation of Residual Potential in Repeated Use]

The photoreceptor sheets of Examples 18 to 22 and Comparative Examples 13 to 15 were attached to an aluminum drum to be formed into a cylindrical shape, and after the aluminum drum and the aluminum substrate of the photoconductor communicate with each other, the drum was rotated at a constant number of revolutions, and an electric property evaluation test was performed by a cycle of charging, exposure, potential measurement, and charge elimination by using an electrophotography property evaluation apparatus manufactured in accordance with the measurement standards of The Society of Electrophotography of Japan (described in The Society of Electrophotography of Japan, ed., Zoku Denshi Shashin Gijutsu No Kiso To Ōyō, Corona Publishing Co., Ltd., pp. 404-405, 1996).

At that time, the initial surface potential was set at −700 V, monochromatic light with exposure of 780 nm and static elimination at 660 nm was used, and the surface potential (residual potential: VL) at the time when exposure light irradiated was 2.4 µJ/cm² was measured. For the VL measurement, the time required for the potential measurement from the exposure was set to 139 ms. VL was measured after repealing the above process 5000 times, and the VL difference before and after repeated measurements was defined as ΔVL. The measurement was carried out in an environment of temperature of 35° C. and relative humidity of 85% (H/H). The lower the value of VL, the more excellent the electrical properties are, and the lower the value of ΔVL, the more excellent the electrical properties are. The results are indicated in Table-4.

Note that, (H/H) is an abbreviation of the test environment and means (High Temperature/High Humidity).

TABLE 4

| | | | | Test for electrical properties (H/H) | | |
|---|---|---|---|---|---|---|
| | Binder resin | PTFE dispersion | | Initial VL (−V) | VL after repeating 5,000 times | ΔVL |
| | | Dispersion No. | Dispersant No. | | | |
| Example 18 | PC-Z | Example 1 | Polymer 1 | 45 | 161 | 116 |
| Example 19 | PC-Z | Example 8 | Polymer 8 | 43 | 166 | 123 |
| Comparative Example 13 | PC-Z | Comparative Example 3 | GF-400 | 61 | 265 | 204 |
| Example 20 | PE-A | Example 1 | Polymer 1 | 114 | 200 | 86 |
| Example 21 | PE-A | Example 8 | Polymer 8 | 115 | 184 | 69 |
| Comparative Example 14 | PE-A | Comparative Example 3 | GF-400 | 128 | 233 | 105 |
| Example 22 | PC-ZB | Example 10 | Polymer 10 | 37 | 157 | 115 |
| Comparative Example 15 | PC-ZB | Comparative Example 3 | GF-400 | 45 | 226 | 181 |

As apparent from Table-4, the polymer of the invention has less change in the initial residual potential in the environment and residual potential in repetitive use as compared with the methacrylate fluorinated graft polymer, and excellent in the electrical properties.

<Production of Electrophotographic Photoreceptor Drum>
<Preparation of Coating Liquid for Forming Undercoat Layer>

1 kg of a raw-material slurry obtained by mixing 120 parts by mass of methanol with 50 parts by mass of surface-treated titanium oxide obtained by mixing rutile titanium oxide having an average primary-particle diameter of 40 nm ("TTO55N", manufactured by Ishihara Sangyo Co., Ltd.) with methyldimethoxysilane ("TSL8117", manufactured by Toshiba. Silicone Co., Ltd.), the amount of which was 3% by mass based on the titanium oxide, by means of a Henschel mixer was subjected to a 1-hour dispersing treatment with Ultra Apex Mill (Type UAM-015) manufactured by Kotobuki Industries Co., Ltd., which had a mill capacity of about 0.15 L, using zirconia beads having a diameter of about 100 µm (YTZ, manufactured by Nikkato Corp.) as a dispersing medium, while circulating the liquid under the conditions of a rotor peripheral speed of 10 m/sec and a liquid flow rate of 10 kg/hr. Thus, a titanium oxide dispersion was produced.

The titanium oxide dispersion, the mixed solvent of methanol/1-propanol/toluene, and the pellet of the same polyamide resin used at the time of preparation of the dispersion for undercoat layer at the time of preparing the photoreceptor sheet were stirred and mixed, with heating, then the polyamide pellet was dissolved, and this mixture was subjected to an ultrasonic dispersion treatment by using an ultrasonic transmitter with an output of 1200 W for one hour, and was further filtered with PTFE membrane filter (Mytex LC manufactured by Advantec Co., Ltd.) having a pore size of 5 µm. Thus, a coating liquid for forming an undercoat layer which had a surface-treated titanium oxide/copolymer polyamide ratio of 3/1 by mass, and a methanol/1-propanol/toluene ratio of 7/1/2 by mass, and had a solid concentration of 18.0% by mass was obtained.

<Preparation of Coating Liquid for Forming Charge Generation Layer>

As the charge generation substance, 20 parts by mass of oxytitanium phthalocyanine showing an X-ray diffraction spectrum by CuKα characteristic X-ray in FIG. 2 and 280 parts by mass of 1,2-dimethoxyethane were mixed with each other, and the mixture was subjected to a pulverization/dispersion treatment for one hour by using a sand grinding mill.

Subsequently, the resultant fine dispersion was mixed with a binder solution obtained by dissolving 10 parts by mass of polyvinyl butyral (trade name "Denka Butyral" #6000C, manufactured by Denki Kagaku Kogyo K.K.) in a liquid mixture composed of 255 parts by mass of 1,2-dimethoxyethane and 85 parts by mass of 4-methoxy-4-methyl-2-pentanone, and with 230 parts by mass of 1,2-dimethoxyethane so as to prepare a coating liquid for forming a charge generation layer A.

Figure 3:
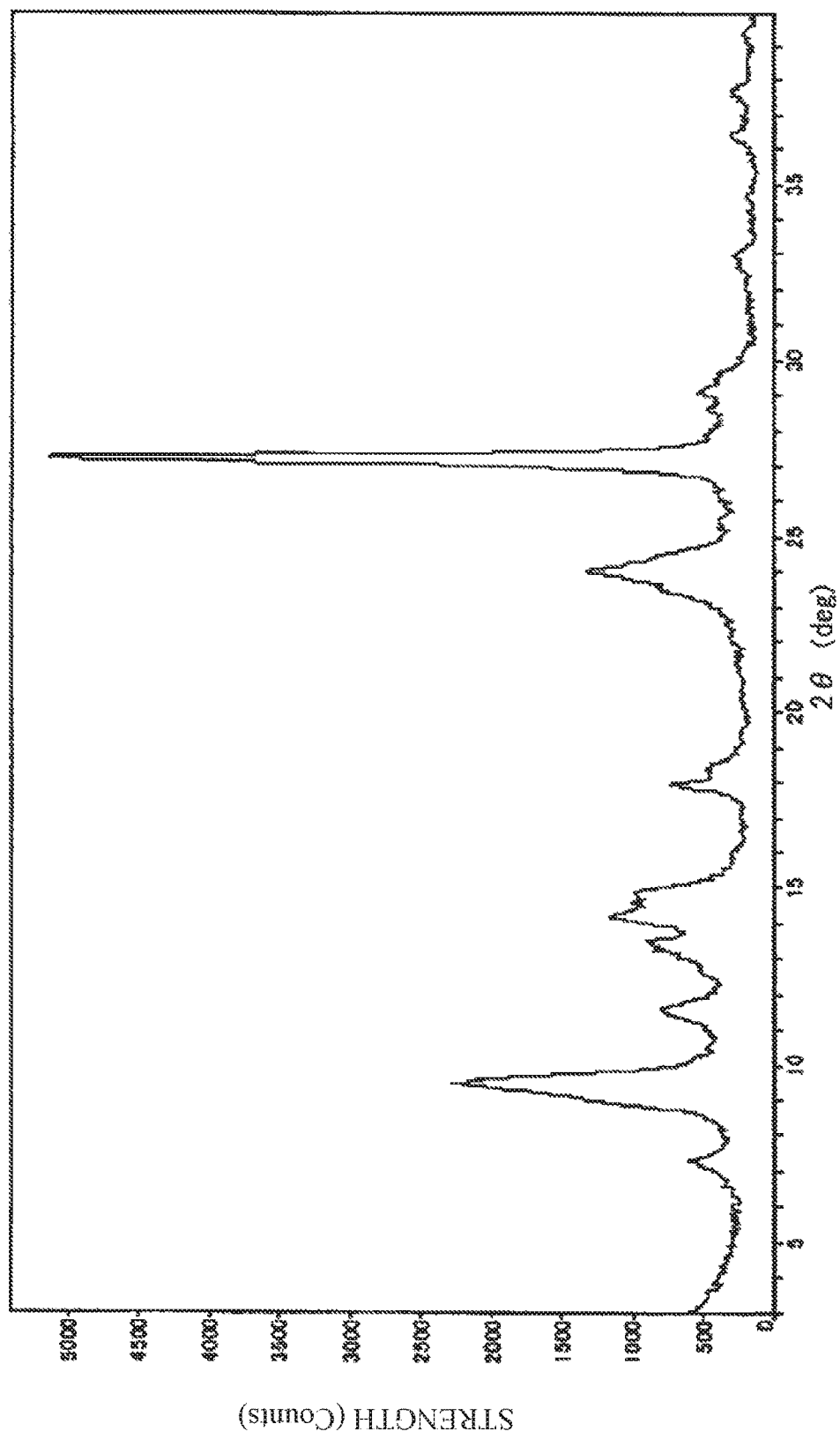
FIG. 3 is a diagram illustrating an X-ray diffraction spectrum by CuKα characteristic X-ray of oxytitanium phthalocyanine used in examples.

As the charge generation substance, 20 parts by mass of oxytitanium phthalocyanine showing an X-ray diffraction spectrum by CuKα characteristic X-ray in FIG. 3 and 280 parts by mass of 1,2-dimethoxyethane were mixed with each other, and the mixture was subjected to a pulverization/dispersion treatment for four hours by using a sand grinding mill.

Subsequently, the resultant fine dispersion was mixed with a binder solution obtained by dissolving 10 parts by mass of polyvinyl butyral (trade name "Denka Butyral" #6000C, manufactured by Denki Kagaku Kogyo K.K.) in a liquid mixture composed of 255 parts by mass of 1,2-dimethoxyethane and 85 parts by mass of 4-methoxy-4-methyl-2-pentanone, and with 230 parts by mass of 1,2-dimethoxyethane so as to prepare a coating liquid for forming a charge generation layer B.

The coating liquid for forming a charge generation layer A and the coating liquid for forming a charge generation layer B were mixed with each other at the mass ratio of 55:45 so as to prepare the coating liquid for forming a charge generation layer used in the examples.

<Preparation of Coating Liquid for Forming a Charge Transport Layer>

[Coating Liquid C1]

0.5 part by mass of the polymer 10 prepared in Preparation Example 20 was dissolved in 90 parts by mass of tetrahydrofuran, then 10 parts by mass of PTFE particles (primary particle diameter of 0.3 µm) was added, and this liquid was dispersed in a high speed liquid collision type dispersing machine at a high pressure so as to obtain a PTFE dispersion.

100.5 parts by mass of the PTFE dispersion was added to a solution of 100 parts by mass of PC-ZB, 60 parts by mass of CM-1, 2 parts by mass of antioxidant 2,6-di-tert-butyl-4-methyl-phenol, 0.05 parts by mass of dimethyl polysiloxane (KF 96-10CS prepared by Shin-Etsu Chemical Co., Ltd.), and 430 parts by mass of tetrahydrofuran/65 parts by mass of toluene so as to obtain a coating liquid for forming a charge transport layer C1.

[Coating Liquid C2]

A coating liquid C2 was prepared in the same manner as that in the coating liquid C1 except that the polymer 10 was changed with a fluorinated graft polymer (GF-400) in the coating liquid.

<Manufacturing of Electrophotographic Photoreceptor Drum>

A coating liquid for forming an undercoat layer, a coating liquid for forming a charge generation layer, and a coating liquid for forming a charge transport layer which were prepared in the preparation example of the coating liquid were sequentially applied to a cylinder made of an aluminum alloy, of which the surface was subjected to a cutting process, having an external diameter of 24 mm, a length of 248 mm, and a film thickness of 0.75 mm by using a dip coating method, and drying was performed so as to form an undercoat layer, a charge generation layer, and a charge transport layer such that the film thicknesses thereof after drying respectively become 1.5 µm, 0.4 µm, and 36 µm, thereby manufacturing an electrophotographic photoreceptor drum. Note that, the charge transport layer may be dried at 125° C. for 24 minutes.

Example 23 and Comparative Example 16

The electrophotographic photoreceptor drum in Example 23 and Comparative Example 16 indicated in Table-5 was mounted in the photoreceptor cartridge of a monochromatic printer of ML6510 manufactured by Samsung Co., Ltd., and 600,000-sheet continuous printing was conducted at a coverage rate of 5% under the conditions of an air temperature of 25° C. and a relative humidity of 50%. The amount of film reduction was confirmed by measuring the film thickness of the charge transport layer after printing, and comparing the film thickness before printing with the film thickness after printing so as to evaluate the abrasion resistance. The results are indicated in Table-5. The smaller the value of the amount of film reduction, the more excellent the abrasion resistance is.

TABLE 5

| | Coating liquid | Polymer No. | Film reduction (µm) |
|---|---|---|---|
| Example 23 | C1 | Polymer 10 | 4.4 |
| Comparative Example 16 | C2 | GF-400 | 5.47 |

As apparent from Table-5, the electrophotographic photoreceptor using the polymer of the invention is excellent in the abrasion resistance.

As apparent from the above description, the polymer of the invention is excellent in the dispersion of the fluororesin, the coating film obtained by using the fluororesin dispersion is smooth, and in addition, the obtained electrophotographic photoreceptor is excellent in the electrical properties and the abrasion resistance.

While the invention has been described in detail and with reference to specific embodiments, it will be apparent to those skilled in the art that various changes and modifications can be made without departing from the spirit and scope of the invention. The present application is based on Japanese Patent Application No. 2016-066770 filed on Mar. 29, 2016, and the contents are incorporated herein by reference.

REFERENCE SIGNS LIST

1 ELECTROPHOTOGRAPHIC PHOTORECEPTOR
2 CHARGING DEVICE (CHARGING ROLLER)
3 EXPOSURE DEVICE
4 DEVELOPING DEVICE
5 TRANSFER DEVICE
6 CLEANING DEVICE
7 FIXING DEVICE
41 DEVELOPMENT TANK
42 AGITATOR
43 SUPPLY ROLLER
44 DEVELOPING ROLLER
45 REGULATING MEMBER
71 UPPER FLYING MEMBER (PRESSURIZING ROLLER)
72 LOWER FIXING MEMBER (FIXING ROLLER)
73 HEATING DEVICE
T TONER
P RECORDING SHEET

The invention claimed is:

1. An electrophotographic photoreceptor comprising:
a photosensitive layer on a conductive support,
wherein the photosensitive layer contains a fluororesin and a polymer including a structure represented by Formula (1):

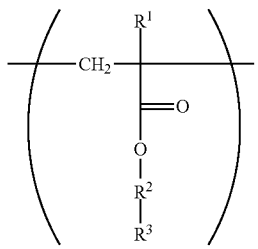

Formula (1)

wherein in the Formula (1), $R^1$ represents a hydrogen atom or a methyl group; $R^2$ represents a single bond, a divalent hydrocarbon group which may have an ether moiety or a divalent polyether group which may have a substituent; and $R^3$ represents a polycarbonate residue including a structure represented by Formula (5) or a polyester residue including a structure represented by Formula (6),

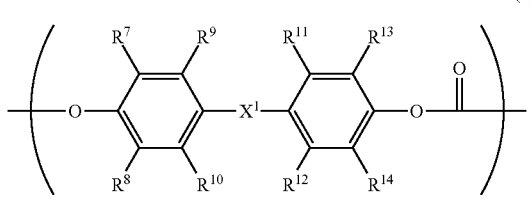

Formula (5)

wherein in the Formula (5), $R^7$ to $R^{14}$ are each independently represents a hydrogen atom, an alkyl group having 1 to 20 carbon atoms which may have a substituent, an alkoxy group, and an aromatic group or a halogen group which may be substituted; $X^1$ represents a single bond, —$CR^{15}R^{16}$—, an oxygen atom, CO or a sulfur atom; and $R^{15}$ and $R^{16}$ each independently represents a hydrogen atom, an alkyl group having 1 to 10 carbon atoms, an aromatic group having 6 to 12 carbon atoms, or $R^{15}$ and $R^{16}$ represent a cycloalkylidene group having 5 to 10 carbon atoms which may have a substituent, and is formed by combining $R^{15}$ and $R^{16}$,

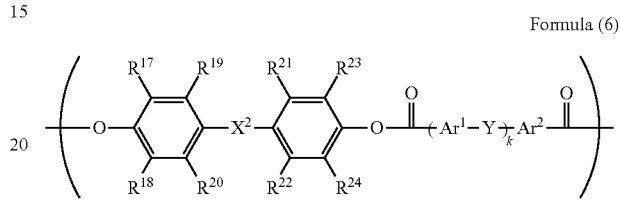

Formula (6)

wherein in the Formula (6), $R^{17}$ to $R^{24}$ each independently represents a hydrogen atom, an alkyl group having 1 to 20 carbon atoms which may have a substituent, an alkoxy group, and an aromatic group or a halogen group which may be substituted; $X^2$ represents a single bond, —$CR^{25}R^{26}$—, an oxygen atom, CO or a sulfur atom; $R^{25}$ and $R^{26}$ each independently represents a hydrogen atom, an alkyl group having 1 to 10 carbon atoms, an aromatic group having 6 to 12 carbon atoms, or $R^{25}$ and $R^{26}$ represent a cycloalkylidene group having 5 to 10 carbon atoms which may have a substituent, and is formed by combining $R^{25}$ and $R^{26}$; $Ar^1$ and $Ar^2$ each independently represents an arylene group or a cyclohexylene group which may have a substituent; Y represents a single bond, an oxygen atom, or a sulfur atom; and k represents an integer of 0 to 1.

2. The electrophotographic photoreceptor according to claim 1,
wherein the polymer includes the structure represented by Formula (1) and a structure represented by Formula (2):

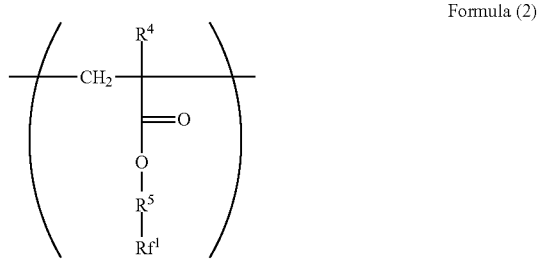

Formula (2)

wherein in the Formula (2), $R^4$ represents a hydrogen atom or a methyl group; $R^5$ represents a single bond or a divalent hydrocarbon group which may have an ether moiety; and $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3):

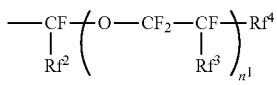
Formula (3)

wherein in the Formula (3), $Rf^2$ and $Rf^3$ each independently represent a fluorine atom or a trifluoromethyl group; $Rf^4$ represents a linear perfluoroalkyl group having 1 to 6 carbon atoms or a branched chain perfluoroalkyl group having 1 to 6 carbon atoms; and $n^1$ represents an integer of 1 to 3.

3. The electrophotographic photoreceptor according to claim 2,
wherein the structure represented by Formula (2) includes a structure represented by Formula (4):

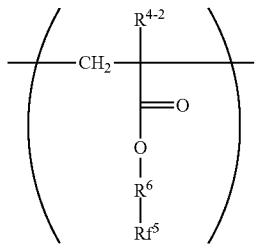
Formula (4)

wherein in the Formula (4), $R^{4-2}$ represents a hydrogen atom or a methyl group; $R^6$ represents a divalent group represented by $-(CH^2)n^4-$, $n^4$ represents an integer of 1 to 4; and $Rf^5$ represents a linear perfluoroalkyl group having 2 to 6 carbon atoms.

4. The electrophotographic photoreceptor according to claim 2,
wherein in the polymer including the structure represented by the Formula (1) and the structure represented by the Formula (2), a content of the structure represented by the Formula (1) is 20% by mass to 70% by mass.

5. The electrophotographic photoreceptor according to claim 2,
wherein a weight average molecular weight of the polymer including the structure represented by Formula (1) and the structure represented by Formula (2) is 5,000 to 100,000.

6. The electrophotographic photoreceptor according to claim 1,
wherein a content of the polymer including the structure represented by Formula (1) is 0.5 parts by mass to 20 parts by mass with respect to 100 parts by mass of fluororesin.

7. The electrophotographic photoreceptor according to claim 2,
wherein the photosensitive layer further contains a binder resin in addition to the polymer including the structure represented by the Formula (1) and the structure represented by the Formula (2) and the fluororesin, and a content of the fluororesin is 1 parts by mass to 30 parts by mass with respect to 100 parts by mass of the binder resin.

8. The electrophotographic photoreceptor according to claim 1,
wherein an average primary particle diameter of the fluororesin is 0.1 μm to 1.0 μm.

9. An electrophotographic photoreceptor cartridge comprising the electrophotographic photoreceptor according to claim 1.

10. An image forming apparatus comprising the electrophotographic photoreceptor according to claim 1.

11. A dispersant for fluororesin comprising a polymer including a repeating structural unit represented by Formula (1):

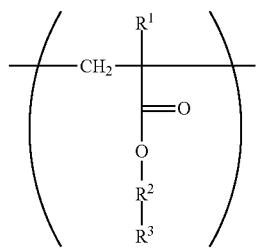
Formula (1)

wherein in the Formula (1), $R^1$ represents a hydrogen atom or a methyl group; $R^2$ represents a single bond, a divalent hydrocarbon group which may have an ether moiety or a divalent polyether group which may have a substituent; and $R^3$ represents a polycarbonate residue including a structure represented by Formula (5) or a polyester residue including a structure represented by Formula (6),

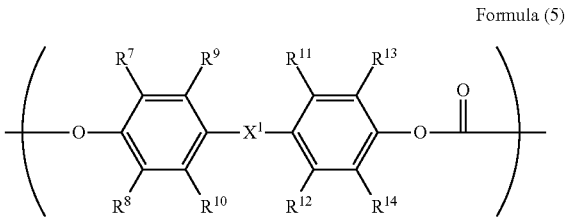
Formula (5)

wherein in the Formula (5), $R^7$ to $R^{14}$ are each independently represents a hydrogen atom, an alkyl group having 1 to 20 carbon atoms which may have a substituent, an alkoxy group, and an aromatic group or a halogen group which may be substituted; $X^1$ represents a single bond, $-CR^{15}R^{16}-$, an oxygen atom, CO or a sulfur atom; and $R^{15}$ and $R^{16}$ each independently represents a hydrogen atom, an alkyl group having 1 to 10 carbon atoms, an aromatic group having 6 to 12 carbon atoms, or $R^{15}$ and $R^{16}$ represent a cycloalkylidene group having 5 to 10 carbon atoms which may have a substituent, and is formed by combining $R^{15}$ and $R^{16}$,

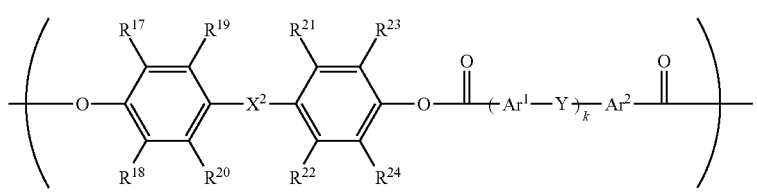

Formula (6)

wherein in the Formula (6), $R^{17}$ to $R^{24}$ each independently represents a hydrogen atom, an alkyl group having 1 to 20 carbon atoms which may have a substituent, an alkoxy group, and an aromatic group or a halogen group which may be substituted; $X^2$ represents a single bond, $-CR^{25}R^{26}-$, an oxygen atom, CO or a sulfur atom; $R^{25}$ and $R^{26}$ each independently represents a hydrogen atom, an alkyl group having 1 to 10 carbon atoms, an aromatic group having 6 to 12 carbon atoms, or $R^{25}$ and $R^{26}$ represent a cycloalkylidene group having 5 to 10 carbon atoms which may have a substituent, and is formed by combining $R^{25}$ and $R^{26}$; $Ar^1$ and $Ar^2$ each independently represents an arylene group or a cyclohexylene group which may have a substituent Y represents a single bond, an oxygen atom, or a sulfur atom; and k represents an integer of 0 to 1.

12. The dispersant for fluororesin according to claim 11, wherein the polymer includes the repeating structural unit represented by Formula (1) and a structural unit represented by Formula (2):

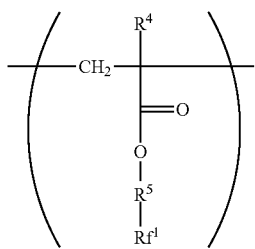

Formula (2)

wherein in the Formula (2), $R^4$ represents a hydrogen atom or a methyl group; $R^5$ represents a single bond or a divalent hydrocarbon group which may have an ether moiety; and $Rf^1$ represents at least one group selected from a linear perfluoroalkyl group having 2 to 6 carbon atoms, a branched chain perfluoroalkyl group having 2 to 6 carbon atoms, an alicyclic perfluoroalkyl group having 2 to 6 carbon atoms, and the group represented by Formula (3):

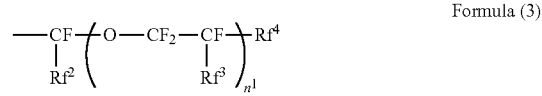

Formula (3)

wherein in the Formula (3), $Rf^2$ and $Rf^3$ each independently represents a fluorine atom or a trifluoromethyl group; $Rf^4$ represents a linear perfluoroalkyl group having 1 to 6 carbon atoms or a branched chain perfluoroalkyl group having 1 to 6 carbon atoms; and $n^1$ represents an integer of 1 to 3.

\* \* \* \* \*